United States Patent
Klotz et al.

(10) Patent No.: US 7,441,154 B2
(45) Date of Patent: *Oct. 21, 2008

(54) NETWORK ANALYSIS TOOL

(75) Inventors: Steve Klotz, Austin, TX (US); Jason David Mann, Austin, TX (US); Timothy Lane McDaniel, Austin, TX (US)

(73) Assignee: Finisar Corporation, Sunnyvale, CA (US)

( * ) Notice: Subject to any disclaimer, the term of this patent is extended or adjusted under 35 U.S.C. 154(b) by 594 days.

This patent is subject to a terminal disclaimer.

(21) Appl. No.: 10/661,200

(22) Filed: Sep. 12, 2003

(65) Prior Publication Data

US 2005/0060598 A1    Mar. 17, 2005

(51) Int. Cl.
*G06F 11/00* (2006.01)

(52) U.S. Cl. .................................. 714/39

(58) Field of Classification Search .......... 714/39
See application file for complete search history.

(56) References Cited

U.S. PATENT DOCUMENTS

| | | | |
|---|---|---|---|
| 5,850,388 A * | 12/1998 | Anderson et al. | 370/252 |
| 5,933,602 A | 8/1999 | Grover | |
| 5,948,055 A | 9/1999 | Pulsipher et al. | |
| 6,115,393 A | 9/2000 | Engel et al. | |
| 6,205,122 B1 | 3/2001 | Sharon et al. | |
| 6,219,050 B1 | 4/2001 | Schaffer | |
| 6,411,997 B1 | 6/2002 | Dawes et al. | |
| 6,584,501 B1 | 6/2003 | Cartsonis et al. | |
| 6,728,219 B1 | 4/2004 | Leong et al. | |
| 6,757,727 B1 * | 6/2004 | Ivory | 709/224 |
| 6,785,237 B1 | 8/2004 | Sufleta | |
| 6,810,017 B1 | 10/2004 | Leong et al. | |
| 6,931,574 B1 * | 8/2005 | Coupal et al. | 714/39 |
| 2002/0091977 A1 | 7/2002 | Mastro et al. | |
| 2002/0133588 A1 * | 9/2002 | Doyle et al. | 709/224 |
| 2003/0063571 A1 | 4/2003 | Ikeda et al. | |
| 2003/0151619 A1 | 8/2003 | McBride | |
| 2004/0081186 A1 | 4/2004 | Warren et al. | |
| 2004/0160910 A1 | 8/2004 | Gorsuch | |
| 2005/0060413 A1 * | 3/2005 | Oyadomari et al. | 709/227 |

OTHER PUBLICATIONS

"SAN Testing & Analysis Solutions", 2002 Finisar Corporation.*
"GTX-SANMetrics Fibre Channel & GigE/iSCSI Debug & Analysis Tool" Finisar□□.*
Schulz, Nick; "View all three SAN protocols with GTX 4.0—Server & PC", 2002; West World Productions, Inc.*
"GT-SANmetrics Analyzes Performance of Fibre Channel Networks; Finisar and Medusa Labs Team Up to Unveil SAN Performance Measurement Tools", Nov. 15, 1999, Business Wire.*

(Continued)

*Primary Examiner*—Michael C Maskulinski
(74) *Attorney, Agent, or Firm*—Workman Nydegger

(57) ABSTRACT

Embodiments of the invention provide a method for determining errors and metrics in a computer network. The method includes positioning an analyzer in communication with the network, capturing a data trace of the network with the analyzer, determining a network device topology from a first processing of the data trace, building user layer protocols using a second processing of the data trace and the determined device topology, determining errors in the network device topology using protocol experts applied to the user layer protocols in conjunction with the determined device topology, and displaying at least one of the device topology and the determined errors to a user.

22 Claims, 12 Drawing Sheets

OTHER PUBLICATIONS

U.S. Appl. No. 10/661,705, filed Sep. 12, 2003, Klotz et al.
U.S. Appl. No. 10/661,967, filed Sep. 12, 2003, Klotz et al.
U.S. Appl. No. 10/661,716, filed Sep. 12, 2003, Klotz et al.
U.S. Appl. No. 10/661,907, filed Sep. 12, 2003, Klotz et al.
U.S. Appl. No. 10/661,764, filed Sep. 12, 2003, Klotz et al.
U.S. Appl. No. 10/661,901, filed Sep. 12, 2003, Klotz et al.
Office action mailed Apr. 10, 2007, U.S. Appl. No. 10/661,764.
Notice of Allowability mailed Jul. 10, 2007, U.S. Appl. No. 10/661,716.
Office Action mailed Jul. 31, 2007, U.S. Appl. No. 10/661,901.
Notice of Allowability mailed Sep. 11, 2007, U.S. Appl. No. 10/661,907.
Office Action mailed Oct. 3, 2007, U.S. Appl. No. 10/661,967.

* cited by examiner

Communication Flow Key
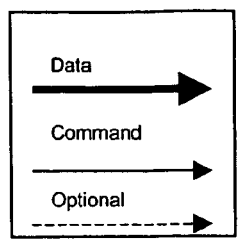
Figure 1. System Architecture
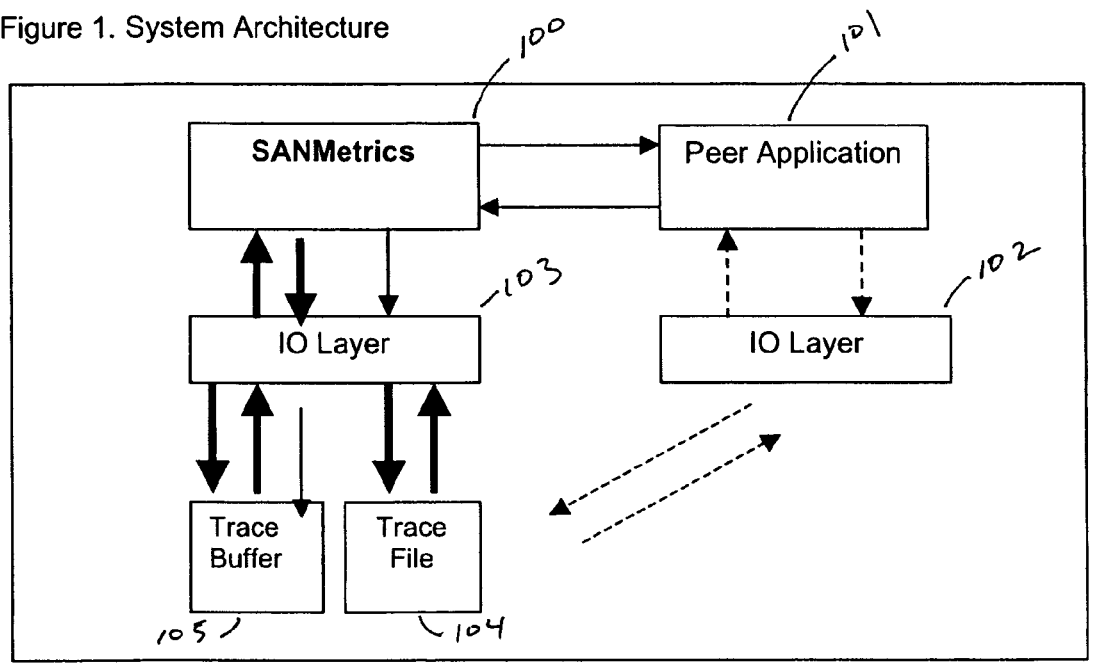
FIGURE 1

Figure 2. SANMetrics Architecture

FIGURE 3

| Description | Timestamp | Source | Destination | Pattern | Type | Data Count | Severity | Category | Value | Value Description |
|---|---|---|---|---|---|---|---|---|---|---|
| % of Arbitration Losses exceeds threshold | 000:00:00.001_796_513 | N/A | N/A | 0,1 | FC-2 | 1 | 1 | Warning | 5.15 | % of Arbs Lost |
| Arbitration Lost by device | 000:00:00.018_227_250 | bc | d | 0,1 | FC-2 | 377 | 5 | Warning | | |
| ARB F0 while loop in closed state | 000:00:00.022_099_425 | N/A | N/A | 0,1 | FC-2 | 15 | 4 | Warning | | |
| Arbitration Lost by device | 000:00:00.023_683_538 | bc | d | 0,1 | FC-2 | 377 | 5 | Warning | | |
| ARB F0 while loop in closed state | 000:00:00.027_098_138 | bc | d | 0,1 | FC-2 | 377 | 5 | Warning | | |
| Arbitration Lost by device | 000:00:00.032_108_550 | bc | d | 0,1 | FC-2 | 377 | 5 | Warning | | |
| Arbitration Lost during Tenancy | 000:00:00.067_262_350 | 01 | bc | 0,1 | FC-2 | 10 | 1 | Warning | 5 | Times Out of Credit |
| ARB F0 while loop in closed state | 000:00:00.085_840_988 | N/A | N/A | 0,1 | FC-2 | 15 | 4 | Warning | | |
| ARB F0 while loop in closed state | 000:00:00.246_508_063 | N/A | N/A | 0,1 | FC-2 | 15 | 4 | Warning | | |
| ARB F0 while loop in closed state | 000:00:00.262_214_350 | N/A | N/A | 0,1 | FC-2 | 15 | 4 | Warning | | |
| ARB F0 while loop in closed state | 000:00:00.367_597_875 | N/A | N/A | 0,1 | FC-2 | 15 | 4 | Warning | | |
| Failed Open / Open detected while loop in Open State | 000:00:00.473_707_462 | bc | bc | 0,1 | FC-2 | 10 | 2 | Warning | | |
| Out of Credit during Tenancy | 000:00:00.604_366_163 | 01 | bc | 0,1 | FC-2 | 10 | 1 | Warning | 5 | Times Out of Credit |
| Out of Credit during Tenancy | 000:00:00.604_503_138 | 01 | bc | 0,1 | FC-2 | 10 | 1 | Warning | 2 | Times Out of Credit |
| Out of Credit during Tenancy | 000:00:01.134_042_563 | 01 | bc | 0,1 | FC-2 | 10 | 1 | Warning | 4 | Times Out of Credit |
| Out of Credit during Tenancy | 000:00:01.134_123_863 | 01 | bc | 0,1 | FC-2 | 10 | 1 | Warning | 1 | Times Out of Credit |
| Out of Credit during Tenancy | 000:00:01.671_187_088 | 01 | bc | 0,1 | FC-2 | 10 | 1 | Warning | 6 | Times Out of Credit |
| Out of Credit during Tenancy | 000:00:01.671_350_700 | 01 | bc | 0,1 | FC-2 | 10 | 1 | Warning | 5 | Times Out of Credit |
| Out of Credit during Tenancy | 000:00:02.729_051_288 | 01 | bc | 0,1 | FC-2 | 10 | 1 | Warning | 1 | Times Out of Credit |
| Out of Credit during Tenancy | 000:00:02.729_064_025 | 01 | bc | 0,1 | FC-2 | 10 | 1 | Warning | 1 | Times Out of Credit |
| Out of Credit during Tenancy | 000:00:03.257_320_638 | 01 | bc | 0,1 | FC-2 | 10 | 1 | Warning | 4 | Times Out of Credit |

Figure 8

NETWORK ANALYSIS TOOL

BACKGROUND OF THE INVENTION

1. Field of the Invention

The present invention generally relates to data analysis, and more particularly, the present invention relates to intelligent analysis of one or more traces received from a protocol analyzer in communication with data transfer or storage network.

2. Description of the Related Art

Networks represent shared access arrangements in which several network devices, such as computers or workstations (collectively termed "stations"), are interconnected by a common communications medium that allows the users of the stations to share computing resources, such as file servers, printers, and storage, as well as application software and user work product. The communication medium between the stations may be wired, such as coaxial, twisted pair, or fiber optic cable, or a wireless communications medium, such as cellular or radio frequency (RF) transmission systems. The respective networks may range from bridged segments of local area networks (LANs) located in a department or single floor of a building, to a wide area networks (WAN) wherein a plurality of LANs are geographically distributed and interconnected through switching devices, such as routers or bridges. Alternately, the networks may represent Storage Area Networks (SAN) or Network Attached Storage (NAS) configuration deployed in LAN, WAN or more or less private interconnections using specialized high-speed protocols, such as Fibre Channel (FC) or Serial Attached SCSI (SAS).

Depending on performance requirements, the different LANs within a WAN may have different physical connection configurations (or "topologies"), such as Ethernet or Token Ring. They may also have different vendor proprietary LAN hardware and software with different signal protocols that govern the exchange of information between the stations in the LAN. When these different topology and different protocol LANs are interconnected, which is referred to as "internetworking", there must be an exchange of signal protocols. The open Standards Interconnect (OSI) seven layer interconnect model developed by the International Organization for Standardization describes how information is exchanged between software applications on workstations in different networks by passing the information through a hierarchy of protocol layers.

As a result, networks present a complicated arrangement of devices in various topologies capable of supporting different protocols. To ensure performance, networks must be managed. Management includes monitoring signal traffic for trends related to signal volume, routing, and transmission speed to pro-actively plan for network growth and to avoid signal congestion and network downtime. This also includes detecting and diagnosing network operational problems which affect performance to both prevent problems and to restore network operation with minimum downtime following the detection of a problem. These are the responsibilities of a network administrator, whose network duties require both anticipation of performance changes and diagnosis of performance failures. This requires the availability of network statistics related to performance, and network administrators commonly collect an archive of network management statistics that indicate network utilization, growth and reliability, to facilitate near-term problem isolation and longer-term network planning.

In general, categories of statistics to be monitored include those related to utilization, performance, availability, and stability within a monitoring period. Utilization statistics relate to network traffic-versus-capacity (i.e. efficiency) and the statistics include frame count, frames-per-second (FPS), the frequency of occurrence of certain protocols, and certain application level statistics. Performance statistics relate to quality of service issues, such as traffic delays, the number of packet collisions, and the number of message packets dropped. Availability statistics gauge the accessibility of different OSI protocol layers within the network, and include line availability as percentage of uptime, root availability, and application availability. Stability statistics describe short-term fluctuation in the network which degrade service, including: number of fast line status transitions, number of fast root changes (root flapping, next hop count stability, and short term ICM behavior).

The data to produce the foregoing statistics is collected by instruments known as protocol analyzers. In particular, protocol analyzers are used as diagnostic and testing tools at various stages of the development, integration and maintenance of electronic computing devices. Typically, a protocol analyzer is designed for use with a particular electrical communication interface protocol, such as ATA, SCSI, Ethernet, or Fibre Channel (FC). In a typical use, the protocol analyzer is connected to the communication interface of the computing system being tested to record communication activity on the interface. The communication activity is captured and recorded in a dedicated trace buffer associated with the protocol analyzer, and then analyzed or presented to the user for the purpose of diagnosing, testing or maintaining the communication interface in a trace viewer format. In a given environment, one or more analyzers may be placed in selected locations, according to the devices of interest. One known analyzer is the GTX Analyzer commercially from Finisar Corporation of Sunnyvale, Calif.

One limitation with many existing protocol analyzers is that such analyzers do not actually "analyze" the data captured by the analyzer. Rather, the data captured by analyzers is presented to the user (a human being) for inspection and determination of whatever faults, errors, or other unwanted conditions exist in the network. Since a trace file may easily contain several million entries, manual or brute force analysis of these traces is extremely time consuming. Trace viewers often allow the administrator to search through the trace for specific commands or lists of associated commands, however, the trace viewers do not assist the user with any analysis other than to find particular types of commands that the user searches for. As such, even when accurate performance statistics are provided by analyzers, the ability to diagnose network failures quickly, or at all, relies on the education and practical experience of the network administrator in general, and their experience with the particular network being analyzed. Unfortunately, the continued rapid growth in network installations and expansions often requires that less experienced personnel be made responsible for administration, and as such, the analysis process is further complicated and degraded in quality.

Another limitation with conventional tools that perform a very limited degree of real intelligent analysis (as opposed to merely capturing data) do not support numerous data transmission technologies (including several emerging and popular technologies) such as FC. FC is a general name for an integrated set of standards being developed by ANSI (American National Standards Institute) whose purpose is to act as a universal high-speed interface for computers and mass storage. It is designed to combine the best features of channels and networks, namely the simplicity and speed of channel communications and the flexibility and interconnectivity of protocol-based network communications. FC is a highly-reliable, gigabit interconnect technology that allows concurrent communications among workstations, mainframes, servers, data storage systems, and other peripherals using well-know protocols, such as Systems Interface (SCSI), Internet protocol (IP), FICON and VI protocols. FC provides interconnect systems for multiple topologies (e.g., point-to-point, switched, and arbitrated loop (FC-AL)) that can scale to a total system bandwidth on the order of terabits per second. One area in which FC has been implemented with significant success is in storage environments such as Storage Area Networks (SANs) and Network Attached Storage (NAS). However, system performance limitations may be introduced as a result of inefficient system configuration, e.g., where a legacy device on a network bus determines the overall bus speed. In such situations, intelligent analysis of the network is clearly beneficial to facilitate optimization of its configuration and/or diagnosis of faults.

Therefore, there exists a need for an intelligent analysis tool capable of efficiently and accurately analyzing various networks.

SUMMARY OF THE INVENTION

Embodiments of the present invention generally provide an expert analysis tool configured to automatically and intelligently analyze a network from a data trace obtained from at least one network analyzer strategically positioned in the network.

Embodiments of the invention further provide a software package configured as an expert analysis tool for FC, FCP-SCSI, Gigabit Ethernet, IP, TCP, FCIP and iSCSI traffic captured with a protocol analyzer. Traces from any valid Gigabit Ethernet topology or FC topology (arbitrated loop, public loop, Switch Fabric, etc.) are supported by the software package of the invention. The package is primarily designed for SCSI (FCP-SCSI and iSCSI) analysis and the transport layers that deliver SCSI data on high-speed FC and Gigabit Ethernet links, however, the package may also be used for other FC protocols (FICON, VI, IP) as well as any embedded Gigabit Ethernet protocol. Further, the package is configured to be expanded to cover essentially any desired topology or protocol. The package includes a plurality of expert analysis advanced protocol debugging and performance analysis features. In operation, the package processes collected trace data, rebuilding upper layer protocols to allow for detailed analysis of all protocols present within the trace. From the processed data, the package may present three main views of trace data. Each of these views allow for detailed error, behavioral, and statistical analysis of occurrences within the trace. These views are designed to facilitate more efficient and thorough analysis of measured components. The three views may generally be describes as a Debug View, which provides a topological layout of the network and a list of expert errors and warnings found within the trace data. The package includes over 600 implemented Error, Warning and Informational Events covering everything from violations in protocol to signaling issues. Another view is the Graph View, which presents a time based view of the trace in a single graph. Over 700 different metrics can be added to the graph to allow for analysis of behaviors and performance of devices. The measurements allow for detailed analysis of single pairs of devices. The user can drill into the trace through simple zooming techniques to further identify behaviors in the trace. Another view is the Report view, which presents summary and detailed reports showing behavior throughout the entire trace or current zoom within the trace. This view can also produce pending exchange reports detailing FC, FCP-SCSI, TCP, and iSCSI open conversations for any location within a trace.

Embodiments of the invention may further provide a method for determining errors and metrics in a computer network. The method includes positioning an analyzer in communication with the network, capturing a data trace of the network with the analyzer, determining a network device topology from a first processing of the data trace, building user layer protocols using a second processing of the data trace and the determined device topology, determining errors in the network device topology using protocol experts applied to the user layer protocols in conjunction with the determined device topology, and displaying at least one of the device topology and the determined errors to a user.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

FIG. 1 illustrates a general system architecture plan for an embodiment of the SANMetrics software package

FIG. 3 illustrates an exemplary GUI for the topology detection process.

FIG. 8 illustrates another exemplary debug view of the GUI of the invention.

DETAILED DESCRIPTION OF THE PREFERRED EMBODIMENTS

Definitions

Figure 2:
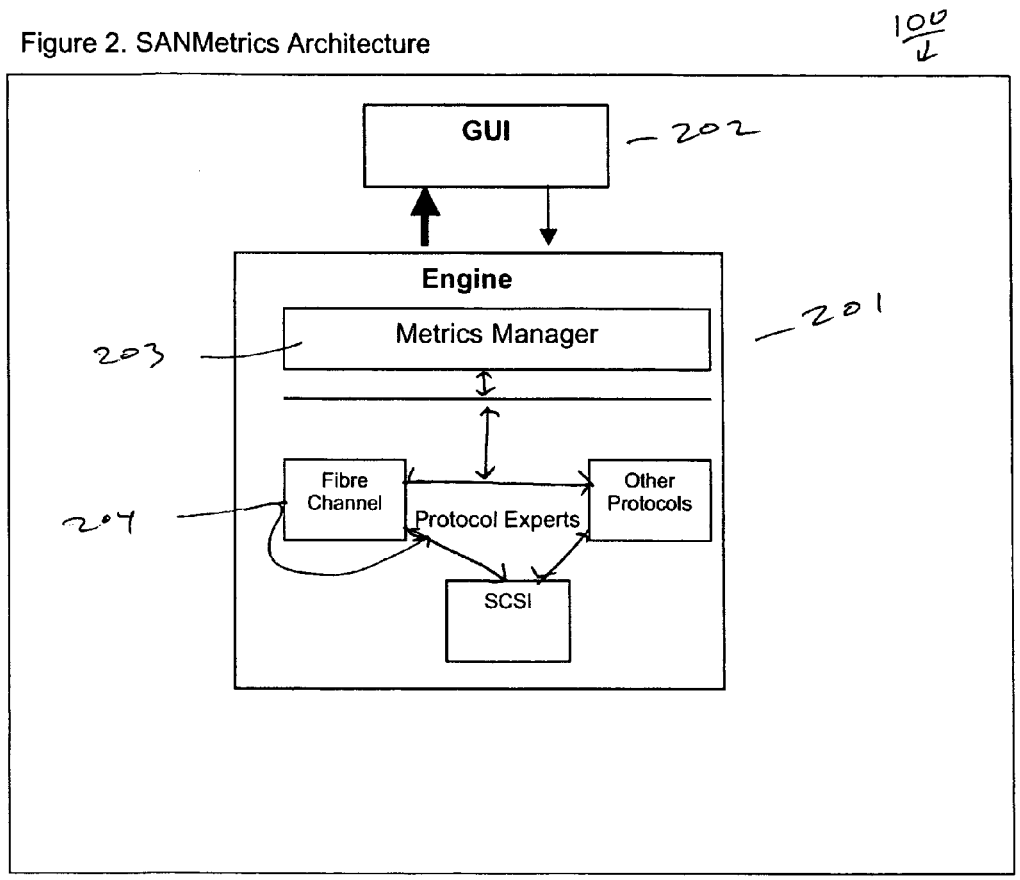
FIG. 2 illustrates an exemplary architecture for the SANMetrics package.

Prior to discussing embodiments of the invention, it may be helpful to establish some definitions for terms used in the network analysis art. The following definitions are applicable to embodiments of the invention: frame, CONTEXT [Fibre Channel], An ordered vector of words that is the basic unit of data transmission in a Fibre Channel network. A Fibre Channel frame consists of a Start of Frame Word (SOF) (40 bits); a Frame Header (8 Words or 320 bits); data (0 to 524 Words or 0 to 2192 ten bit encoded bytes; a CRC (One Word or 40 bits);

and an End of Frame (EOF) (40 bits). cf. data frame; frame content, CONTEXT [Fibre Channel], The information contained in a frame between its Start-of-Frame and End-of-Frame delimiters, excluding the delimiters; FC-1, CONTEXT [Fibre Channel], The Fibre Channel protocol level that encompasses 8B/10B encoding, and transmission protocol. Specified in FC-PH; FC-2, CONTEXT [Fibre Channel], The Fibre Channel protocol level that encompasses signaling protocol rules and the organization of data into frames, sequences, and exchanges. Specified in FC-PH; FC-3, CONTEXT [Fibre Channel], The Fibre Channel protocol level that encompasses common services between FC-2 and FC-4. FC-3 contains no services in most implementations; FC-4, CONTEXT [Fibre Channel], The Fibre Channel protocol level that encompasses the mapping of upper layer protocols (ULP) such as IP and SCSI to lower protocol layers (FC-0 through FC-3). For example, the mapping of SCSI commands is an FC-4 ULP that defines the control interface between computers and storage; Channel, [storage], The electrical circuits that sense or cause the state changes in recording media and convert between those state changes and electrical signals that can be interpreted as data bits; [I/O], Synonym for I/O bus. The term channel has other meanings in other branches of computer technology. The definitions given here are commonly used when discussing storage and networking. cf. device channel, device I/O bus, I/O bus, host I/O bus; I/O bus, Any path used to transfer data and control information between components of an I/O subsystem. An I/O bus consists of wiring (either cable or back plane), connectors, and all associated electrical drivers, receivers, transducers, and other required electronic components. I/O buses are typically optimized for the transfer of data, and tend to support more restricted configurations than networks. In this book, an I/O bus that connects a host computer's host bus adapter to intelligent storage controllers or devices is called a host I/O bus. An I/O bus that connects storage controllers or host I/O bus adapters to devices is called a device I/O bus. cf. channel, device channel, device I/O bus, host I/O bus, network; I/O adapter, An adapter that converts between the timing and protocol requirements of an intelligent device's memory bus and those of an I/O bus or network. In the context of storage subsystems, I/O adapters are contrasted with embedded storage controllers, which not only adapt between buses, but also perform transformations such as device fan-out, data caching, and RAID, Synonym for host bus adapter; Port, An I/O adapter used to connect an intelligent device (node) to an I/O bus or network, [storage subsystems] Synonym for the head end of a device I/O bus containing the arbitration logic; Port ID, CONTEXT [Fibre Channel], A unique 24 bit address assigned to an N_Port. There may be at most 2^24 or 16.7 million N_Ports in a single Fibre Channel fabric. There may be at most 127 NL_Ports in a single loop. For point to point (N_Port to N_Port) connection, there are only 2. In some implementations, a device's Port ID is derived from its World Wide Name. In other cases Port ID's are permanently assigned in association with specific physical ports. Port ID's may or may not survive a Loop Initialization Process or in the case of a switched fabric, a reconfiguration of the Fibre Channel switch; N_Port, CONTEXT [Fibre Channel], A port that connects a node to a fabric or to another node. Nodes' N_Ports connect to fabrics' F_Ports or to other nodes' N_Ports. N_Ports handle creation, detection, and flow of message units to and from the connected systems. N_Ports are end points in point to point links. E_Port, F_Port, FL_Port, G_Port, L_Port, NL_Port; FL_Port, CONTEXT [Fibre Channel], A port that is part of a Fibre Channel fabric. An FL_Port on a Fibre Channel fabric connects to an arbitrated loop. Nodes on the loop use NL_Ports to connect to the loop. NL_Ports give nodes on a loop access to nodes on the fabric to which the loop's FL_Port is attached. E_Port, F_Port, G_Port, L_Port, N_Port, NL_Port; E_Port, CONTEXT [Fibre Channel], An expansion port on a Fibre Channel switch. E_Ports are used to link multiple Fibre Channel switches together into a fabric. F_Port, FL_Port, G_Port, L_Port, N_Port, NL_Port; F_Port, CONTEXT [Fibre Channel], A port that is part of a Fibre Channel fabric. An F_Port on a Fibre Channel fabric connects to a node's N_Port. F_Ports are frame routing ports, and are insensitive to higher level protocols. E_Port, FL_Port, G_Port, L_Port, N_Port, NL_Port, The Link_Control_Facility within a fabric which attaches to an N_Port through a link. An N_Port uses a well-known address (hex 'FFFFFE') to address the F_Port attached to it; G_Port, CONTEXT [Fibre Channel], A port on a Fibre Channel switch that can function either as an F_Port or as an E_Port. The functionality of a G_Port is determined during port login. A G_Port functions as an F_Port when connected to a N_Port, and as an E_Port when connected to an E_Port. cf. E_Port, F_Port, FL_Port, L_Port, N_Port, NL_Port, L_Port, CONTEXT [Fibre Channel], A port used to connect a node to a Fibre Channel arbitrated loop. cf. E_Port, F_Port, FL_Port, G_Port, N_Port, NL_Port; NL_Port, CONTEXT [Fibre Channel], A port specific to Fibre Channel Arbitrated Loop. An NL_Port has the same functional, logical, and message handling capability as an N_Port, but connects to an arbitrated loop rather than to a fabric. Some implementations can function either as N_Ports or as NL_Ports depending on the network to which they are connected. An NL_Port must replicate frames and pass them on when in passive loop mode. cf. E_Port, F_Port, FL_Port, G_Port, N_Port; node, CONTEXT [Network] [Storage System], An addressable entity connected to an I/O bus or network. Used primarily to refer to computers, storage devices, and storage subsystems. The component of a node that connects to the bus or network is a port; logical unit, CONTEXT [SCSI], The entity within a SCSI target that executes I/O commands. SCSI I/O commands are sent to a target and executed by a logical unit within that target. A SCSI physical disk typically has a single logical unit. Tape drives and array controllers may incorporate multiple logical units to which I/O commands can be addressed. Each logical unit exported by an array controller corresponds to a virtual disk. cf. LUN, target, target ID; initiator, The system component that originates an I/O command over an I/O bus or network. I/O adapters, network interface cards, and intelligent controller device I/O bus control ASICs are typical initiators. cf. LUN, originator, target, target ID; target, CONTEXT [SCSI], The system component that receives a SCSI I/O command. cf. initiator, LUN, target ID; target ID, CONTEXT [SCSI], The SCSI bus address of a target device or controller; topology, The logical layout of the components of a computer system or network and their interconnections. Topology deals with questions of what components are directly connected to other components from the standpoint of being able to communicate. It does not deal with questions of physical location of components or interconnecting cables; exchange, CONTEXT [Fibre Channel], A set of one or more non-concurrent related sequences passing between a pair of Fibre Channel ports. An exchange encapsulates a "conversation" such as a SCSI task or an IP exchange. Exchanges may be bi-directional and may be short or long lived. The parties to an exchange are identified by an Originator Exchange Identifier (OX_ID) and a Responder Exchange Identifier (RX_ID); originator, CONTEXT [Fibre Channel], The party initiating an exchange.

General Overview

SANMetrics is a software product that analyzes captured network trace data and provides the user with expert information based on the processed data. The information can range from user-selected metrics in a graph to expert level reports that may be used for identifying and debugging protocol errors and performance issues in the network. The SANMetrics software package may generally be described as an "expert" analysis tool for various types of network/line traffic. Although other companies are marketing analysis tools, i.e., Intel's I/O Meter, Shomiti's Surveyor, and Chariot Software's analysis program, these systems do not provide the "expert" analysis features that are at the core of the SANMetrics package. For example, the SANMetrics expert analysis program (also called omniscient analysis) essentially operates as an omniscient state machine that can take a stream of data and rebuild the upper layer protocols and analyze from the viewpoint of the endpoints and interconnections, which is a primary novelty point of the invention. This distinct different from conventionally marketed analysis systems that simply look at the data on a line-by-line basis, as line-by-line analysis techniques look at only a small portion of a data stream, and are therefore, not capable of conducting a seamless system-wide analysis involving all layers from the physical layers to the application layers.

The SANMetrics analysis package is specifically configured as an analysis tool for FC, GigE, TCP, IP, iSCSI, FCIP, FCP-SCSI and Small Computer System Interface (SCSI) traffic, which may be captured with a Finisar GT, GTX, or Xgig Analyzer system, for example. However, SANMetrics is a broadly applicable tool and is not limited to the aforementioned line traffic, and therefore, it has the capability be utilized to analyze other types of traffic, such as FICON, VI, and IP-type traffic, i.e., SANMetrics is scalable, which is another novel point of the invention.

In operation, the SANMetrics analysis package receives input from trace files, which may be saved data from a previous analyzer captures or tapped directly from trace buffers or other data sources. The trace files, which may come from various FC topologies (such as arbitrated loop, public loop, switch fabric, etc.) or Gigabit Ethernet topologies, are processed and displayed in time based graph views, topological views with an error log, or in a text based report form. The processing of FC trace files is conducted by a novel omniscient loop state machine. The overall state machine of SANMetrics operates to generate a list of potential errors and other warnings on a device-by-device basis for the network being analyzed. The topology of the network is inherently discovered during this process (SANMetrics utilizes a novel topology detection method), and elements of the network represented in the trace may be identified in a topological view, along with highlights of the discovered errors or warnings.

When a user opens a trace file using SANMetrics, it will generally conduct some pre-processing steps in order to determine the network configuration and operating environment. This phase can be avoided in future encounters with the trace if the configuration information is stored in data buffers, files, or in the trace itself. More particularly, once SANMetrics processes a trace, results of the processing may be stored in a file associated with the trace file, and as such, future analysis of the trace file can simply refer to the previously stored pre-processing results and avoid the pre-processing steps associated with a cold data trace file. Further, if the trace is remote, processing time will be dependant on the bandwidth available to transfer the data across the network for analysis. As a result, when a large trace is opened remotely, the user may have to wait a significant amount of time while the entire trace is being processed, and storing of the pre-processing information may be used to minimize the wait time.

After pre-processing, SANMetrics processes the entire trace with the protocol experts to generate an overview of the network errors, performance and selected metrics. This primary overview provides key expert information determined through analysis of the protocols embedded within the trace as well as the topological layout. An initial report is generated with any errors or warnings encountered along with a view of the topology. Areas of interest can then be identified from the overall view and selected by the user for more detailed analysis of the specified areas, i.e., areas where possible errors or warnings have been identified. When the user selects a subset of the trace (i.e., zooming or changing the analysis window), SANMetrics seeks the first event in the desired window and processes the data with a higher degree of granularity until the ending time of the selected window. This process can be repeated with increasing granularity until the user-selected timeframe is too small to produce useful data. The user can select a smaller timeframe from the metrics graph of the current window, and the user can also select a smaller or larger timeframe by typing the desired starting and ending times in a dialog box, for example.

SANMetrics can also send and receive messages to and from other applications, such as Trace View, which also provides information based on the trace data. The messages can consist of an identifier for the data source and a timestamp within that data source that refers to an event of interest. Currently this is utilized to allow SANMetrics to request Trace View to open a trace file or buffer and position/reposition the view at a specified time. SANMetrics helps the user to find areas of interest at a higher level and allows the user to go to the identified area to view more detailed events in the trace. By the same token, Trace View can request SANMetrics to open a trace and go to the time duration of interest using a similar operation. SANMetrics can also read data relating to the trace that was stored by capture software or other applications. This data can be presented to the user for cross application reference or other uses. Some examples are bookmarks stored by other applications and filters active during trace capture. SANMetrics accesses the data from trace buffers and trace files through the interface provided by the IO Layer. SANMetrics can send commands to and receive commands from peer applications that may also have access to the IO Layer. An example is SANMetrics sending a message to TraceView to open a trace file and go to a specified time stamp.

FIG. 1 illustrates a general system architecture plan for an embodiment of the SANMetrics software package. The system architecture illustrates that the SANMetrics package 100 is capable of passing commands between itself and a peer application 101 and sending commands to the SANMetrics IO layer 103. Data is also transmitted between the SANMetrics IO layer 103 and SANMetrics 100. The SANMetrics IO layer 103 is capable of sending and receiving data to/from a trace buffer 105 and/or a trace file 104. Further, the peer application IO layer is optionally capable of transmitting and receiving commands from the peer application 101, as well as SANMetrics trace file 104 and/or trace buffer 105.

FIG. 2 illustrates the SANMetrics architecture. The SANMetrics architecture is generally is divided into a GUI component 202, and an engine component 201. The GUI component 202 is generally configured to send requests to the engine 201 for data, and further, the GUI 202 receives the data that the engine 201 has calculated from a particular trace file and displays the data to the user in one of a plurality of formats.

The engine 201 consists of a metrics manager 203 and one or more protocol experts 204. The metrics manager 203 generally handles the interaction with the GUI 202 and retrieves the metrics from the appropriate protocol experts 204, which may, for example, be a FC expert, a SCSI expert, or another specific protocol expert, as generally illustrated in FIG. 2. Depending on the type of event in the trace, the payload data for the upper level protocols may be parsed to determine if the lower level protocol experts are required for further analysis. An example would be an FC frame with an SCSI command embedded therein, which would generally be passed to the FC expert first, and then on to the SCSI expert for interpretation and analysis of the embedded SCSI commands. The interface between the metrics manager and the protocol experts is configured such that additional experts for other protocols may be easily added, thus generating a scalable system capable of analyzing multiple embedded protocols.

During the initial processing stages of the trace file, the analysis software of the invention, i.e., SANMetrics, generally acquires data from a portion of a trace acquired from an analyzer, or alternatively, reads the data directly from hardware buffers or from a saved file. The data acquired from the analyzer is then intelligently analyzed for errors, fault conditions, etc., and the results are presented to the user in various user-friendly forms. The process of analyzing the trace data includes determining and maintaining states for every device on the network through the trace progression. However, the process of reviewing only a portion of a data stream, which is generally what a data trace corresponds to, includes analyzing the trace and determining the individual states for each of the devices on the network for the beginning and end times of the trace duration, i.e., characterizing and accurately assessing the network and its components for both the start and end times of the trace duration, so that the resulting analysis will yield reliable statistics representative of the network (having accurate starting and ending metrics is critical to accurate measurements). This process is generally two phase sequence, wherein the first phase includes the software opening up the trace file and identifying the configuration of the network, which includes determining whether it is an arbitrated loop, switch fabric, switch loop, etc. This phase, which also generally corresponds to the topology determination process, is an import aspect of the intelligent analysis process, as improper topology detection/determination will inevitably yield a subsequent incorrect network analysis. Therefore, by scanning for loop primitives in the trace data, for example, the software may determine if an arbitrative loop is present, determine if there are visible switch behaviors, and search for a number of hidden switch behaviors in the trace, as switches often act in stealth modes. In this situation, the software determines where the switch is, if there is a switch, and further, determines what devices are participating and what topologies are running, and whether they are running, if this is a native fabric or a loop. Once the software has determined the configuration of the network, the software then goes back and uses a loop state machine to determine which devices are actively communicating on the respective loops. The basis of the loop analysis is that the loop can have a number of devices present on the loop at any one time, but only two of the devices can be communicating on the loop at any one time. Therefore, the software also is configured to determine which devices are communicating on the loop during the trace duration. However, this determination is highly dependent upon the placement of the analyzer in the network as will be further discussed herein.

Once the software determines the topology, the software may then determine the status of each of the devices on the network. The status information may then be used to determine statistics for the respective devices and the communication characteristics, i.e., metrics of the data transmission therebetween. As such, the first phase of the software methodology is generally determination of topology, and then the second phase is when the software determines what the state of the loop is, i.e., the state of the wire. Thereafter, the software processes full capture statistics and errors messages for each device on the network.

During the state analysis portion of the software process of the invention, the software is generally taking raw events and parsing them for FC (or another selected protocol) schedules, errors, and protocol failures. The other predetermined events or occurrences that have been associated with faults, errors, or other general improper operational characteristics of the selected protocol are also identified and passed. For example, consider a general network command that may be transmitted from one device to another on a network. The software generally looks at that command and determines that the command is an open command. Thereafter, the software determines from programmed rules in the package that anytime the network has an open command, then a particular number of errors are a possibility in the remainder of the trace. For example, assuming an open command, the software package would associate the open command with a predetermined number of possible errors that may occur in association with an open command. Therefore, with the potential errors identified, the software starts running routines that correspond to (are configured to detect) the identified possible errors. Thus, the software is essentially capable of jumping forward and backward in the trace data while running the error check routines. For example, the software may locate an open command and store all of the relevant information about that open command. Then, the software may locate the next command or event that is related to the open command, i.e., another open command, and the software may indicate that the software already found an open command and has not found a corresponding close command, so the software routine determines that there is an error, since FC is generally a serial processing-type operation. Thus, for each command the software encounters, the software determined what errors may be associated with the command and then checks the trace, both forward and possibly backward, for the possible errors. As an example of the number of errors that the software of the invention is configured to determine, over 600 types of errors are determinable for various protocols. However, the software of the present invention is not limited to any particular number of errors, as the software is scalable and may have errors added thereto in order to facilitate analysis of various devices operating on various data transmission protocols.

With regard to the types of errors the software is configured to address, the software categorizes the errors into well known/defined protocol layers. FC-2 type errors, which are basically errors in the physical signaling primitives for control primitives, may be determined. Further, FC-4 type errors, which are framing and SCSI type errors, primarily upper level protocol-type errors, can also be determined by the software of the invention. The FC-2 layer errors include checks for items such as credits that are used for flow control between devices. Errors related to credits, tenancy, opens, closes, general arbitration from loop and full duplex, for example, may be handled by the software of the invention. Further, FC-4 type errors correspond to the framing, i.e., how FC type devices put a frame together for transmission are detectable. Therefore, the software is capable of determining errors in the framing, i.e., badly formed frames, badly directed frames, bad checks, and errors in CRC related content in the frame.

FCP-SCSI type errors are errors detailing behaviors in the SCSI layers and the FCP wrapping layer, such as data over-run/under-run conditions, aborted exchanges and exchange timeouts. GigE and IP errors deal with the framing and layering found in these architectures. TCP errors categorize anomalous and/or undesirable behaviors in TCP acknowledgements, connection handling and timing. iSCSI errors categorize usage anomalies in the iSCSI PDU header fields, as well as anomalous and/or undesirable behaviors in the iSCSI and SCSI protocol layers. FCIP errors categorize usage anomalies in the FCIP header fields. The software of the invention is configured to detect and analyze the data trace for each of the above mentioned errors, along with any other errors that the user desires to be programmed into the analysis program of the invention.

In further regard of the TCP, iSCSI and FCIP error types, SANMetrics utilizes omniscient processing methodologies to reassemble streaming data carried on the TCP layer to ensure accurate detection of message headers and alignments within the TCP data stream. As opposed to a single TCP initiator or target, which only has to handle a stream of data that it is acutely aware of (since it is participating in the transmission of data within the stream), SANMetrics uses many advanced techniques to locate and identify the message headers within the stream, thus allowing the processing and analysis of embedded TCP protocols, such as iSCSI and FCIP.

Additionally, the software is configured to analyze a number of transmission rates. Further, the sequences are made up of frames, so the software can look at headers on each of these frames to determine if they are error free. The software can determine if the entire exchange is completed, i.e., it got a command, got a status, and got all of the data expected to be transferred, etc. Further, the software can look at all the data transmitted and make sure it is reassembled in the proper order at the receiving end. The software can also look at an immense number of performance timings and metrics. The software can analyze the gaps between data transmissions, which is generally indicative of the various performance metrics enabled by the software package of the invention.

Therefore, the software package of the invention may generally be described as being able to accomplish three primary functions. First, is a topology detection process that is configured to provide the user with a visual overview of the entire network. Second, the software provides an intelligent analysis of the network traffic obtained from buffers on the analyzer(s) or from a saved file, in order to generate related errors and warnings that correspond to unwanted or possibly undesirable future network conditions. Third, the software of the invention provides a performance analysis engine configured to analyze the network traffic captured by the analyzer or from the buffers in order to calculate several performance metrics.

As noted above, one portion of the software is configured to analyze or look at FCP-SCSI or SCSI errors, which are generally the protocols embedded in the FC-4. SCSI (or FCP-SCSI) is somewhat of a universal language to store data, so the software processes the data in the FC-4 layer and then reassembles it in the context of the SCSI command, data, and status phases to make sure that the particular protocol layer is functioning. The software checks for events such as data errors to make sure that the command is formulated properly and data is read or written in accordance with the command. Therefore, the misbehaviors on SCSI generally run from missing data sequences, which the user would detect at the FC level.

Performance metrics monitored and/or measured by the software process of the invention generally include parameters such as data access characteristics, pending exchanges (open conversations), exchange completion timings, delay between frames, etc. Generally, there are several million potential performance metrics that may be monitored by the software of the invention. For example, the software may characterize events, such as what drive is being accessed and what offsets upon the drives are being accessed, so the user can see for a specified device or all devices whether the device is being sequentially or randomly accessed. The software can provide detailed information at a level that analyzers aren't aware of for SCSI. Analyzers traditionally only know how to decode bits on a single line (or event). For example, when SCSI is addressed to a logical unit number (LUN), only the SCSI Command phase will indicate the LUN being addressed. Subsequent conversations within the exchange (such as data and status) do not directly identify the LUN, but are mapped through a unique exchange ID. The only way to identify the LUN for the data and status phases is by tracking all of the communications following the SCSI command in relation to the exchange ID, which the software of the invention is designed to do.

In operation, the software generally goes through the trace in a sequential manner, i.e., analyzing every event in the trace from the beginning to the end. When the software is sequentially analyzing a trace to determine performance statistics behaviors on timeline, the software must determine various initial values and terminating values for the analysis duration. However, this determination is a complex undertaking, as the widow for performance analysis may be infinitely changed by the user input. Therefore, the software of the invention may be configured to determine initial and final values for various parameters within a trace window in order to present meaningful and accurate information to the user regarding the performance metrics during the sample performance duration or window. The initialization and termination process for the performance analysis window generally includes accounting for events such as carry forward and left over data, i.e., carry forward and left over data generally corresponds to data that is in the middle of the transmission or receiving stage when a performance metric window or duration is initialized or terminated. As such, the software package of the invention is configured to allocate the portion of the data transfer that has been competed at the close of the selected trace window to the performance metrics for that window, and similarly, to calculate an opposite result at the open of a trace window. This feature allows the software package of the invention to present an accurate representation of selected metrics to the user. If the carry forward and left over-types of operations were not conducted by the software package of the invention, then, for example, when a large data transmission initiates during the selected processing window and terminates just after the close of the processing window, then all of the data successfully transferred during the selected window would not be reflected in the metrics, as the operation did not complete prior to the window closing. The present invention is configured to address this deficiency in conventional analysis techniques and packages via the sample management process of the invention, which will be further discussed herein.

Topology Detection

Returning to the topology detection process, a substantial amount of the data being transmitted through a network is time-stamped as it is transmitted and received. Therefore, through thorough analysis of the events at and around the timestamps, the software can look at the sequence of the data and determine a substantial portion, if not all, of the network topology. For example, the software can use the time stamped information to identify whether there is a switch or not. There are two techniques the software uses to identify whether a switch is present on a particular port or not. The first technique is by looking at how the source and destination address switches uniquely populate fields in the source destination addresses with what the software calls a zone address. The software can also look for loop primitives to determine if the there are loops on the network, i.e., the software is essentially counts what components are receiving data and makes an inference saying that if it hasn't seen any loop primitives, which are, for example, when the software sees one device communicating with three or four different devices while changing addresses, then there is likely a switch in the network, since the only way devices can do this type of operations by having a switch positioned between the devices. For example, if one device is talking to another device on a network using loop primitives and there is only one address for each device, then there will generally not be any switches. So if the one device is communicating with multiple devices using less addresses than the number of devices being communicated with, then the software logically determines that there is likely a switch between the devices that allows this type of communication with less addresses than the number of devices communicating. Loop switches are probably the most problematic or the biggest overhead portion of topology detection processes. For example, there are stealth switches, public loops, and public loops where there is no switch involved. A public loop is easy to identify, because it uses a fairly well-defined set of rules (FC-FLA) and a device id and a local id for it's arbitrations, it's opens, it's closes, and it uses a stack id, so the software can generally determine which channel the device is receiving on and which channel the device is transmitting on. Therefore, through analysis of these time stamped events, the software may determine where switches are positioned.

More particularly, there are primitives that are generally referred to as ordered sets. For example, these ordered sets may generally correspond to devices claiming and utilizing network resources, and then releasing the resources once the device is finished with the resources. The releasing process allows the next device to claim and utilize the resources. Therefore, applying the present invention to these processes, an analyzer will show all of these claiming, utilizing, and releasing events, and further, use these claims, utilizations, and releases to determine what devices are present on the network.

With regard to detection of public loop switches in the topology detection process of the invention, there are a set of well defined behaviors for the public loop switches that are generally detectable by the software of the invention. Further, since there generally will be only one public loop switch on a loop, once the software finds a public loop switch on a loop, the detection process is generally terminated or completed with regard to looking for more public loop switches. Stealth loop switches generally act the same as public loop switches, except that these loop switches essentially try to hide the fact that they are switch. The software of the invention determines the presence of a stealth loop in a network by detecting an arbitration one address and an open on another address. Another method for detecting a stealth loop switch is to detect an open with one address and a send frame from multiple different addresses within the same previously detected open command.

With these general principles, the general topology detection method of the invention includes determining if there are any switches, which may be accomplished first. If there is a switch, then the channel may be determined, since there could be switches on one or both channels that have their own topology. As such, the software generally determines the presence of a loop, i.e., loop or not loop, before determining the presence of switches. Further, if there is a loop, then the software also determines that there can only be one switch. The software also determines what channel the switch is on.

If there is not a loop, then general network architecture determines that there can be switches on both channels. Thus, the not loop determination is substantially more involved than the loop determination. For example, in a not loop determination, the software starts analyzing the trace in a brute force manner looking for loop primitives. These brute force analysis type techniques are generally accomplished by one or more preprocessing routines configured to determine where the switches are and what type they are. However, if the trace only encompasses a short duration of data/time, and nowhere during that time does the software encounter a loop primitive, then the software default is to determine that there is a switch. The software allows the user to override the program and input parameters that may not be determined by the analysis, i.e., the software allows the user to input devices that may not be discovered by the topology detection process, and thereafter the software will include the inputted device(s) in the analysis calculations.

However, if the software doesn't discover a network element, i.e., a loop, and defaults to a switch configuration, than the software has a short cut when the software does determine the topology, i.e., through user input or further analysis. For example, the software may save this information in the trace file or other associated data file so that subsequent analysis runs will have access to the information and will not require duplicate preprocessing or input steps. Therefore, in the topology detection processes, if there is a loop determined, then the software knows there is only one switch. However, if there is not a loop then there can be multiple switches, so the next step in the topology determination process in this situation would be to look at the switches, assuming the software is not in the not loop branch. In this situation the software looks at the source, destination, transmit, and receive parameters in order to determine loop switches, stealth public loops, and private loops. Once these are determined, the software determines which channel they are on. For example, the software generally stores the public loop switch or stealth switch information, and therefore, the software now simply looks for any of these behaviors, and then once the software determines the switches, then the final step of the topology detection is to build a topology display for the user.

A network does not have to have a loop, however, if the network doesn't have a loop, then it will generally have a switch. With this known, the topology detection process of the invention determines if there is a switch on one or two ports. For example, when the user activates the program on a particular trace file, and the software has not seen loop primitives, i.e., if the software looks between point A communicating with point B and there are no loop primitives, all the software knows is A is on channel 1 and B is on channel 2. If this type of communication is all that the software observes during the trace, then the software has no way to determine where the switch is, because there is nothing to clue the software in, i.e., no shifts, etc., and therefore, the software has no idea if there is a switch there. Practically speaking, it could be two devices just talking to each in some proprietary format. So what the software does in this situation is to declare both channels to have the switch. So for safeties sake, if the software doesn't detect a switch, the software just determines that there is a switch there, so the software is describing two buffers between two phantom devices that the software doesn't know about. The software can still measure them, whether or not the switch is there, and it can figure out exactly what it needs to do statistical standpoints and from buffer behaviors standpoint.

For example, the software gets device A on channel 1 talking to device B and C on Channel 2. The software sees a frame go to device A, then a frame go to device B from A to B, and then a frame from A to C. Assuming no ARB primitives and no changes in flow controls between the frames, the software will be able to determine that there is a switch on channel B, because its implied by FC when nodes are communicating without a loop, then there can only be two devices communicating, one device and a switch, or the one device and another device. So by fitting this A to B and A to C back to back, the software is able to determine from the captured primitives that there are two devices, and as such, the software is able to determine that there has to be a switch on channel 2.

During the topology building process, the software is generally not looking for processing errors in the stream of data. Therefore, once the topology determination process is completed, the software returns to the beginning of the trace data and starts processing the trace for errors. During this pass through the trace data the software will see each device previously detected in the topology detection process and associate the commands from the trace with the specific devices determined in the topology detection process. The software will therefore recognize each device, learn the properties of the device, and track the state of each device as the trace progresses. The properties and topology for each device are collected (i.e. Initiator, Target, participating protocols, MAC/WWN values, etc.) and the software stores the properties into a topology node. The software keeps building up this topology node and uses this information to report various metrics and errors to the user. Further, the topology information determined for the trace is generally stored with the trace data, and therefore, subsequent analysis runs of the trace data do not require re-determination of the topology. Rather, the stored topology may be read and utilized, which increases the efficiency of the present analysis package. Alternatively, the topology data may be rebuilt every time the trace data is utilized.

Returning to the discussion of the built topology, the software of the present invention does not require the user to actually interpret and drag a switch around and put it in and actually manually build the topology, as conventional software packages do. The conventional packages generally do not ever build a topology out of what the determine, rather, they just list a table of nodes and require a user to configure them into something that looks like the hardware that the user actually sees. The software package of the present invention exceeds the conventional analysis tools, as the software package of the invention actually intelligently analyzes the trace data and builds a graphical topology representation for the user, generally without requiring user input. Therefore, if the software of the invention determines that a switch is present, for example, then the software will generate a switch topology node, and thereafter, the software will arrange it in the analyzers perspective for the user to view graphically on a screen or display. Conventional analysis packages are not capable of this process. The software of the present invention is generally looking in from a serially captured analyzer perspective (i.e. one transmit and one receive wire are captured), and therefore, the software is capable of presenting information to the user on a channel specific basis.

Additionally, the software of the present invention uses an inbound type of analysis and topology detection process, which is generally distinct from conventional analysis programs that are generally outbound-type analysis tools. By way of definition, inbound and outbound generally refers to the software looking at the FC stream and the actual protocol that is running and determining omnisciently from just an omniscient view point of what is going on in the data stream, which is generally referred to as inbound. Alternatively, outbound generally refers to when the software is told what elements are present on the network before undertaking the analysis of the network.

With regard to the analysis program of the present invention, there are at least two reasons why the topology detection processes are important to the operation of the analysis program. For example, first, a data trace is very technical, it is a large quantity of raw data, i.e., generally thousands or millions of entries, mostly commands, in a string that has essentially no organization other than the commands/entries are in chronological (time ascending) order. Conventionally, network analysis would include capturing a data trace and sending the trace off to an engineer for analysis. However, the engineer is generally not one that is familiar with the network, and therefore, the engineer has little or no information about network connections, functionality, or topology, which makes the engineers analysis extremely difficult. The topological view provides a key visual acuity to users that are unfamiliar with the topology of the analyzed network. Second, for example, the topology detection process of the invention helps with identifying the location of detected errors, i.e., when the software determines an error in the data trace, the software can flag the nodes containing or contributing to the error. This again minimizes troubleshooting and repair time, as the network administrator or engineer can go right to the node where the problem or error was found and address the issue without having to search through each device on the network for the cause of the error, as with conventional analysis programs and process. Thus, conventional troubleshooting or process of elimination techniques that were used to find the location of errors has been eliminated by the intelligent analysis software package of the invention.

The software's topology detection process is configured to generate and present a substantial amount of information to the user relative to the network devices, location, interconnection, etc. For example, the topology detection process of the invention is configured to determine the device type for each device on the network. Example device types include storage devices, which respond to exchanges in SCSI, initiators, which initiate new exchanges in SCSI, hubs, switches, RAID or routers, which are front end devices for any number of storage devices, brides or gateways, processors, memory devices, etc. The topology detection process is also configured to determine the type of fabric for the network. For example, the software is configured to analyze the fabric ID/AL_PA, which is generally the source and destination ID to determine if a switch is present. If this is greater than 0×ef, then the software may determine that a switch is present. If the ID is |0×FFFF00=neutral disparity character, then this is generally a loop address, otherwise it is a switched fabric. The software is also configured to determine the running topology. For example, the software may determine if the network is L_Port, N_Port, NL_Port, FL_Port, F_Port, E_Port, etc. The software may further determine the World Wide Name (WWN), i.e., PLOGI, FLOGI, ADISC, PDISC, etc. The software may further analyze SCSI inquiry data and from this derive vendor identification, product identification, product revision level, or the peripheral qualifier, for example. The following table (Table I) elaborates on the peripheral qualifier information as presented in the SCSI Architectural Model (SAM) documentation.

TABLE I

| Qualifier | Description |
| --- | --- |
| 000b | The specified peripheral device type is currently connected to this logical unit. If the target cannot determine whether or not a physical device is currently connected it shall also use this peripheral qualifier when returning the INQUIRY data. Note: This peripheral qualifier does not imply that the device is ready for access by the initiator. |
| 001b | The target is capable of supporting the specified peripheral device type on this logical unit, however the physical device is not currently connected to this logical unit. |
| 011b | The target is not capable of supporting a physical device on this logical unit. For this peripheral qualifier the peripheral device type shall be set to 1Fh to provide compatibility with previous versions of SCSI. All other peripheral device type values are reserved for this peripheral qualifier. |
| 1XXb | Vendor specific. |
| 00h | Direct access device (e.g., magnetic disk) |
| 01h | Sequential access device (e.g., magnetic tape) |
| 02h | Printer device |
| 03h | Processing device |
| 04h | write once device (e.g., some optical disks) |
| 05h | CD ROM device |
| 06h | Scanner device |
| 07h | Optical memory device (e.g., some optical disks) |
| 08h | Medium Changer device (e.g., jukeboxes) |
| 09h | Communications device |
| 0Ah-0Bh | Defined by ASC IT8 (Graphic Arts Pre-Press Devices) |

The software is also configured to present the detected topology to the user in several unique data formats. For example, the software program of the invention is configured to display the detected topology in a graphical form (topology detection view) that illustrates each node or device in the network. Further, the topology detection view is configured to list the errors and warnings (further discussed herein) that were identified and generated in the analysis process (generally conducted separately (and subsequently) from the topology detection process), while graphically indicating a location on the network the caused each error or warning. Further, the user can scroll to a particular error, click on the error, and the software links to detailed information about the node and the error, as well as graphically illustrating the node and the error to the user. Errors may be color coded by the software for differentiation to the user.

Figure 4:
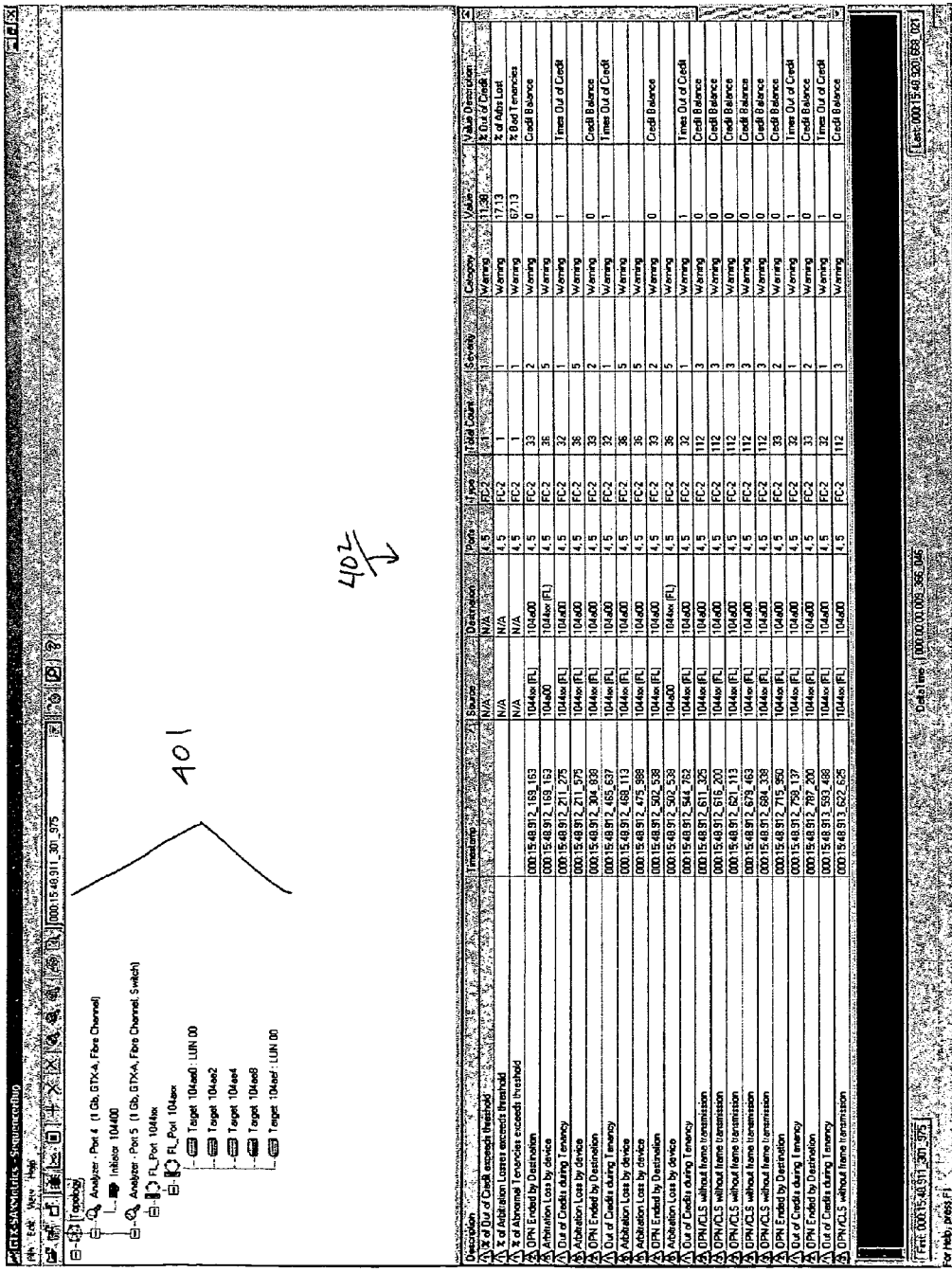
FIG. 4 illustrates another exemplary GUI 400 for the topology detection process.

FIG. 3 illustrates an exemplary GUI 300 for the topology detection process, which will be further discussed herein. GUI 300 illustrates the determined topology 301 in a tree form. Each node or device on the network is listed, i.e., the analyzer on 1-A, initiator 01, the analyzer on 1-B, target BC, and target EF. GUI 300 also illustrates an errors and warnings list 302 for the topology. The errors and warnings list is the result of the software's intelligent analysis process, and generally includes an error or warning description 305, a timestamp 306 of when the error occurred, a severity rating 303 of the error or warning, and a categorization 304 of the indication as either an error or a warning. The error and warnings list may further include information such as source, destination, ports, type, counts, values, and any other network parameters that the user would like to be displayed in troubleshooting the network. Additionally, the errors and warnings section 302 includes a graphical view 307. The graphical view can be used to indicate where in the data trace, i.e., time wise, the error or warning took place. For example, when error 309 is selected or highlighted by the user, the software program indicates in the graphical view where the error is located, as generally represented by 308. FIG. 4 illustrates another exemplary GUI 400 for another topology detection process, wherein GUI 400 is based upon a different trace file than the GUI illustrated in FIG. 3. However, in similar fashion to GUI 300, GUI 400 includes a topology detection representation 401 and an errors and warnings listing 402 that is representative of the software packages intelligent analysis of the trace file. In the topology detection section 401, GUI 400 illustrates that an analyzer on port 4 is present and an initiator labeled 10440 is present. Additionally the analyzer on port 5 shows a loop labeled FL_Port 104axx having another loop below it in the tree, wherein the second loop has five targets associated therewith. The errors and warnings section includes generally the same type of information that is represented in GUI 300, i.e., the results of the software program's intelligent analysis. The GUIs of FIGS. 3 and 4 will be further discussed herein.

Omniscient Loop State Machine & Sample Management

Generally, the analyzer used in conjunction with the analysis program of the invention is a protocol analyzer. Protocol analyzers generally compress or truncate a series or sequence of events down into a single event for purposes of analysis. For example, if a protocol analyzer encounters a stream of idles on FC that could be one second long, then it will generally compress the stream into a single idle event having a duration that is equal to the string of individual idle events. A protocol analyzer allows the software to capture enormous traces or short traces and not ever know what kind of scale is useful. In this situation, the software determines a workable scale that makes sense across the time frame of the sampled trace. To do so, the software allows a user to define the scale from a number of plot points, which the software then scales for presentation and analysis. However, this process then allows the events in the selected trace window to carry over several sample windows, which means that the software accounts for carry over in the statistics or metrics.

For example, when the user wants to look at a specific time period of the overall data trace, then the sample management portion of the software goes out and looks at this starting point of the selected window and the ending point of the ending point of the selected window to determine initial values for the selected time period, i.e., initialize the analysis program at the start time of the selected trace duration. More particularly, the software determines what the state of each device on the network is up to the starting point of the selected trace duration, which inherently involves splitting several parameters over the start line, as not every parameter is easily determined or quantified at a specific time as a result of pending operations at that time. Thus, the software may generally keep the loop open to account for frames in transmission over the initialization of the selected window.

The sample management performed by the invention provides the novel ability to produce meaningful and accurate metrics that are based upon events that are completely outside of the bounds of the analysis window. This is accomplished by the ability of SANMetrics to take a snapshot of time at the boundary edge of a sample (a plot point) and be able to recreate the exact state at that instant in time for all of the measured protocols—including events that have lingering side-effect or are long lasting and thus not "visible" at the start of the state. For example, an exchange of information begins at a timestamp of 1 second. The conversation (exchange), however, ends at 10 seconds in the trace. If the user has currently restricted the current analysis window (or timeframe) to the time from 5 seconds to 15 seconds, the sample management ensures that the conversation that began at 1 second is still handled, measured and analyzed. The sample management handles states from virtually every protocol supported by SANMetrics, including everything from FC-2 credit analysis to iSCSI Exchange Completion Timing. This allows the user to arbitrarily select a timeframe for analysis and maintain exact statistical and expert measurements for the events within the new analysis window.

When the user selects a new analysis window timeframe that does not align exactly with a pre-determined snapshot of time made by the sample management, the sample manager performs additional steps necessary to recreate the state at the start of the user requested time. It does this by identifying the closest earlier snapshot in time and retrieves all events that occur between the user time and the snapshot time and process them to advance the state up to the requested user time.

Looking at TCP handling provides a good example of sample management. The TCP frame engine generally keeps track of the user selected window or the sliding window and the sequence/ACK offset between two TCP ports. TCP devices use this as a flow control. Each frame contains a sequence number (the highest byte count transmitted by the S_ID), an ACK number (the highest byte count correctly received by the D_ID) and a sliding window value (the number of bytes available to receive from the D_ID). The frame engine uses these to find missing frames and overruns, as well as retransmissions. Using sample management techniques, virtually any timestamp in the trace can be analyzed with accurate knowledge of the current window and ACK offset, which is required to maintain accurate behavior of the TCP state machine.

An example of FC sample management also shows the flexibility and usefulness of the technique. The software will generally only count FC tenancies up front in the sample at the curve unit, but the statistics for the tenancy at what aspect curve in the tenancy, the software counted to end of it, so there may be hundreds or thousands of frames in those tenancies. As soon as the software cuts up the sample, in an arbitrary period of time nothing of having to do with data, the software has to have a way to represent performance and behavior of information at a point in time, and in particular, at the start time of the sample window. So some things flow within the samples, and the user can look at data rate, this is just a number of bytes that are transmitted in that sample, but most of the time this starts in the FC-, FC-2 and SCSI protocols going through their own behavior sequence start.

State Machine

The state machine generally functions to determine the status of devices, and in particular, the loops and protocols present in the network. More particularly, the state machine is configured to determine the status of loops and protocols on the network at the time the sample window is initialized. Although the state machine may be configured to determine status of devices for several protocols, the discussion of the present software package will generally be directed toward an FC state machine. However, the invention is not intended to be limited to any particular protocol in the application of the state machine, as one of ordinary skill in the art would recognize how to apply the state machine described herein to various other protocols. The FC loop state machine embedded into the software of the invention generally uses an algorithm to determine the status of devices at a predetermined interval in the trade data. For example, the state machine may be configured to determine where the loop is and to figure out at what point the loop closes, while also analyzing the arbitrations that open and close the communication line. However, this process is complicated by the fact that the generally software does not know where the analyzer is located in the network. For example, assume the software has devices 1 and 2 and 3 and 4 and the software positions an analyzer between 1 and 2 and between 3 and 4. Schematically, this may be represented in a circle, wherein 1 and 2 are on one half of the circle, and 3 and 4 are positioned on another half of the circle. Therefore, when 2 talks to 1, the software sees an open on the $1^{st}$ analyzer port and the software sees the same open on the $2^{nd}$ analyzer port at a different time. In this analyzer configuration the software will only see half of the conversation, because if 1 actually talks to 2 in that fashion, then the software will never even see it on the analyzer, as it will be consumed pulled off of the line before reaching the analyzer positioned by the receiving device (on the backside thereof). Thus, the loop is essentially unreadable for devices 1 and 2, but the software has to maintain the information, because there still may interesting things to use between 2 and 4, 1 and 4, and 1 and 3. Thus, when the software sees 2 talking to 1, the software discards the count as a failed open and discards any frames that are seen between that period of time until the software see the close command. Then if the software sees an open from 2 to 4, or 1 to 4, or 1 to 3, then all of sudden the software is tracking the entire process as opposed to throwing away what is in the middle. In sum, the software of the invention is generally configured to parse out data that cannot be analyzed with 100% certainty, i.e., data that is not accurately captured by a optimally positioned analyzer. Thus, the software essentially goes through and actually throws away (filters) all of the data that cannot be accurately analyzed as a result of the analyzer position. This provides the user the unique ability to only focus analysis only on valid communications occurring in the loop or network.

The frame machine generally operates to validate the data sent or written to a particular device when the data is read back from the device. Therefore, if the data has lost integrity during the read and write process, the frame machine will not validate the data and generate and error that is to be presented to the user. Similarly, the state machine can generate it is own errors and one of those errors could be that the user has one or more analyzers incorrectly positioned.

Returning to the discussion of pending exchanges, SCSI is a bi-directional protocol, and therefore, if the software sends the user something and asks for data, the reply is to send the data back with a trailing message saying that the software has sent the requested data. This generally amounts to a handshaking operation. This process is bidirectional, so if the software is looking at only frames on loop A, for example, then the software may only view half of the total SCSI handshaking operations. For example, the software may see only the commands or only the status responses, which would be indicative of an error (assuming that the software was properly viewing the messages from a proper analyzer positioning). Therefore it is critically important for protocol analysis to have an access set of data that depicts the bidirectional communication stream. Further, in addition to insuring that both sides of the handshaking operations are viewed by the analyzer, proper positioning of the analyzer also insures that the software has the ability to maintain accurate metric information. For example, if the analyzer is improperly positioned, then the software will not be able to accurately monitor frame transmission parameters, such as transmission rates, etc.

Errors and Warnings

As the trace is processed, SANMetrics accumulates a list of potential errors and other warnings that it discovers in the trace. The topology of the network is discovered and elements of the network in the trace are identified in a topological view, along with highlights of errors or warnings related to network performance. The errors and warnings are generally programmed into the software package such that during the analysis of a data trace the software package of the invention essentially checks for each and every error that the package is programmed to analyze for. More particularly, for example, in order for error A to occur, the software package knows that event B must first occur. As such, anytime event B occurs in a trace, the software package initiates a routine that is configured to check the data trace for error A. Other errors and warnings can occur at any time, and as such, the software package is continually checking for these types of errors throughout a data trace. Table II illustrates an exemplary list of errors that the software package of the invention is programmed to analyze for.

TABLE II

SAMPLE ERRORS

Multiple devices opening the loop simultaneously
Duplicate Exchange ID utilization
Out of Order sequences
Status - Residual Over/Under Run without Residual Count
TCP Window closing without advancing ACK Num
Mismatched/Illegal ARB values
ELS Frame - Bad FLOGI ACC with BBM set
Incorrect Target Transfer Tag value in PDU
Frame to different destination than open
Frame from different source than open
Transfer Ready or R2T over/under-runs
Mismatch in bytes transferred/requested in SCSI exchanges.
Reserved flags set in SCSI CDB
Mismatched FCP RDD/WRD bits
Data length mismatch from CDB and FC P_DL
Reserved flags set in Status frame
Invalid FCP_RSP fields in Status
Reserved fields in LS/BA_RJT frames
Missing sequences
Param field set on frames where it shouldn't be.
RXID field set on frames where it shouldn't be.
Incorrectly Swapped iSCSI Header Digest CRC
Good Status frame without data phase when data expected
ABTS frames set in ACK
Bad TCP Retransmission (alread ACK'ed)
Exchange - Missing or Out of Order DataSN
Command - Bad Task Management Flag(s)

In addition to the error checking, the software package of the invention is also configured to analyze the data trace for parameters that may contribute to errors or parameters that may cause network performance to suffer. As such, these parameters are generally not classified as errors, as an error has not yet occurred or has occurred previously (before the start of the trace) and the resulting behavior is abnormal for standard operating conditions. Rather, the software package of the invention classifies these parameters as warnings, and is configured to warn the user of these parameters so that future errors or network inefficiency may be avoided. Table III illustrates an exemplary list of warnings that the software package of the invention is configured to test for.

TABLE III

WARNINGS

Exchange completion time out of bounds
Data over-run or under-run in the exchange
Retransmitted sequences
High percentage of out of credit situations
High sequence interleaving and/or low sequence burst rates
Long TCP acknowledgement times
EOFa, EOFdti, EOFni, missing EOF, CRC errors, Code Violations, Loss of Sync
iSCSI Target throttle time out of bounds TABLE III-continued

WARNINGS

Arbitration loss time out of bounds
Exchanges cleared by logout or other clearing condition The software package of the invention is also configured to track a large number of metrics. These metrics are reflected in counters, which can be plotted in the graph view with totals/averages or displayed in the report view. Exemplary TCP counters include MB/second, frames/second, a user defined sample window size, and retransmissions. Exemplary IP counters include MB/sec, datagrams/sec, and fragments. However, it is to be noted that these metrics are. exemplary, and embodiments of the invention are configured to monitor and analyze essentially any metric of a network.

General Operation

The software package of the present invention is commercially known as the SANMetrics package produced by Medusa Labs of Austin, Tex., a Finisar Company. The parent company being Finisar Corporation of Sunnyvale, Calif, produces network and component data analyzers as well as optics modules and transceivers. SANMetrics for iSCSI processes Gigabit Ethernet traces, providing a limited network topology (in relation to the switch elements), Expert View, graphing capabilities, and a report view. The data provided includes basic Ethernet analysis, basic IP analysis, and very extensive TCP, iSCSI, FCIP and SCSI analysis when these protocols are embedded in the network traffic. This product enables intelligent analysis and processing of multi-analyzer traces, which may include any combination of FC with embedded SCSI or Ethernet traces with various other protocols embedded therein.

Generally speaking, the operation of the software package of the invention includes the user positioning an analyzer in the network traffic, and the analyzer operates to capture the data (bidirectional data—one direction on a first channel and a second direction on a second channel) from the network path from which it is positioned. More than one analyzer may be used to capture bidirectional trace data from various locations within a single network. This trace data provides a picture of what was occurring in that network during a particular time period. The duration of the analyzer trace is generally on the order of seconds or minutes, but may be less than a second if desired. The data acquisition process of trace is accomplished in fractions of nanoseconds, as the analysis process of the present software package will focus on individual network or component events that occur in the nanosecond and faster time duration range. In operation, typically what the user has is an at least one analyzer that will take a snapshot of the network or component traffic, and then the program package of the invention takes the snapshot information and individually looks at each event in the snapshot to determine errors or faults in the network or component operation. Thus, essentially the software package simply breaks down the snapshot into a series of identifiable steps that can be sequentially analyzed for errors, warnings, and metrics representative of the device or network performance.

The present invention is distinct from conventional network analysis devices and processes, as the software package of the present invention conducts an intelligent analysis process. More particularly, the software package of the invention essentially looks at all of the events in one or more data traces (which will generally be hundreds of thousands or millions of individual events) and ties them together in a format that is readable and comprehendible to the users. The tie together process includes identifying errors, topology, and other network functions that are extremely difficult to determine via conventional trace analysis techniques.

A key parameter in the software package of the invention accurately analyzing the data trace is the positioning of the one or more analyzers in the network topology. For example, if analyzers are poorly positioned, then the software package will have difficulty determining the presence of certain network elements. Thus, designers and network testers generally attempt to position the analyzers in strategic positions so that the user gets just the information that the user is looking for and it is easier for the user to analyze, so if the user's topology had a section A, B, and C, the user might put one analyzer between A and B, and the user might put another analyzer between B and C. Further, the user may position a third analyzer between A and C. With this positioning configuration, the plurality of analyzers are able to detect and analyze traffic for each device on the network.

Additionally, the software of the invention goes much farther than conventional analysis programs and systems in that it is an intelligent analysis engine. It doesn't just parse or decode the information from a data trace, it parses the information from the trace, determines the network topology, and then goes through the entire data trace analyzing each piece of information with a plurality of predetermined algorithms in order to determine an overall picture of a series of operations that happen and to determine any relevant errors and/or warnings related to the series of data analyzed. In addition to identifying anomalous and erroneous behaviors (errors and warnings), the software package of the invention also provides a large amount of data about how the network is performing and behaving (metrics). SANMetrics performs hundreds of measurements on different aspects of network performance which would be impractical and often times impossible (due to the shear magnitude of the data entries that would need to be processed in order to obtain an accurate metric) to do via conventional analysis techniques.

At the heart of the software is a plurality of experts, which are set up and implemented in the software and are configured to parse through relevant events to identify incorrect and/or undesirable behaviors. Generally, the experts in the software package of the invention are software routines configured to analyze data for a particular function, event, metric, error, or warning. The experts are generally applicable to a specific event or protocol. For example, based on the users setting of thresholds and other analysis parameters, i.e., parameters that determine whether the software is showing the user the errors or performance metrics, the software will incrementally step through the trace while analyzing each command with each of the experts (and generally also with network topology information) configured to generate the requested metrics, as well as to troubleshoot the particular type of network traffic. This step-wise analysis with the experts allows the software of the invention to display a plurality of performance metrics to the user. These performance metrics are valuable in determining the errors and performance deficiencies of the network or system being tested. For example, every time the software goes through a trace (in an automated fashion as compared to the one at a time-type conventional analysis), it tracks characteristics such as device arbitrations on the network, i.e., opens and closes, as well as failed opens and closes, which are generally termed losses. Thus, as an example of arbitration, essentially the software of the invention is testing to see whether all of the events are being fair, i.e., if a device has been arbitrating and has lost 85% of the time, then the software can go through the trace to see which devices were monopolizing the network resources to determine if an improper operational characteristic or network resource allocation is present.

In order to accomplish the step-wise analysis process, i.e., the expert analysis of the present invention, what the engine does is takes the first event that the software encounters in the trace (assume it is not an idle), the software then sends the event to all the experts that are related to or configured to analyze the particular first event. So when the software receives the next command (assume it is a SCSI command, for example), then that command gets sent to all the experts that handle SCSI commands. Thus, essentially the software predetermines which event needs to be fed to which expert and then the experts can look at the individual commands as they get sent to them. Further, the experts are capable of passing received commands on to other experts. For example, if an expert is passed a first command for analysis and the command includes a second protocol embedded therein, then the expert may process the portion of the command that the expert is specifically configured to process and then pass the remaining portion of the command (the unanalyzed embedded portion) to another expert specifically configured to process the unanalyzed portion of the command. Supporting the process is a section of the code that deals with each different type of event. For example, there is a section that handles the credits, there is a section that handles frames, there is a section that handles the opens and closes, etc. Therefore, every time a new event comes through, the software starts at the top level trace looking at the first event and determines what sections of the code need to process the particular event. Each section receives the command or event that needs to be analyzed and each section updates the state of the analysis.

The expert handling sections of the code are organized and coded to represent each of the given protocol layers and the interactions within the layers. This layering and modularity allows for flexible analysis of network traffic embedded within packets. Currently, layers exist to specifically handle Gigabit Ethernet (GigE), Internet Protocol (IP), Transmission Core Protocol (TCP), Internet SCSI Protocol (iSCSI), FC Over TCP/IP (FCIP), FC FC-2 and FC-4 Layers, FCP-SCSI. So, if a packet is seen that carries FCIP on GigE, experts will be applied at of the following handlers: GigE, IP, TCP, FCIP, FC-4 and FCP-SCSI. However, the invention is scaleable, and as such, various additional experts may be added to the analysis.

Each of the protocol handling sections of the code act simultaneously as both an Initiator and Target function and handles the boundary cases that are only visible to a physical analyzer on the network. No other single point of reference (i.e., from a switch port, Initiator or Target) is capable of collecting both sides of the conversations as well as the physical layer attributes of the network path. The analysis of these conversations, however, requires implementation of a great deal of code to emulate both the protocol Initiator and Target. Only by analyzing in this fashion can the experts and metrics of SANMetrics be produced. For an example, consider FCP-SCSI conversations analyzed from an arbitrary location within the network. Utilizing the topology detection and analysis mechanisms mentioned earlier, SANMetrics applies FC-2 and FC-4 analysis techniques that are applicable to the specific link analyzed, thus providing detailed credit, arbitration, tenancy, sequence, and exchange information (experts and metrics) for the FC-2 and FC-4 layers. For the Exchange information, as well as the FCP-SCSI information, detailed exchange tables must be maintained and interpreted for errors as a real Initiator would and as a real Target would. This allows the conversations (exchanges) to be rebuilt from the analyzer perspective and identify events such as physical wire errors on frames (CRC errors), routing problems (out of order frames) as well as exchange timing and behavioral parameters from both the Target and the Initiator's perspective at both the FC-4 and FCP-SCSI layers. Implied in this is also the ability to identify messages to and from the Target (such as aborted and retried exchanges) which would not be visible to the user level applications (such as SQL Server). The basic fact is that many of the measurements and anomalies mentioned above are not available or are essentially invisible to the user, thus analysis of many of these forms of errors is not capable from the upper-layer applications.

Further, the analysis package of the invention offers several graphical user interface features that provide the present invention with operational ease over extremely powerful analysis features. Hundreds of errors and warnings are checked and tracked by the software. For example, a right click on the screen and all of the potential errors and warnings are illustrated. More particularly, there are three primary views in the SANMetrics software package of the invention: Expert/Debug view, that provides the warnings, errors and topology views of the data; Graph View, which provides a time-based view of performance and behavioral information for selected devices within the topology; and Report View, which provides statistical measurements detailing of the entire processed trace or current analysis window. Additional analysis processes that the software can perform are reports to identify pending exchange information which is derived from the SANMetrics state machine. The pending exchange information details (for multiple protocols) exchanges and conversations that have started, but have not completed. If the user notices that the pending exchanges are just increasing and increasing and not closing, it gives the user the ability to pinpoint the aging exchanges along with information regarding the state of each exchange, such as number of bytes/frames transferred, expected length, etc, for example.

The software also includes the ability to receive input from multiple analyzers allowing for highly time synchronized (sub-nanosecond) analysis across multiple ports or connections within the network. This allows for correlation of errors and behaviors within the trace. Performance measurements can be plotted in Graph View from multiple data points simultaneously, allowing for analysis of rates and behaviors and direct correlation between cause and effect on performance between ports. Additionally, the sample duration of the graph view may be adjusted by the user in order to define the desired granularity displayed. For example, a plot can be made showing the relationship between out of credit situations on one analyzer port and overlaid on this plot could be the sequence burst rates output by another switch port ones the frames have been transmitted through the switch. In this example, the out of credit situations would directly correlate to the low sequence burst rate measurements on the remote switch port.

When the user opens the trace, the software automatically chooses a time period that overlaps for all the channels that are in the trace, i.e., it might be a single analyzer, which is two channels (channels are the same thing as ports), it might have 3 analyzers, so then it has 6 channels. The software determines the time period that the software has data for all of the selected channels. The software then processes this period of time as it's base analysis window. This restricts data analysis to only logically consistent, reliable and measurable traffic. Without this functionality, the user is left to manually identify this overlapping period of the trace and must understand the inner workings of the analyzer to understand why only one side of a conversation can be analyzed at the start of the trace.

Additionally, SANMetrics can control TraceView to allow for precise location of events within the trace. It can take the user directly to Trace View and relocate the current position within the trace to an event of interest (i.e. a matching timestamp of an expert error or warning event). TraceView can also control SANMetrics as necessary by forcing SANMetrics to relocate the position of the current graph to the requested TraceView timestamp. This allows for the user to utilize SANMetrics essentially as a calculator for any one of the over 700 available metrics. If a counter is plotted in the Graph View, the scale of the window (i.e. the period of time that the analysis is performed on) can be rescaled to show completion of individual events and statistics. This allows for an extremely flexible amount of user control in selecting the scale of the analysis window which allows for metrics to be viewed as overall measurements for the trace or individual measurements for an extremely microscopic timeframe (nanoseconds per sample) within the trace. For example, a user may be interested in FCP-SCSI Exchange Completion Time, which is the time from the original transmission of the SCSI Command by the Initiator to the subsequent reception of the SCSI Response from the Target. The user takes a 2 second trace of the network activity and opens the trace with SANMetrics. The analysis window in SANMetrics details the complete 2 seconds of time. Looking at the Exchange Completion Time counter in Graph View shows the Average/Maximum/Minimum values over the two second analysis time. The user may, however, be more interested in the calculation of single completion times, not the averages. The user can zoom into the trace (by changing the time extents/analysis window) where now the total time represented in the graph is 30 microseconds, thus the individual frame activity is visible and the averages only involve one instance. Now, the user can utilize TraceView to reposition this 30 microsecond analysis window automatically. This is facilitated by simply moving through TraceView until the event to be measured is found and pressing the Go To SANMetrics button or menu item. This functionality is only made possible by a key portion of the invention: the sample management.

Prior to initiating the intelligent analysis process of the invention, the analyzer must first be placed in the network to collect the trace data. However, placement of the analyzer can have a significant impact on the ability of the software package to effectively analyze the network. To collect traces that can be optimally used with SANMetrics, the analyzer must be placed in a strategic location on the network and use proper collection techniques. Several factors determine placement of an analyzer in relation to the components that are being measured. The topology of the FC environment, for example, has an impact on analyzer placement. In loop-based configurations, including arbitrated loop, public loop, or any one of a variety of the "stealth" mode loop switches, including SL_Ports and Quick Loop, as well as switched fabric configurations, N_Port and F_Port operations, whether or not the user can interrupt system level activity to include the analyzer system is a consideration in placement. If the user cannot interrupt system activity to insert the analyzer in-line, the user can use a non-disruptive "sniff" mode.

With regard to the logical view of the analyzer, the analyzer generally has two bi-directional interfaces (channels) that use GBICS to connect to copper or optical cables. Each channel runs at the bit rate of the network (nominally 1062.5 Mbits/sec). The inputs of each channel are tapped and passed through serialize/deserialize (SERDES) circuitry to synchronize on transmission characters and convert to parallel output. Encoding/Decoding circuitry (ENDEC) converts the FC transmission characters to conventional 8-bit character representations. The two character streams process data to extract frames, headers, payload, CRC, etc. This provides a time-stamped, interleaved display of the FC information received by channels A and B. Filter and Trigger logic permit traces of each channel to be captured under a variety of conditions and stored in RAM. Additionally, generally the information obtained from each channel of each analyzer is stored separately, so that the information obtained from each channel may be separated for further analysis if desired. Conventional analysis processes have included storing all trace data from each analyzer port in a single memory, which forfeits the ability of conventional processes to do analysis based upon a single port.

Figure 5:
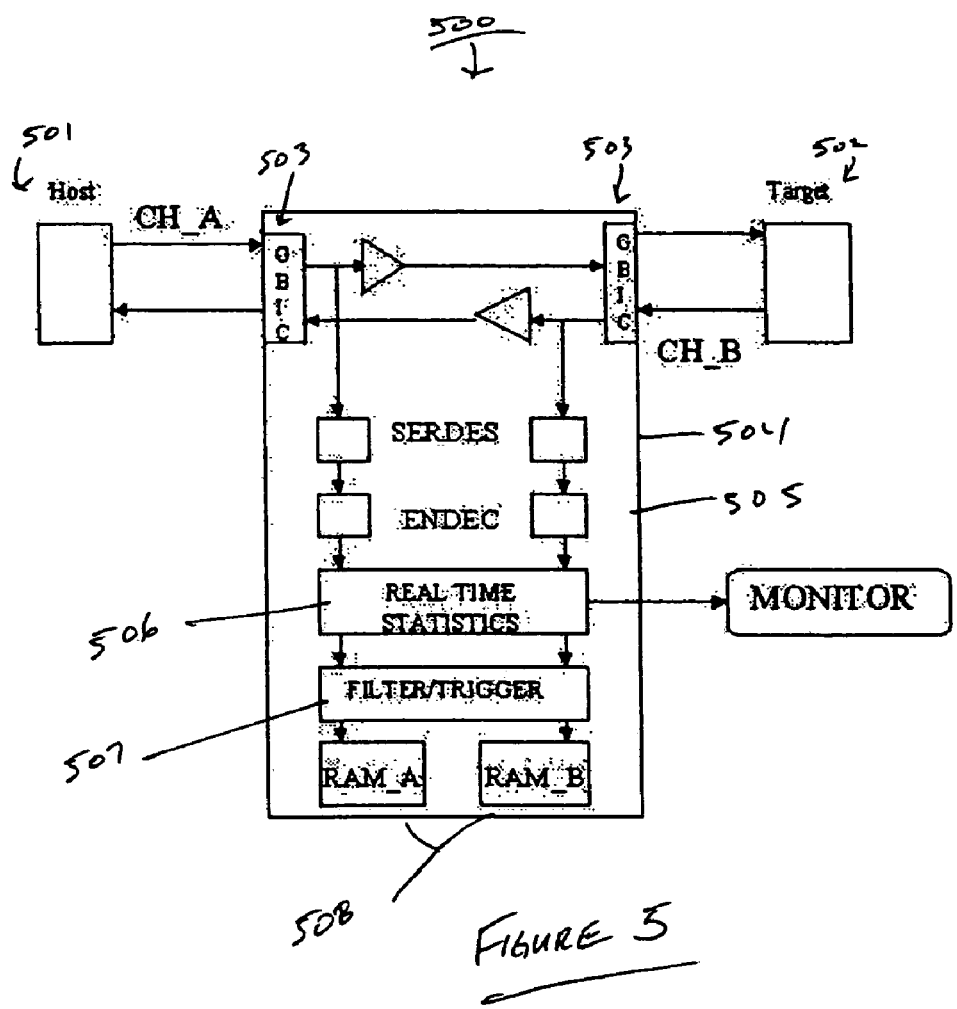
FIG. 5 illustrates an exemplary logical view of an analyzer.
Figure 6:
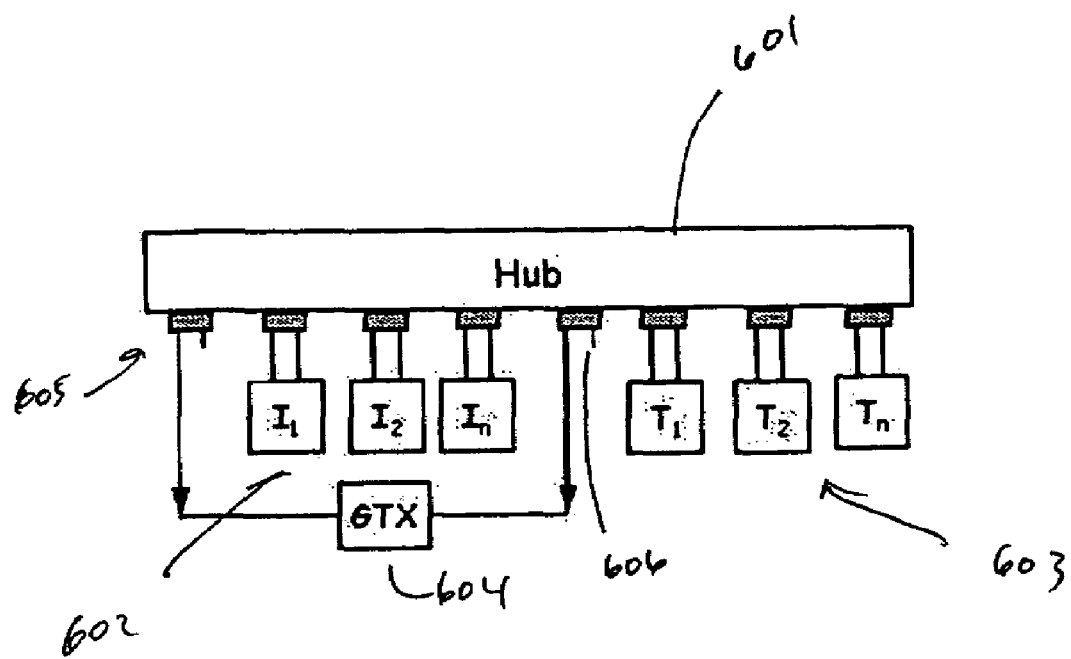
FIG. 6 illustrates how all of the initiators can be grouped together and all of the targets can be grouped together from a single hub.

FIG. 5 illustrates an exemplary logical view of an analyzer 500 that may be used to advantage in embodiments of the invention. The analyzer 500 is generally positioned between a host 501 and a target 502. The signal transmitted between host 501 and target 502 is received by a GBIC 503 in analyzer and transmitted therethrough to the destination component. The analyzer also includes SERDES 504, ENDEC 505, a statistics module 506, a filter/trigger module 507, and at least one memory module 508. Cooperatively, these elements are able to copy the data stream being transmitted therethrough without disrupting the transmitted signal. The copy of the data stream may then be exported as a data trace and used for analysis of the components involved in the data transmission process. When the trace capture and export is complete, the user can view the data using TraceView software, or save the data as files (there may be an individual data or trace file for each channel) for later analysis.

When FC components are operating in an arbitrated loop configuration, it is important that the user divide the connections into separate groups of initiators and targets and place the analyzer between the initiators and the targets. In an arbitrated loop with multiple components, the logical grouping of initiators and targets allows the analyzer to capture all information flowing from any initiator to any target and to capture all information flowing from any target to any initiator. However, it is important not to place the analyzer on only the specific component that the user wants to analyze or debug. This placement of the analyzer may seem more logical, but the results are generally unusable, as the analyzer only captures partial discussions between other initiators and/or targets, which generally cannot be filtered. When the user groups the initiators and targets logically, this problem is generally eliminated.

In order to capture and analyze accurate statistics for a component in a switched fabric environment, the user should generally place the analyzer on that component. In a switched fabric environment involving F_Port and N_Port components, the FC protocol runs as a "point-to-point" protocol; the switch (or switches) performs routing functions to complete the logical connection between components. Switched fabric operation removes most of the factors that define an arbitrated loop (tenancies, Arbitration, etc.). As such, a continuous circuit that connects all of the components is no longer needed for the analysis. Ordered sets and frames no longer transit a loop, and additional devices do not process or modify these components. Thus, when a user places the analyzer in a switched fabric environment, the ability to capture a single trace that shows all of the interactions of the participating components may be lost. In switched fabric environments, the trace data generally only includes the communications between the device and the fabric port.

Further, when the analyzer is placed in-line in a FC configuration, a very small, but measurable amount of jitter may be added into the system. In-line configurations also require that the user add cable segments and their interconnects (for example, GBICS). In cases where the only option is to place the analyzer in-line, it is best that the user halt all I/O activity between the initiators and targets before breaking the link and connecting the analyzer. After connecting the analyzer, the user might have to restart operations on the host machine, depending on the software applications that are running. As an alternative to inserting jitter into the system, the sniff configurations described herein may be implemented.

For in-line configurations, the analyzer is placed by disconnecting the initiator and placing the analyzer in series so that the analyzer(s) are logically between groups of initiators and groups of targets. All operations between the initiator and targets are halted while the loop is broken. In a multiple initiator/target capture strategy in which all of the initiators are grouped in one hub (or to a group of hubs) and all of the targets are grouped in another hub (or group of hubs), the analyzer may be placed between the two hubs that form the boundaries of the initiator and target configurations. In this configuration, the analyzer essentially replaces a section of cable that is used to form a complete loop.

In other switched fabric in-line-type configurations, the component to be measured may be connected with the analyzer in series with it. It is important to note that, in this configuration, the analyzer only captures the signals flowing to and from the component to which it is connected. So, for the configuration, only the activity from target 1 (the target connected to the switch through the analyzer) is measured. Any information flowing from the initiator to target 2 (the target directly in communication with the switch and not the analyzer) is not captured by the analyzer.

Typical FC collection techniques use non-managed hubs when in sniff mode. Non-managed hubs include hubs that do not source or replace LIP primitives or disable ports without a valid incoming signal. Ports in the hubs should be continuously transmitting without requiring input to the receiver portion of the port. In order to "sniff" the FC flow, the user should use cables that only connect to the transmit portion of a port on the hub. The single cables can be optical or electrical to suit the interfaces, as long as the user can isolate the transmitting cable from the receive cable. By connecting the analyzer at this point, the user does not have to break the physical component connection.

In order to use sniff mode for arbitrated loop technologies, there are generally one or more hubs involved in the configuration. The initiators 602 can be grouped together and all of the targets 603 can be grouped together from a single hub 601. The analyzer 604 takes the transmit data from the ports 604, 605 before and after the initiators. These ports represent the initiator-target boundary and the target-initiator boundary. This allows the analyzer to capture information transmitted from the initiators on one channel and information transmitted from the targets on the other channel.

As briefly mentioned above, embodiments of the invention may also be implemented using a sniff mode configuration for switched fabric topologies. To use sniff mode in a switched fabric environment, additional hardware is generally required in order to allow the analyzer access without interrupting the flow of FC communications. One method of isolating a component in a switched environment is to first connect an F_Port from a switch to a hub. Then connect the component the user wants to monitor to the hub leaving empty ports on either side so that the user can set up sniff analyzer connections before and after the component to be measured. When using this method, the user is generally required to interrupt the network at least once for the setup of the sniff port connect, and further, if future monitoring is desired, then the additional hub should be left in the network configuration.

Embodiments of the invention also allow for the use of the snoop GBIC. For example, if it is not possible to interrupt the FC network and maximum versatility for sniffing at different configuration points is required, then the present inventions snoop GBIC is a viable option. The snoop GBIC has an extended length, is available with optical connections for operation, and contains taps on both transmit and receive paths. Small fractions of both signals are carried on a second set of cables. By using these components, the user can individually access transmit and receive signals at a port. The analyzer can sniff by using two tapped transmitted signals, i.e., one that captures the output of all initiators and the other that captures the output of all targets. This method allows for flexibility in analyzer movement and placement without disrupting the configuration. This method also allows the user to perform analysis without losing a port, as described above with respect to sniff mode configurations for switched fabric topologies.

With regard to trace capture techniques, traces to be processed by the software package of the invention will generally have the following characteristics. First, generally all non-frame and frame events are captured in the trace data. Filtered trace captures are supported, but may not always present accurate data, depending upon what data is removed from the capture. SANMetrics will attempt to provide the most complete and accurate set of statistics and errors based upon the data available in the trace. Generally, a minimum of 32 bytes per frame of payload data should be captured—not including the FC header. With 32 bytes per frame captured, SANMetrics can generate data for all counters. Further, it is preferred that valid and relevant data from both channels be captured. Further still, It is recommended that the user reduce the number of bytes of payload data captured to increase the overall length of capture time. SANMetrics requires only 32 bytes of payload data to process all of the FC and SCSI measurements. Capturing 32 bytes of payload data, however, may reduce the usefulness of the trace for additional debugging purposes. For example, capturing 32 bytes of payload data in a SCSI environment provides the entire SCSI command and transfer ready phases, 32 bytes of payload data per SCSI data frame and the SCSI Status phase. This data, however, does not include the complete SCSI Request Sense data. Similarly, capturing 64 bytes of payload data gives essentially the same view as 32 bytes, but the standard first 14 bytes of SCSI Request Sense data are captured along with a SCSI Check Condition Status. Capturing 128 bytes of payload data will include the full PLOGI data and the relevant Class of Service parameters contained in the PLOGI data.

The software package of the invention is configured to analyze traces that have had pre-capture filtering applied by the analyzer. More particularly, analyzer pre-capture filtering can be utilized to greatly extend the amount of time the analyzer can capture. There are several capture configurations that will provide maximum capture time with a minimal amount of captured information. It is important to remember that pre-capture filtering has the possibility of discarding an event necessary to identify an error or behavior in the trace data. Therefore, the software package of the invention is generally configured to minimize error identification faults by focusing on the following. First, CRC and Code Violation Debugging, wherein the software captures all Frame and Ordered Set events and 2112 bytes per frame. These trace captures can generally be very small (8 MB/port), as errors of this nature generally have immediate consequences. Additionally, the software may execute a best generic capture, wherein all Frame and Ordered Set events at 64 bytes per frame for the full capture depth of the analyzer (1 GB/Channel) are captured. This covers pretty much every contingency, except for extremely fast 2 GB FC/SCSI networks (traffic in excess of 300 MB/Sec). In these configurations, it is desirable to aim for at least 60 seconds of capture, as many problems rely upon upper layer protocol timeout values (ULP_TOV), which are normally 45 seconds to 60 seconds in length. Having all of the ordered sets present and at least 60 seconds of data capture can help to ensure that whatever error occurs, it can be tracked down within the trace. Further still, the software may use a loop credit debugging method to capture all frames as well as OPN, CLS and R_RDY Ordered Sets, and capture only 32 bytes per frame. This will give the ability for SANMetrics to identify all necessary components to analyze credits on an arbitrated loop. The size of the capture buffer can be adjusted to desired length. Further, a switch credit debugging method may be utilized. In this method the software captures all frames and R_RDY Ordered Sets via capture of only 32 bytes per frame. This will give the ability for SANMetrics to identify all necessary components to analyze credits on a switched fabric port with no loop present. The size of the capture buffer can be adjusted to desired length. Additionally, loop tenancy debugging may be used, if credit Analysis is not necessary or desired, capture all frames as well as OPN and CLS Ordered Sets. This will give the ability for SANMetrics to allow for analysis of all tenancy and Normalized tenancy metrics, as well as exchanges and other frame level metrics. Finally, an upper-layer protocol debugging method may be used. For errors that occur in upper-layer protocols, such as timeouts, data corruption, and lost data, debugging can require extremely long periods of capture depth from the analyzer. To facilitate this, capture only frames with sequence Count=0x0 (gives the Command, Transfer ready, First data Frame, and Status). Capture 32 bytes per frame of data (or 64 if Check Condition Sense data is desired). Alternatively, the user could capture only frames with the F_CTL F_S (First Frame in sequence) and E_S (End of sequence) bits set—this would capture the Command, Transfer ready, First data Frame, Last data Frame and Status (the difference being the Last data Frame—which may be necessary to determine if an exchange that failed was in data phase or waiting on some other event like Status or Transfer ready).

With regard to data generation techniques, the best way to evaluate component performance is to observe what occurs when the component is involved in I/O activity. The counters in SANMetrics are generally more meaningful when the component being analyzed has work to do. The tool (software package) computes the counters under any load level, but it is difficult to determine if the component or the application is causing a performance discrepancy when analyzing periods of low activity. There are several methods of generating data for analysis with SANMetrics. The first approach is to capture a trace of the operation of the Storage Area Network (SAN) during normal activity. A second approach, more commonly used for product evaluation and performance analysis, is to use traditional benchmark tools (for example: Intel's IOMeter, Symbios/LSI's IOGen). Many benchmark tools are available, free of charge, via the World Wide Web, and these tools are configured to generate and control I/O activity to SAN components. Standard baselines used in the industry include: Sequential reads, Sequential writes, Random reads, Random writes and a Random read/write Mix. I/O operation sizes generally vary from 512 bytes per I/O up to 256 KB per I/O (or larger). However, if the user uses these tools to generate I/O loads, they generally produce constant averages with little deviation in throughput throughout the trace. This is due to the I/O saturation levels that are produced. The constant throughput allows a user to control the analysis of essential measurements.

With regard to ranges of requested transfer sizes, when an exchange is initiated between an initiator and target, the amount of data transferred can vary widely from bytes to megabytes (or larger). SCSI read and write operations typically transfer data in increments of the block size of the target (generally 512 bytes). The user can generically group the data transfer size of the exchange into small, medium, or large transfers. If the user is using a data generation application, the user will generally have more control over the transfer size. If the user is analyzing custom applications, in general, the transfer size cannot be controlled.

Returning to the process of characterizing trace data, it is important that the user select the appropriate and relevant counters to characterize and graph performance characteristics of devices. If incorrect assumptions are made about the data, then the analysis of the performance characteristics can be inaccurate. For example, simply because a benchmark or data generation program states that it is issuing 1 MB SCSI read operations, does not necessarily mean that 1 MB SCSI read operations are being issued at the FC and SCSI levels. Similarly, software queue depths and outstanding I/O operations (as reported by applications like Perfmon, iostat, and sar) might completely misrepresent the true flow at the FC and SCSI levels. To avoid these types of problems, generally the following items may be used to form a general characterization of the trace being analyzed. For SCSI or FC pending exchanges counters, generally, the most critical characteristic to determine in the trace is the pending exchanges (or Queue Depth). Without pending exchanges, devices sit idle, waiting for new commands from the initiator. If a user measure FC and SCSI performance characteristics without pending exchanges, the results will be incomplete. Two counters may be used o measure the pending exchanges. The first counter is FC: exchanges, pending exchanges. The second is SCSI command Completion and pending I/Os. There are two important distinctions between these counters. First, the FC and SCSI counters are exactly the same when analyzing a trace that contains only the SCSI protocol, but differs if other non-SCSI protocol activity (Extended Link Services, VI, IP, etc.) has also been captured. Further, the SCSI counter allows for breakdown to the LUN level, whereas the FC counter only allows for the initiator/target pair selection.

The software package of the invention also includes SCSI I/O counters, both read, write, and other types of counters. The resulting values of these counting operations will help the user make decisions about additional measurements that might need to be examined. Generally, performance analysis is best suited for controlled situations in which the design of experiment controls the flow and mix of data. In this configuration, the user can control parameters such as read, write and Other (including operations like Seek, Rewind, Verify, Inquiry, etc.) percentages by the design of experiment. Probably the easiest method for characterizing the traffic flow is to use counters for SCSI exchanges ([read], read Percentage), SCSI: exchanges ([write], write Percentage), and SCSI: exchanges ([Other], Other Percentage). By adding these counters for each initiator/target pair, the user will get the relative percentage mix for each type of I/O operation from the analysis.

Further, the software is capable of determining or approximating the I/O size. The counter in FC for this parameter is exchanges or bytes/exchange, which gives the average number of bytes transferred per exchange. This average includes the command, Status, Transfer ready, and data frames for SCSI exchanges. Note also that the Frame Header, CRC, Start of Frame (SOF) and End of Frame (EOF) bytes are included in the Bytes/exchange value. As such, when the user collects a trace using truncated frames (P/L data length capture set to less than 2112 bytes per frame), the frame lengths are recalculated by SANMetrics and can vary by several words per frame. This gives a slight variability in the displayed Bytes/exchange values. For uniform exchange sizes (that is, all 64 KB reads and writes), a user can reasonably estimate the size of the exchange from the Bytes/exchange.

Another method for investigating the I/O size is to use counters for the following parameters: SCSI (exchange [read], read Size), SCSI (exchange [write], write Size), and SCSI (exchange [Other], Other Size). These counters are computed from the FC P data length (FC P_DL) field in the SCSI command frame. Since these counters are only based upon the data transfer size of the exchange, they are generally useful for characterizing data. The computed average in the graph view might include some samples of "zero" values, so the value can be slightly lower than the actual I/O size. If this is the case, use the maximum value presented in the counter table or scroll across the graph and look at the current values table. As such, the software package of the invention may include a routine configured to check for zeros in the graph view to correct for averaging errors that may occur if the zeros are not removed from the data set for this calculation.

Another method to investigate the I/O size is to use the SANMetrics report view. The Summary Report shows the average SCSI I/O size as well as the average FC exchange size. Because these numbers do not include the "zero" values that the graph view does, they are more descriptive.

One of the principal reasons for using FC technology is to have the potential of high data throughput between components. Technology changes rapidly, and as such, so does the industry meaning of "high data throughput." Data transfer rates in FC (or any serial communication channel) are generally limited by the maximum bit rate of the communication channel. Currently, deployed FC technology has a nominal bit rate of 1062.5 Mbaud (or 1 GB) or 2125 Mbaud (or 2 GB). FC ports encode 8-bit data values into 10-bit transmission characters, limiting the maximum rate of information flow per channel to about 100 MB/Sec at 1 GB (or 200 MB/Sec at 2 GB). The mapping of protocols such as SCSI or IP onto FC further reduces this value for application data. In arbitrated loop configurations, the throughput is also limited by necessary setup and breakdown times including arbitration, opening and closing the loop, and credit flow. The maximum throughput is also dependent on the behavior and response time of the endpoint components.

A graph view with FC: MB/Sec, FC-4 Device data and/or SCSI: MB/Sec counters provides a good indication of the data flow between a pair of ports. The FC: MB/Sec values are calculated on raw frame flow occurring on the fabric. The raw frame flow includes the SOF, EOF, CRC, FC header and payload data. SANMetrics allows for further subdivisions of the MB/Sec counters by different types or categories of frames. The breakdown into All frames, link control, Link data, FC-4 Device data, and protocol data allows simple filtering for all of the different types of frames seen in a FC environment. The frame breakdown is defined by the contents of the R_CTL field in the frame header based upon the division presented in the FC-PH standards. The frame types that are tracked are (values in Hexadecimal notation): All frames: R_CTL=Any value; link control: R_CTL=Cx; Link data: R_CTL=2x, 3x, and 8x; FC-4 Device data: R_CTL=0x and 4x; and protocol data: R_CTL=01 and 04, for example.

Link control frames are used primarily as FC-4 data frame control mechanisms. Link control frames consist primarily of ACK, BSY, and RJT frames. Link data frames are used primarily for port (component) level Link Services. Link data frames consist of Basic Link Services frames, Extended Link Services, and FC-4 Link Services. Examples of this type of frames are PLOGI, ACC, ABTS, PRLI, and PRLO. FC-4 Device data frames transport FC-4 protocol information. This frame breakdown includes both FC-4 Device data frames and FC-4 Video data frames. These counters consist of all frames related to an Upper Level protocol (command, data, Status, Request, and Reply frames). Examples of FC-4 Device data frames are SCSI frames, VI frames, IP frames, and a special class of frames for video data. Protocol data frames are a special subset of FC-4 Device data frames. Protocol data frames consist of solicited and unsolicited data frames. SCSI uses Solicited data frames for both read and write data, while IP uses only Unsolicited data frames. MB/Sec values are relative to the exchange sizes that are being completed. In a properly configured environment, Storage Area Networks running 2K exchanges have a much lower total MB/Sec than those running 64K exchanges. Refer to exchanges for information on collecting the bytes per exchange (or I/O) size. The SCSI: IO/Sec and FC: exchanges, Completed/Sec counters also follow the same principles. It is virtually impossible to quantify either IO/Sec or MB/Sec throughput as good or bad without knowing what the I/O sizes are. Traditionally, smaller I/O sizes result in higher IO/Sec values, but lower MB/Sec values.

Typical displays of MB/Sec counters show "flat tops" with periodic fluctuations downward to smaller values. For example, decreases in the data transfer rate to a disk drive unit can be associated with the completion of a large SCSI data transfer, and the application on the Host preparing for another transfer. The downward variations should not last long, and can appear with some regularity in the display. Peripheral tape components can show long or irregular periods of zero data flow at the beginning of a transfer due to "seek time" to access the starting location for a read or write operation. After the seek time, when blocks are being transferred, the data flow in a streaming read or write operation should be relatively constant and high.

If the maximum data transfer rates are significantly less than expected, or do not appear relatively constant over time, there are many other counters that the user can use to analyze the behavior of the port. In the case of low transfer rates with large I/O sizes and pending exchanges, the ports might not be using the loop as effectively as possible. In this case, it might be helpful to examine the tenancy and exchange characteristics by using the following counters: FC: tenancies, frames/tenancy, FC: tenancies, Inter-frame Gap, FC: exchanges, tenancies/exchange, and FC: exchanges, Completion Time, for example.

If there are "gaps" in what should be steady data flow conditions, it is possible that factors not related to the application are halting the data transport for periods of time. These "gaps can be defined as measurable drops in throughput for short or long periods of time. When gaps occur, there are several potential factors to investigate. First, identify if there is outstanding work to be completed for any initiators/targets on the link. These can be identified by the pending exchanges counters. When errors are occurring in the exchanges causing halts in throughput, there will generally be outstanding (pending) exchanges throughout the period of inactivity. Here the pending exchange Report can be of immense assistance in identifying the exchange (or exchanges) in error. Gaps can occur because ports are losing arbitration for the loop to other competing ports. Gaps that occur when the ports own the loop can be caused by flow control problems associated with credits, or slow response time of the ports. Gaps can occur because an arbitrated loop is initializing or recovering from failure. Gaps can occur because an initiator is recovering from a failure or problem. Generally, when an exchange has a problem, the Topology/Debug View will help to pinpoint reasons for failure or identify suspicious behaviors.

SCSI MB/Sec values are derived differently than the FC: MB/Sec counters. The FC: MB/Sec counters are a direct measure of throughput found in frame level activity, without regards to I/O operations and exchanges. The SCSI: MB/Sec counters are only derived from exchanges (or I/Os) that SAN-Metrics has seen both start and finish. This can lead to some interesting data points in Graph View. For example, the start of the trace may contain a significant period of time in which there is no visible SCSI MB/Sec activity. This occurs because there were NO SCSI I/O operations that started and completed in this time frame. The SCSI: command Completion, completed I/Os counter should not show any completions visible during this time frame. Further, the trace might show "spikes" of MB/Sec activity that appear to exceed the physical data rates possible with FC architectures. This is because the SCSI MB/Sec values are not totaled until the exchange completion (SCSI Status frame received). Once the exchange completes, the counter is incremented. It is not uncommon to see devices complete multiple exchanges within a small period of time, thus showing a spike in throughput for that period of time. The same spike conditions can be seen under the SCSI IO/Sec counters.

The concepts of exchanges and sequences were utilized in the software package of the invention to allow for mapping of upper layer protocols such as SCSI onto FC. A traditional SCSI read operation consists of the command, data and Status phases. Each phase is mapped to a FC sequence and the entire read command is mapped to a FC exchange. For SCSI, an exchange equates exactly to the SCSI term "I/O." Other protocols, such as IP, VI, or FICON, generally use sequences and exchanges differently, though still within the definitions of the FC Standards. Exchanges generally contain multiple sequences, span many loop tenancies and contain large numbers of frames when the data transfer requests are large.

In general, exchanges include one or more sequences between an initiator and a responder. SCSI exchanges are bidirectional and are identified by an Originator ID (OXID) and a Responder ID (RXID). These are the exchange Identifiers. Alternatively, IP exchanges are unidirectional. FICON exchanges are inter-linked uni-directional exchanges. One device initiates a uni-directional exchange with an OXID value. The other device responds to this OXID by creating a new unidirectional exchange with a different OXID value. FC exchanges can be long-lived and generally span many tenancies. IP exchanges can last for days or weeks, whereas SCSI exchanges rarely last more than one or two seconds. The exchange identifier (OXID) replaces the concept of a SCSI Queue Tag and, for SCSI operations, can be considered equivalent. Each SCSI I/O operation is mapped to a unique exchange. Thus, a user can generally associate the term SCSI initiator with the exchange originator, and associate SCSI target with the exchange responder. The data transfer size of the exchange determines a number of factors when evaluating performance characteristics. Refer to Characterizing Trace data to gauge the types and sizes of exchange activity.

Within a FC exchange, each phase of the SCSI operation is mapped to a separate FC sequence. A typical SCSI Phase (command, Transfer ready, data, Status) is contained within one sequence. Depending on the amount of data requested in the SCSI command, the SCSI data Phase might be divided into multiple sequences. For more information about sequences, refer to sequences. When operating in an arbitrated loop configuration, the initiator and the target must establish access to the loop in order to transfer data. Each loop access requires a tenancy. Refer to tenancies.

With regard to SCSI read operations, a nominal SCSI read operation consists of three phases: first a command phase, then a data phase, and then a status phase. The entire operation maps directly to a FC exchange between the initiator and target. For SCSI, it maps directly to an initiator/target/LUN nexus. The read command, data, and Status phases are each carried in sequences that are made up of frame level events. If the data transfer is small (2 KB or less), all of the data can be transferred in a single frame, although a target can also use smaller frame increments (like the SCSI block size) to transfer the data. If the data transfer is medium or large, the target might choose to divide the data transfer into multiple loop tenancies to permit loop access by other ports. For an SCSI write operation, there are four distinct phases: a command phase, a transfer ready (XFER_RDY) phase, a data phase, and a Status phase. The entire operation is mapped directly to a FC exchange between the initiator and target. For SCSI, it maps directly to an initiator/target/LUN nexus. The write command, XFER_RDY, data, and Status phases are each carried in sequences that are made up of frame level events. If the data transfer is small (2 KB or less), all of the data can be transferred in a single frame, although an initiator can also use smaller frame increments (like the SCSI block size) to transfer the data. If the data transfer is medium or large, the initiator might divide the data transfer into multiple tenancies to permit loop access among ports. The transfer ready phase is unique to FC. On a parallel SCSI bus, the targets control the state of the bus at all times. When the buffers on a target are full with write data, the drive simply switches to Message phase and ends the bus tenancy. No equivalent control exists in FC, so the transfer ready phase was added to maintain the control of the target. The transfer ready phase allows the target to control the number of bytes it will receive on every write data sequence. For data integrity purposes, a target generally will not allow more than one transfer ready to be outstanding at any given time. This prevents multiple initiators from creating data over-run or corruption conditions.

The software package of the invention also includes several pending exchange counters that allow the tracking of the current state of the open conversations for multiple protocols (FC, TCP, iSCSI, FCIP, FCP-SCSI). For example, for FC, the pending exchange counter corresponds to pending I/O operations in the upper level application software. Under load, there are usually a large number of pending exchanges in different stages of completion. For a pair of ports, pending and FC, protocol data gives an immediate reading on how much work the pair has been requested to do and how fast it is being completed. When the software package determines that there are low valued for pending exchanges, i.e., pending I/Os that drop to low values, then one of several conditions may exist. For example, the requesting software on the host computer may no longer be issuing requests, thus the system is returning to an idle state. Further, the requesting software on the host computer may be building a new set of requests. This is usually followed by a burst of new commands being issued, and as such, the low values are generally followed by a burst of large values in this situation. The initiator (or target) may have detected an error condition and is in the process of recovering the exchange. The error condition could include a SCSI Check Condition, CRC Errors, Code Violations, and a multitude of additional possible problems, all of which would show up in the analysis as a low pending exchange number. Another possibility is that the target may have reached its maximum queue depth and has reported a Queue Full condition to the initiator. Depending on the Operating System, application, and device drivers being used, some FC and SCSI systems attempt to limit, or "throttle," the pending I/Os to a target that responds with Queue Full message. In this case, it is likely that only one pending I/O for the device will be allowed after the "throttle". SANMetrics easily shows this condition with the pending, Issued, and completed I/O counters. Further, typical benchmark and data generation programs send and receive data in "bursts" of I/O activity, thus the pending I/O alternates from high to low and back to high again. Depending on the duration of the trace, a corresponding chart of I/O activity resembles either a "see-saw" or a single burst and then a period of low or no pending I/O operations. In this configuration, trace counters are expected to vary between high and low extremes.

On the other hand, pending exchanges that climb to high values might also indicate one of several problems. For example, targets generally have a maximum number of pending exchanges that can be handled at one time. Thus, when this value is met or exceeded, targets respond with a Queue Full condition via an SCSI Status Frame. The maximum number of pending exchanges a target can handle varies for the different manufacturers and varies based upon the size of bytes requested in the exchange. For example, a target will respond with Queue Full after about 128 pending 64K reads, but could respond with Queue Full after about 32 pending 256K reads.

Generally, when SANMetrics encounters any of the following events in the trace data, it clears the appropriate list(s) of pending exchange information, just as a FC device does. The list of events that clear the exchange information includes an FLOGI frame clears any pending exchanges between the source and destination, a PLOGI frame clears any pending exchanges between the source and destination, a TPRLO (Third Party Process Logout) frame clears any pending exchanges between the destination and any source, a LOGO frame, which should come from the responder, clears any pending exchanges between the source and destination, a SCSI target Reset command frame clears any pending exchanges between the destination and any source, and an FC P-2 LUN reset will clear exchanges to between the source and the specified LUN on the destination. When any one of these conditions occur, it can be very useful for debugging purposes for the user to understand how many pending exchanges (and which ones) were pending prior to the event. This may be easily viewed and understood from the report view that may be generated by the software package of the invention.

The software package of the invention also includes several issued and completed exchanges counters. For FC exchanges, the Issued counter can provide important insight into the behavior of the initiator, as well as to the software and operating system that is driving the exchange activity. The FC: exchanges, completed counter can provide insight into the behavior of the target. When a user view Issued exchanges in a graph, they generally show bursts of activity, followed by periods of low (or no) activity. When an application has gathered data to transmit (writes) or requests data from the targets (reads), it will generally issue the requests in a burst, driving the pending exchanges values upwards. With applications used to generate loads on the SAN, this occurs regularly. The targets then begin servicing the pending exchanges. The first exchanges, on average, generally take a longer time to complete. Subsequent completed exchanges generally complete more rapidly. If the exchanges are distributed in a random fashion (physically) on the target, it causes the completion times of the exchanges to increase. This generally causes the completed exchanges to flatten out also. If there is a constant amount of work to complete between the initiator and the target, the values for completed exchanges should remain constant. Targets can implement caching policies and read-ahead algorithms that cause multiple exchanges to complete in a relatively short period. This might cause "spikes" to occur in the completed exchanges values. a user can view the rate at which exchanges are being issued by using the SCSI: exchanges [Total], CMD to CMD Time counter. This metric displays the average elapsed time between one command to the next from the initiator to the target. A user can view the rate at which exchanges are being completed by using the FC: exchanges, Completed/Sec counter.

Also included are several tenancies and exchange counters. For FC exchanges, a tenancies/exchange counter allows a user to observe the behavior of the initiator and the target when exchanges are being completed. The counter provides the average number of loop accesses required by the initiator/target pair to complete an exchange. A user can best view this metric when the trace contains uniform or I/O operations that are mostly the same size. It is also helpful to capture separate traces (one with only reads, the other with only writes) to identify devices that show inefficiencies in tenancies/exchange. It should be noted, that for tenancies that contain frames with multiple exchange identifiers (OXIDS), generally only the exchange identifier of the first frame is credited with the tenancy. Subsequent frames transmitted for other exchanges are not credited against the tenancies/exchange counter. For example, an initiator transmits OPN to a target and transmits three frames—OXID 1, 2, and 3. The tenancy/exchange value is only incremented for OXID 1; OXID 2 and 3 are not incremented. Initiators and targets that behave in this manner can greatly reduce the number of tenancies/exchange. This can lead to significant performance gains, especially in the small to medium I/O size ranges.

The tracking of tenancies and exchanges is somewhat complicated when large exchanges are encountered. For example, during large exchanges, either the target or the initiator might take a number of actions that lead to increased tenancy/exchange values. If the target does not have buffers available for the write data, for example, it might only allow small amounts of data to be transferred by the initiator, thus forcing the initiator to break up the write into multiple tenancies. The transfer ready issued by the target specifies the amount of data that can be transferred by the initiator. To check for this condition, the software of the invention uses the counter SCSI: exchanges [write], transfer ready size or SCSI: exchanges [write], transfer ready frames/write. If the average number of bytes allowed by the transfer ready from the target is significantly lower than the exchange size (SCSI: exchanges [write], write Size), then the software may determine that the target could be improperly utilizing it's buffering.

There is a saturation point at which the I/O size becomes too large for the target to be able to handle all of the data at once (generally around 128 KB). At this point, the target has the option to use the transfer ready as a flow control. The transfer ready acts as an additional flow control mechanism in which the target attempts to share its buffering capabilities across multiple exchanges. Another situation like this is when the initiator is breaking the data phase into multiple tenancies. It either does not have the data ready in its buffers to transfer or is trying to satisfy multiple write exchanges to multiple targets. Further still, the target may have credit flow problems that force the initiator to break the data into multiple tenancies.

In switched fabric environments, tenancies and exchange counters have a different relevance. More particularly, since the switch discards primitives and all loop information and passes only the frame information internally, the tenancies per exchange values reflect a combination of the capabilities of the end-points and the buffers on the switch. For example, after receiving a SCSI read command from the initiator (through the FL_Port), a target could transmit the data phase and Status phase of the read operation in two tenancies with an FL_Port. If the analyzer is connected to the target side, the tenancies per exchange metric will show a value of three (assuming the read command was in a separate tenancy from the FL_Port). If the analyzer is on the initiator side, the value could be radically different. The FL_Port could be buffering up and transferring the frames via full duplex mode and could create a resulting value of one tenancy per exchange (only the command Phase). On the other hand, if the FL_Port is having credit problems or is inefficiently buffering frames, the number of tenancies for the exchange could increase dramatically. The software package of the invention is configured to determine when these types of situations and configurations are at issue and present the information to the user in an easily readable format, which was not possible with conventional analysis techniques.

Another aspect of the software package of the invention is the ability to track and analyze exchange completion times. For FC implementations, exchange completion time (or ECT) measures the average elapsed time (in milliseconds) the initiator/target pair takes to complete an exchange. There are several factors that affect the ECT. For example, the average number of pending exchanges affects the completion time. In general, higher numbers of pending exchanges lead to higher ECT values. For example, a port that averages 60 pending exchanges and has an ECT of 10 ms is behaving well (although the 60 pending exchanges might be another sign of trouble). If the port is only averaging two pending exchanges and had an ECT of 20 ms, the port is not performing nearly as well. Further, the data direction of the exchanges (reads or writes) may affect completion time. In a SCSI read, the bulk of the value of the ECT is primarily controlled by the target. In a SCSI write, the value of the ECT is affected by the initiator (sending data) and the target (using transfer ready as a flow control). Another cause of longer completion times may be data caching by the target and physical distribution of data on the target: exchanges that cause the target to perform a seek carry much higher ECT values than sequential access. If the target operates with caching, and the exchanges repeatedly go to the same logical block address (a single sector) for the data, the ECT should be small and relatively constant. Using data generation tools to generate a load of only single sector reads shows how almost 100% caching affects the ECT. Additionally, if the SCSI operations consist of a mixture of Random reads, the ECT will generally increase due to the additional seek time introduced between operations. Other parameters such as sequence burst length may also remain high in this situation. Similarly, if the SCSI operations consist of a mixture of reads and writes, the ECT generally increases.

For SCSI operations, the software of the invention is capable of further qualifying the ECT for SCSI operations by using several counters. These counters essentially operate to break the ECT down into smaller components. A command to First data Time shows the elapsed time from the command being issued to the first data frame returning in response to the command. This is normally a very significant portion (95% and above) of the ECT. This is considered the "setup" time of the exchange. A command to XFR_RDY Time only applies to SCSI write operations and represents the average amount of time for the target to respond to the command with a transfer ready frame indicating it has buffers available. A command to Status Time shows the ECT for SCSI exchanges only. A First data to Status Time shows how much of the ECT is consumed in the data and Status portions of the exchange. These values generally characterize the devices involved in the exchange, instead of transport mechanisms (credits, tenancies, etc). These values should remain relatively constant for exchanges of the same size and type. The cooperative use of these counters allows the software package of the invention to generate a represent an accurate ECT measurement to the user.

Once the exchange completion parameters are calculated or determined by the software package of the invention, the second and equally important stage that the software goes through is a process of investigating exchange completion time anomalies illustrated by the parameters. In the graph view generated by the software of the invention, a graph that shows large spikes or gaps in any of the ECT values should lead the user to additional investigation. It is possible that the initiator or target cannot complete the exchange due to one of several reasons. First, the exchanges may not be completing as a result of arbitration problems. Additionally, physical problems (mechanical retries) may be causing incomplete exchanges. Problems of this nature are generally found by checking the trace for SCSI Check Condition Status frames. Actual exchange problems (protocol and signaling) may be causing the incomplete exchanges. Problems of this nature are handled in a myriad of different ways by devices. The most commonly accepted way is for the initiator to use ABTS. When an exchange has exceeded the sequence Time out Value (SEQ_TOV), Error Detect Time out Value (ED_TOV), or upper layer protocol Timeout (ULP_TOV). These Time out Values vary from 1-2 seconds to 1-2 minutes, depending on the devices and upper layer. Incomplete exchanges may also be caused by link problems. Problems of this nature are usually detectable through many SCSI Check Condition Status frames (indicating Parity Error or data Phase Error) or exchange errors (as above).

Gaps in the ECT graph are normally followed by corresponding spikes in the ECT graph. The ECT is computed and charged to a port at the end of the exchange, and a sharp upward spike could indicate that there are one or more exchanges that took a long time to complete. With SANMetrics, a user can zoom in to the point immediately prior to the spike. Then a user can use the report view—pending exchanges Report to review a list of pending exchanges. (See report view for further details.) a user can then examine this list of exchanges with TraceView to look for anomalies. ECT values can also exhibit upward and downward trends through the trace (or sections of it). Generally, as the number of pending exchanges increases on the target, the ECT increases. With traditional data generation and benchmark programs, exchanges are usually sent out in large groups, creating a large number of pending exchanges on the target in a short period of time. Generally when this happens, the ECT shows an initial large value followed by a downward trend of decreasing values. Once the target starts completing the group of pending exchanges, it will generally complete multiples due to data caching and other read-ahead features. ECT values that increase over time might be due to the number of Issued exchanges increasing faster than the completed exchanges, thus increasing the pending exchanges. This situation represents a bottleneck for the initiator/target pair and can lead to many problems.

The sequences/tenancy counter for FC is a measure of the ability of a port to send multiple sequences within one loop tenancy. Some FC devices send only one sequence within a tenancy, thus requiring more tenancies to complete exchanges. For SCSI reads, a target can reduce the number of tenancies by sending both the data frames (one sequence) and the status frame (another sequence) within the same tenancy. Some devices split large data frame sequences into multiple smaller sequences. Splitting a sequence into multiple sequences provides little (or no) performance gain, but can enhance error recovery techniques.

For FC applications, the software package of the invention also generally includes a sequence burst length counter. The sequence burst length counter is a measure of the ability of a port to start and finish sequences with one destination port, rather than send partial sequences to multiple ports. The burst length is determined by monitoring protocol data frames for changes in OXID (Originator ID), destination ID, or sequence ID. Under heavy loads, some devices choose to service (or time-slice) multiple pending data sequences in an intermixed fashion. This generally incurs multiple tenancies/exchange. Effective ports will utilize long sequence bursts (generally the entire data phase) within an exchange. The burst length metric is not bound to a tenancy, thus a device could send 64 KB of data in 32 tenancies, but still maintain a 64 KB burst length. Logically, a user should use the burst length counter in either the left direction (←) mode to describe the targets flow on SCSI reads or right direction (→) mode to describe the initiators flow on SCSI writes. Consider the example of an initiator with pending SCSI write exchanges to two different targets. The initiator determines how the data is divided into sequences for transport to the two different targets. If it uses a short sequence burst length among multiple targets more tenancies are incurred, with a corresponding increase of loop overhead that is consumed to move a given amount of data. If the initiator uses a long sequence burst length and finishes the pending data to one target at a time the number of pending exchanges might be reduced and alleviate loop congestion. This case is also true when a user have multiple exchanges to a single port. The exchanges could be broken up "Round Robin" to the single port. The burst length values diminish when this is the case.

Switched fabric devices utilize similar buffering techniques to increase performance. The switch (or switches) involved could buffer frames from three different targets and end up interleaving the frames, producing very short sequence burst length values. In these cases, it is not possible to directly deduce whether the switch (or switches) or the targets are causing the short sequence burst length. a user need to collect additional samples on a target to investigate the sequence burst length it is utilizing. Further, with regard to SCSI write operations, keep in mind that the sequence burst length is measured only for protocol data frames, so to investigate the burst length for SCSI write operations, a user need to add the counter with the data flow: initiator to target (→). This logic is reversed for SCSI read operations.

A tenancy is a concept that exists only in FC arbitrated loop configurations. When a port (source port) has data to transfer, it arbitrates until it wins arbitration and thus, wins ownership of the loop. The port then transmits OPN to another port (destination port), transfers information (commands or data) and closes the loop. The time and events that occur between the OPN and CLS on the loop constitutes a tenancy. Ports can choose the frame size, and the number of frames to transmit during a tenancy. This choice is a trade-off between data flowing efficiently and permitting other ports to access the loop. A tenancy is generally defined as a loop access and is made up of the elapsed time between the OPN and the CLS for an initiator/target pair. The source port initiates a new tenancy by arbitrating for the loop and then transmitting OPN to the destination port. The tenancy is terminated when either the source or destination port relinquishes control of the loop by transmitting CLS. The tenancy counters are closely related to the open counters. All tenancy statistics include overhead imposed by the loop length for round-trip times. The concept of a tenancy is valid only in an arbitrated loop topology. The minimum events required for a single loop tenancy are as follows. First, time for an open (OPN) to flow from the source port to the destination port or time for the destination port to respond to the OPN and return receiver ready (R_RDY) credit to the source port. Note that this assumes that the ports are using the alternate credit model with a buffer to buffer credit value of 0. Additionally, if the source port closes first, the time for a close (CLS) to flow from the source port to the destination port and then be returned from the destination port, or if the destination port closes first, only the time for CLS to flow from the destination port to the source port. Further, a successful loop tenancy generally contains frame transmission, or inter-frame fill words or inter-frame gaps, which implies that each successful loop tenancy requires a minimum of three loop round-trips to transmit a single frame. For example, arbitration requires one round-trip, open to R_RDY is one-half of a round-trip, R_RDY to first frame is one-half of a round-trip, and CLS requires one round-trip. Based on this information, a user can see how the tenancy statistics can be highly affected by the loop length (either logical or physical) of the cable involved. All of the SANMetrics counters that are relative to tenancies include this loop length.

SANMetrics is configured to monitor loop tenancy, as this parameter may be indicative of network performance, and as such, it is desirable to optimize unsuccessful loop tenancies. Unsuccessful loop tenancy can generally occur in two ways. The open (OPN) propagates around the loop without being consumed by the intended destination port. The FC failed opens metric is a count of the number of times this situation occurs. Some FC ports periodically transmit an OPN to themselves to perform a test of the link. The OPN is seen on both channels of the analyzer and thus is considered to have failed. In general, a user should investigate non-zero values in the failed opens counter by using SANMetrics to zoom into the time of the failed opens and then use trace view to view the data at that point. High counts of failed opens can indicate analyzer placement problems. The response to the open (OPN) by the destination port is a close (CLS). This is generally due to an out of credit condition by the destination port. The FC open without frames metric is a count of the number of times this situation occurs. It is useful to correlate this counter with the FC credits, out of credit counter. The destination port can terminate the tenancy early by transmitting a close (CLS). This is generally due to an out of credit condition by the destination port. The FC: opens, opens ended by destination metric is a count of the number of times this situation occurs. It is useful to correlate this counter with the FC out of credit counter.

The tenancy counters may also be used by the software package of the invention to track, analyze, and display a frames/tenancy ratio. The FC frames/tenancy counter measures how many frames are being transferred during each loop access. The transfer size of the exchange has significant impact on the frames to tenancy (F/T) ratio. The FC normalized tenancies, frames/tenancy counter measures how many frames are being transferred during normalized tenancies (tenancies with more than one frame transferred). For SCSI, this effectively shows how many data frames are being grouped together and removes the single frame tenancies. This metric may be more useful for devices that do not transmit the SCSI Status frame within the same tenancy as the SCSI data. The SCSI Status frame would occur as a single frame tenancy and greatly reduces the average for the tenancies, frames/tenancy counter. An example of the difference between the normalized and non-normalized frames/tenancy values might help explain this. In this example, the initiator/target are completing 64K SCSI reads. The target sends the SCSI status in a separate tenancy than the SCSI data. The SCSI data is being transferred in 2K frames, giving 32 data frames and one status frame being transferred from the target. The Normalized frames/tenancy counter shows values of 32, but the non-normalized frames/tenancy counter shows values of about 16.5. If the target transmits the Status frame within the same tenancy as the data frames, both normalized and non-normalized frames/tenancy counters show values of 33.

The exchange read and write diagrams illustrated in the software package of the invention show that a SCSI read with a small transfer can be completed in three frames in two tenancies, assuming the SCSI status is bound together with the SCSI data in one tenancy. This produces a F/T ratio of 1.5. If the Status is not bound with the data, the F/T ratio is 1. An SCSI write with a small data transfer size (2K or less), should complete in four frames in four tenancies, producing a F/T ratio of 1. Without utilizing full duplex, this is as efficient as this transaction can be. If the F/T ratio for a port is significantly less than one (unity) for the observed transfers, the port is not using loop tenancies to the best effect. It is using too many tenancies to transfer data. Some ports do not buffer data before transmitting it and transmit only one frame per loop tenancy. Instances where no frames a transmitted per tenancy can indicate credit problems for the destination port. More particularly, small data transfers should have a F/T ratio of about 1. If a small transfer (2K or less) has a F/T ratio above 1, it is likely that the port is dividing the data into smaller increments. A 2K increment generally produces the best packing of data payload into frames. Information about this can be estimated from FC exchanges, frames/exchange and FC exchanges, bytes/exchange counters. Medium and large data transfers should increase the F/T ratio, as more data frames are transferred during one tenancy. If medium and large transfers have an F/T ratio that remains at about unity, it is likely that ports are sending only one frame per tenancy, and not effectively using the tenancy to send multiple frames. An F/T ratio of unity up into the 20's to 30's is good port behavior for small to medium data transfer request sizes. Ports should use the largest possible data increment per frame and send ten (or more) data frames during one loop tenancy. A high F/T ratio, ranging upward from the 30's, indicates a large number of frames transferred in each loop tenancy.

Assuming the average frame size remains good, the software needs to evaluate a high F/T ratio if the following situations occur. If no other ports need access to the loop, a high F/T ratio is desirable, since it reduces the loop round-trip overhead in a tenancy to a smaller fraction of the total time spent transferring useful data. If other ports are arbitrating for loop access, a high F/T ratio could indicate that the port is "hogging the loop." The FC arbitrated loop standard imposes no requirements or limitations on the length of time a port may have the loop open. Additionally, other tenancy related parameters that may be measured, analyzed, and displayed to the user of the software package of the invention include, but are not limited to, open close overhead, time on link, and rate of tenancies.

Another way a port can consume time on the loop is by failing to send the next frame promptly. The interval between EOF of one frame and SOF of the next frame contains ordered sets of transmission words called fill words. The FC specification calls for a minimum of six fill words to be transferred between frames. These fill words (that is, the Inter-frame Gap) are used to convey arbitration and credit information around the loop without interrupting the flow of higher level concepts of frames, sequences or exchanges. Fill words generally include idle, ARB, and R_RDY Ordered Sets. Fill words and credit interact closely. A large number of fill words between frames could indicate a lack of credit available for the transmitting port. Additionally, it should be noted that that the % efficiency values for tenancies and normalized tenancies deal with frame transmission during a normalized tenancy. Because the % efficiency does not deal with larger transfer units, such as multiple tenancies or multiple exchanges, these values do not represent a complete picture of FC efficiency. In many cases, devices show misleadingly high (93 to 98%) efficiency ratings, wherein the inter-frame gap counters would likely be more representative.

Each of the tenancy metrics built into the software package of the invention generally describes the same performance principles in different terms. They effectively describe the rate at which the device is capable of bursting data in FC. For example, for a 1 GBaud FC link, the total half-duplex throughput is limited to around 100 MB/Sec. In most cases, these metrics should be at or near this data rate. To achieve 100% efficiency in FC, a device transmits frames with 2K of payload with six fill words (the inter-frame gap) between frames. In instances of system bus starvation, these metrics can vary dramatically. A 32-bit, 33 Mhz PCI bus is capable of around 133 MB/Sec data rates, thus 100 MB/Sec half-duplex data rates should be quite achievable. Many PCI busses, however, have multiple loads (or devices) sharing this bandwidth. This can significantly reduce burst rates. As 2 GBaud solutions enter the marketplace, it is clear that the 32-bit, 33 Mhz PCI bus is a truly limiting factor. Enterprise Servers regularly utilize 64-bit, 33 Mhz and 66 Mhz PCI busses for 256 MB/Sec and 512 MB/Sec capacities, respectively. For frames sent from the initiator to the targets (i.e., SCSI write data), these metrics essentially describe the burst rates achieved through "memory reads" from the system memory bus, provided there are no intermediate buffers on the initiator. Many FC ASIC designs have no intermediate buffers, so their data rates on writes are dictated by the rate at which data can be delivered from the system bus into the ASIC for FC delivery. Provided there are no out of credit conditions on the receiving end of the transmission, the MB/Sec and % efficiency values will reflect the burst rate of the data bus. Lower values indicate inefficiencies in transmission, and these inefficiencies can include poor frame management techniques by the initiator as well as poor PCI performance from the host system. Similarly, higher values in the Inter-frame gap metrics indicate latencies in transmission. Values of 6-15 are normal for devices, and for a normal frame, there are 521 words transmitted, including the SOF, EOF and FC header. An Inter-frame gap value of 26 represents about 5% of a frame length of delay between frame transmissions. This can have significant impact on overall system performance.

For frames sent from the targets to the initiator i.e., SCSI read data, this bottleneck will generally appear as either out of credit situations by the initiator or low frames or tenancy values from the target to the initiator. Keep in mind that the initiator can close the loop at any time to terminate the tenancy. If the initiator cannot stream data onto it's system bus or intermediate buffers, it will respond by either transmitting CLS or will stop transmitting credits, thus creating out of credit situations. In any poorly performing situation, it can be useful to the FC: opens, opens Ended By destination metric to determine which device issued the CLS first in the tenancy, i.e., to find the first CLS in the tenancy and determine if it is on the same channel of the OPN. If the source port (the device that transmitted the OPN) issues the CLS first, it either has no further data to transmit (the normal case) or has run out of credits from the destination port. Generally, when the destination port (the device that is the receiver of the OPN) issues the CLS first, the destination port is having trouble consuming (processing) the frames and is closing the loop to avoid out of credit delays. Alternately, the destination port may issue the CLS first if it has data to transmit to another device and it is attempting to "time slice" the loop by not residing on the link for long periods. The definition of long periods is somewhat vague and varies highly from device to device. Destination and source ports that behave in this manner will show values for sequence burst length that are smaller in size than the I/O sizes being requested. These metrics are best viewed in two ways. First, monitor these metrics for the entire trace. The overall averages are quite informational when the monitored devices are under consistent workloads. Second, zoom in to several individual tenancies and re-examine the metrics. The overall averages may be lower due to periods of inactivity for the device. Zooming to the individual tenancies shows the exact burst rates for that tenancy.

Another parameter that the software package of the invention carefully monitors is the arbitration on the network. Ports on an FC loop arbitrate for ownership of the loop. When a port wins ownership of the loop, it opens another port (starting a tenancy) and initiates the transfer of information. After the transfer is complete, the owner closes the port (ending the tenancy) and relinquishes ownership of the loop so that other ports might gain access to the loop after winning arbitration. When a port loses the arbitration, it must go to monitoring state, where it passes frames from other ports and continues arbitrating. A port that does not own the loop and has data to transport continues to arbitrate at its priority level. The arbitration process for FC arbitrated loop (FC-AL) architecture specifies how ports arbitrate. An arbitrating port processes the current fill word as follows: If the current fill word is IDLE, the port replaces it with an ARB (X). The value (X) represents the AL_PA of the port, which sets the priority of its bid for ownership. Lower AL_PA values have higher priority. If the current fill word being received contains an ARB (Y) with a lower address, the port must re-transmit it, otherwise the port replaces the higher ARB (Y) (X<Y) with its own ARB (X) value. When an ARB (X) transits the loop unchanged, the originating port owns the loop. When multiple ports are arbitrating, a port with a high priority (lower hex value AL_PA address) has an advantage.

In a loop configuration, the SANMetrics counters FC: Arbitration, Attempts, FC: Arbitration, Wins, and FC: Arbitration, Losses change depending on where a user place the analyzer in the loop. In a loop configuration, arbitration counters can be inaccurate because ports can replace a received ARB with their own ARB. With JBOD enclosures, a user are likely to see many more losses for the lowest AL_PA of the targets and very few losses from the highest. This is because the arbitration attempts for the highest priority device are replaced by arbitration attempts for the lowest priority device. SANMetrics uses techniques to capture and display these counters as accurately as possible, although there are cases where these counters are collected on a best approximation basis. These cases are due to the nature of serial data flow and arbitration replacement by ports. There is no single position where a user can place the analyzer that allows for the capture of arbitration information by all devices. SANMetrics collects the list of arbitrating devices based upon the values seen by the analyzer from its placement in the loop. In certain cases, the arbitration winner cannot be positively identified from the arbitration primitives. In these cases, SANMetrics uses information from frame flow and the OPN before relying upon the arbitration values.

The software package of the invention utilizes a novel algorithm to manage arbitration counters. The algorithm generally states that when the loop is opened, the current arbitration lists are cleared. When an ARB containing a value other than hex 'F0' is encountered, it is considered to be an attempt by a port to arbitrate for ownership of the loop. A list of all the arbitrating ports is kept until the next loop OPN is seen, at which point the arbitration winner count is incremented for the port that actually opened the loop and the other arbitrating ports are counted as arbitration losers. It may be helpful to place the analyzer at alternative points when a user are examining the Arbitration statistics for a particular device. Isolating the particular device with the analyzer yields values that provide more information for the arbitration counters.

The software package of the invention is also configured to analyze the arbitration wins, losses, and fairness to provide a measure of improvement for the network. Generally, every port that is ready to transport data must attempt to arbitrate for the loop. The number of FC: tenancies, frames/tenancy and the number of FC: exchanges, tenancies/exchange have a large effect on the number of times a port will attempt to arbitrate. If a port regularly utilizes full duplex, it will also attempt to arbitrate less frequently. With regard to evaluating arbitration wins, a port must win arbitration to transfer data. The counter FC: arbitration, wins corresponds to loop tenancies by a port—every time a port wins arbitration, it must open the loop, thus starting a tenancy. A port (that owns the loop) blocks the flow of any other arbitration attempts, replacing any ARB primitives with IDLE or ARB (FO) as detailed in the Fairness process. With regard to evaluating arbitration losses, The FC arbitrated loop architecture requires that lower AL_PA values have higher loop priority. It is not surprising to see multiple Arbitration Attempts and Losses by the ports with higher AL_PA values. Extremely high arbitration loss counts could indicate port starvation or lack of fairness being followed by a higher priority AL_PA.

Arbitration fairness is a process that applies to the arbitration phase of loop operation. The fairness process attempts to allow all ports that are arbitrating for access to have an opportunity to access the loop. Fairness only describes an equal chance to access the loop, and does not make any statement about the duration that a port might keep ownership of the loop once it wins access. The fairness process for arbitrated loop operates as follows: A port that replaces an Idle with its ARB(x) value begins a "fairness window." The port that wins during this arbitration cycle sets the current fill word to ARB (F0) and discards or blocks received ARB values as long as it owns the loop. When the current owner is about to relinquish control of the loop, it examines the incoming ARB values for ARB (F0), which means that no other port is arbitrating. If the ARB value received is not ARB (F0), it sets the current full word to Idle and the "fairness window" is terminated. Once a port has won arbitration during a "fairness window," it does not arbitrate again until it receives Idle as the current fill word. The fairness process tries to provide an equal chance for ports to win access, but does not specify or guarantee equal time on the loop, equal amounts of data transfer or equal amounts of any other properties. It is not a straight-forward exercise to decide if ports are exercising fairness by only using the arbitration counters. An extended time (substantial fractions of a second) where a single port has access to the loop can be a symptom that other ports are being excluded from access. The first step is to determine if there are pending operations for the non-participating devices (Use the counter FC: exchanges, pending). The second step is to examine the Arbitration, Attempts and Arbitration Losses for the non-participating devices. If a user determine that other ports are arbitrating and have pending I/Os, but do not participate, then there is a possibility that a device is not exercising fairness.

The software package of the invention is also configured to monitor, analyze, and present information related to the transfer mode of the network. The FC-AL architecture allows a source port to acquire ownership of the loop via arbitration and then retain the loop for multiple tenancies thereafter (with multiple destination ports) without requiring additional arbitration attempts by the source port. This type of operation is called transfer mode and is used only infrequently by ports. Transfer mode is more likely to be utilized by initiators than by targets. The transfer mode is initiated by a port winning arbitration, opening a port and transferring data to it. At this point, the port closes the loop and immediately opens another port without relinquishing ownership of the loop, arbitrating among other ports, or exercising the fairness process. In the case of a port using transfer mode, it could feasibly retain ownership of the loop for an extremely long time, thus causing a large number of Arbitration Losses by other port. The FC: Arbitration, transfer mode Uses metric represents the number of times the selected port used transfer mode during activity. The value is a count of the number of times the selected port closed and subsequently re-opened the loop without arbitrating for the loop. These values are not reflected in the counts of Arbitration Wins. Large values of transfer mode Uses or long periods of transfer mode Uses can indicate potential loop starvation and fairness problems. Examine this metric in combination with the Arbitration Losses for other ports. The relationship between the two metrics shows whether or not using transfer mode causes other ports to fail when arbitrating for the loop. The FC: Arbitration, transfer mode Time metric shows the amount of time that was consumed in transfer mode usage for the selected port. It can be useful to compare this value (from report view) with the total time of the trace to gauge the relative impact of transfer mode usage. Note that in environments with only two devices on the loop (i.e. an initiator connected to an FL_Port on a switch), the use of transfer mode has little or no negative impact, as either device is capable of transmitting frames via full duplex and not likely to get starved out by the other device. A user can also correlate the number of transfer mode Uses with the number of Arbitration Wins for a specific port. The relationship between these two counters shows the ratio of transfer mode Uses versus the Arbitration Wins. Some devices utilize transfer mode for a large portion of their bus accesses. When the loop has relatively few ports on it, using transfer mode can help increase performance on long loops as it eliminates the Arbitration loop round trip time. As the number of ports on the loop increases, however, this can significantly degrade the performance of the fabric.

The software package of the invention is also configured to analyze port starvation on the network being tested. More particularly, the arbitration counters provide useful information when the loop has multiple ports and the ports are expected to have equal throughput, but they do not. Look for ports that have pending I/O operations and no opens (or tenancies) for a substantial period. This causes their FC: exchanges, Completion Time to become substantially longer than expected for the port. This pair may be starved for access due to another port using excessively long loop ownership or transfer mode. If a port has pending I/O operations and is showing no Arbitration Attempts, Wins, or Losses and the port does not open the loop, this also can indicate port starvation. The reason that no arbitration attempts are seen can be due to the position of the analyzer within the loop. Keep in mind that the port's arbitration attempts can be replaced by the arbitration attempts from another port that has higher loop priority. Depending on where the analyzer is placed, this situation may or may not be visible in the trace data.

The software package of the invention is also configured to monitor, analyze, and generate recommendations relative to credits.in the network elements. For example, credits are the flow control mechanism used in FC to assure that a destination port has buffer space for one or more frames. A FC destination port exerts flow control by granting credits to a source port. Each credit (R_RDY) allows the source port to transmit one frame, up to the maximum size specified in the port or Fabric Login. A source port maintains a credit count (or balance), adding credit when an R_RDY is received, subtracting credit when a frame is transmitted, and stopping frame transmission when the credit count is zero. The credit balance is the number of credits available at the source port. When a destination port sends one R_RDY for each frame buffer that it has available for use, and out of credit condition may be generated. The R_RDY words are substituted for fill words flowing from the destination to the source. Ideally, enough credit should be available at the source port so that it can transmit a frame, transmit the required minimum of six fill words, and immediately begin transmitting another frame. Most ports have a fixed number of credits available in their hardware. Destination ports should contain enough credits that the source port can sustain frame transmission without running out of credit. The total number of credits a destination port contains is not as important as the rate at which it processes them. However, situations can arise where upper level software does not allow the receiving port to process frames promptly, and the available credit can drop to zero. This halts frame transmission from the source port. Every OPN between a pair of ports starts a new credit arrangement between the ports in the Alternate credit Model. The source port sends OPN, and waits for the destination port to send R_RDY. The first R_RDY indicates "Receiver ready" and is one credit for one frame. The destination port can immediately send additional R_RDY primitives to indicate multiple free buffers. Because no frames can flow until credit is available at the transmitting port, the FC: opens, open to First Frame Time counter can help to isolate a destination port that is not giving credit promptly upon receiving an OPN. Ideally, this time should be about equal to the loop round-trip time. A significantly larger value adds useless time to a tenancy and reduces the data transfer rate. Another counter that might be useful is the FC: opens, open to R_RDY Time. Higher values can occur in the open to R_RDY time when the destination port is lagging in credit transmission. The counter FC: opens, opens without frames counts the number of times OPN was transmitted, but no frames were transmitted. All occurrences of open without frames consume the open-close overhead time of the loop without performing any useful work. This lowers the potential data flow between the ports. If non-zero values of the open without frames counter appear, examine the trace at that time to determine if credit was not available, or if the transmitter failed to transmit when credit was available. This counter is applied to a destination port because a lack of credit is the most common reason for no frames being sent. For example, to view the number of times a target caused open without frames to occur, select the data flow from the initiator To the target using the right direction (→) arrow.

The software package of the invention is also configured to handle evaluation of out of credit conditions. Specifically, some destination ports might close the loop when they run out of credit. Because the destination port is uncertain of the future time that buffers will become free, it can relinquish the loop to other ports. ports that have a small number of available buffers, or have slow service by upper level software and close the loop because of these conditions increase FC: exchanges, tenancies/exchange, and decrease counters like FC: tenancies, frames/tenancy. Performance bottlenecks occur when the credit balance is frequently equal to zero at close. Credit and Inter-frame fill words interact closely. A transmitting port that is out of credit continues to transmit fill words for a period and the Inter-frame Gap increases. If no credit is received for a long period, a transmitting port might close the loop to allow access for other ports. More particularly, the FC: credits, out of credit counter represents the number of times a source port has been out of credit (credit balance was zero at the end of frame transmission). The accuracy of this counter depends on the location of the analyzer in the loop. SANMetrics increments the credit counter when it sees an R_RDY from the destination port and decrements it after the end-of-frame (EOF) from a source port. The analyzer placement and propagation time on sections of the loop might cause the credit counter to be inexact under some circumstances. If the running credit balance for a source port is calculated at a value of one (at the point of the analyzer), this does not necessarily reflect the credit balance of the source port. A significant length of cable between the analyzer and the source port can cause this value to be incorrect. When a user measure out of credit situations, it is best to use a short cable to connect the analyzer to the device a user are measuring.

As noted above in the topology detection discussion, the software package of the invention employs a novel switch detection process to detect the presence of FC switch configurations in traces. Many of the switches on the market utilize "stealth" techniques to allow for interoperability with ports that do not support either public loops or switched fabrics. These switches still modify the behavior of the operations present and are identified to allow for the most accurate and complete statistics possible. When any switch is detected, it is grouped into either the N/F_Port or NL/FL_Port category, even though it might not behave as a pure N/F_Port or NL/FL_Port.

The following items represent some of the behaviors that SANMetrics flags as switch activity. Arbitration Wins and/or opens to and from ALPA 00. All FC-FLA compliant FL_Port reserve and use the loop Address of 00 h for arbitration. A successful OPN (followed with frame transmission) to or from ALPA 00 is considered to be a switch. Arbitration Wins by a port that does not open the loop. Stealth loops frequently Arbitrate using one ALPA, and then transmit an OPN from a different ALPA. Use of switch-based addressing in the source and/or destination ID. FL_Ports traditionally utilize the upper two bytes of the address to indicate the zone and port number of the physical component. FC-AL ports use only 1-byte addressing to communicate within an arbitrated loop. Addresses using the upper two bytes are assumed to be connected or participating in a switched fabric. Change of source/destination on frames within a tenancy. The FC-PLDA specification does not allow for frames from multiple source and/or destination pairs within a tenancy (OPN/CLS). For N_Port/

F_Port/E_Port configurations, the entire trace might have to be preprocessed to determine the location of the switch. With only two ports running as N_Ports, the analysis tool cannot determine the location of the switch, so both channels are assumed to have switches present, to avoid presenting misleading or incorrect counters. A successful F_LOGI to the switch. If the source port of the OPN has a different ALPA (lower byte only) than the source ID of the frames being transmitted. The same rule is also applied in reverse for the destination ports. On an arbitrated loop, ports arbitrate using their assigned addresses and are expected to send and receive frames only with that assigned ALPA address.

In a switched environment, it is essential to differentiate between the buffer-to-buffer communications and the end-to-end communications. Buffer-to-buffer communications involve the communications between two ports and end-to-end communications involve the end-points. Primitive sequences and Ordered Sets are generally consumed by the ports and are not transmitted to the end points in switched environments. This includes R_RDY, OPN, CLS, ARB, LIP, LR, etc. frames, on the other hand, are always transmitted between the communicating end-points. SANMetrics divides the metrics into groups of end-to-end and buffer-to-buffer addresses from this breakdown. End-to-end addresses are shown as the port ID followed by either the (F_Port) or (FL_Port) label. This indicates that frames had to flow through at least one switch (and a minimum of two buffers) to reach this port ID. The switch can and will affect the performance of this port ID. However, it is useful to be able to differentiate flow from different ports and ports for SCSI and exchange based statistics. Keep in mind that the switch is involved. When adding metrics that describe the buffer-to-buffer communications, the end-point addresses are not available for the ports on the switch channel. The switch is discarding and generating the Ordered Sets and Primitive sequences; the end-point is not receiving anything but frames. Metrics in an arbitrated loop configuration also describe both buffer-to-buffer and end-to-end addresses but are assumed to have no intermediate buffering; therefore, the end-to-end and buffer-to-buffer addresses are assumed to be equivalent.

In a switched loop environment, it is difficult to present valid metrics for the end-point components for counters such as Arbitration, tenancies, opens, full duplex, and credits. Any operation related to the arbitrated loop only describes the communication between the intermediate buffer and the end-point. The only counters that partially describe the end-points are metrics such as MB/Sec, frames/Sec, sequence, exchange, and SCSI counters. It is extremely important to keep in mind that these counters are affected by the intermediate buffering performed by the switch. Thus, they truly reflect interactions between the end-points and the intermediate buffering. With switched loop topologies (including public loop, Stealth loops, SL-port, Quick loop, etc.), SANMetrics identifies the presence of the intermediate buffers and modifies the initiator/target selections according to the topology.

When SANMetrics detects a switched loop configuration the names of the initiators or targets are modified. For example, if the analyzer is connected between the initiator(s) and the switch, only minimal counters that describe the target (s) will be available. In this configuration, a remote target with a port ID of hex 'EF' would be identified as EF (FL_Port), thus indicating the presence of an intermediate buffer or a series of buffers. Further, if the analyzer is connected between the target(s) and the switch, only minimal counters that describe the initiator(s) are available. In this configuration, a remote initiator with a port ID of hex '01' would be identified as 01 (FL_Port), thus indicating the presence of an intermediate buffer. If any counter describing arbitrated loop functionality (Arbitration, tenancies, opens, full duplex, and credits) shows up as FL_Port. Note that the final port address is not available. Do not attempt to describe the ports with these types of counters; it is incorrect. This information, however, can provide significant insights into the FL_Port behavior. The FL_Port designation can represent a number of different topologies present in the industry today, including public loop (FC-FLA), Stealth loop, Quick loop, SL-ports, etc.

When analyzing traces captured on a switched fabric, SANMetrics removes the arbitrated loop counters and adds several new counters relative to N_Port/F_Port operation. Due to the intermediate buffering inherent in F_Port operations, performance characteristics are highly affected by the F_Port and any intermediate buffers that exist between the source and destination ports. Depending on the configuration, SANMetrics determines the ports that are "behind" the switch (on the other side of a buffer) and changes the port name to reflect this determination. For example, if the analyzer is connected between the initiator and the switch, a remote target with a port ID of hex 'C00500' is identified as C00500 (F_Port), thus indicating the presence of an intermediate buffer. Further, if the analyzer is connected between the target and the switch, a remote initiator with a port ID of hex 'C00100' is identified as C00100 (F_Port), thus indicating the presence of an intermediate buffer. If the switched fabric topology is different in that there are no Arbitrations, tenancies, opens, or any of the normal constructs found in arbitrated loop topologies. For this reason, any counters related to Arbitrations, tenancies, or opens are eliminated when switch fabric topologies are detected in the trace. Additionally, with respect to full duplex Operation in switched fabric Topologies, full duplex operation is inherent in switched fabric topologies and occurs at any time, as long as either transmitter (N_Port or F_Port) has available credit. Full duplex operation in a switched fabric topology bears no meaningful statistics. For this reason, any counters related to full duplex operation are not available.

Credit flow is completely different in a switched fabric environment and is measured differently than in arbitrated loop environments. N_Port and F_Port ports use the Base (or Basic) credit Model when communicating. When the N_Port performs FLOGI, the ports declare the number of credits available. Both the F_Port and N_Port maintain a running balance until a link reset (LR) or subsequent FLOGI occurs. For this reason Available, Given, and Consumed credit metrics are not available in these configurations.

Although the arbitrated loop (both FC-AL/PLDA private loop and FC-FLA public loop) architecture has fantastic potential for high performance, there are also several common challenges associated with these configurations. With efficient design and implementation of the SAN and the devices on the SAN, this performance is quite achievable. However, there are many pitfalls and traps when implementing Storage Area Networks or designing FC components. Many of these pitfalls can lead to performance problems and bottlenecks on the loop. For example, out of credits issues present a challenge to FC based SANs. Out of credits situations occur due to two main factors: inefficient processing or system bus architectures (the bus the FC data is being delivered to), and insufficient credits implemented on the device to handle the long logical delays in round-trip time inherent in arbitrated loop architectures. Counter-intuitively, the out of credit counters in SANMetrics sometimes do not show many out of credit situations. Most of the time, if a loop device is out of credits, it will simply transmit a CLS in response to an OPN from another device. Additionally, there are challenges related to open/close without frame transmission. This is the response of CLS by a device without frames being transmitted. In most cases, the device does not have credits available. In other cases, there may be credits available and/or transmitted, but the device that opened the loop no longer has a frame to transmit. This is a sign of loop sequencer problems in the ASIC. In an out of credit situation, a device responding with CLS can easily causes problems on the loop. When receiving a CLS following an OPN, many devices will immediately turn around and attempt the OPN again. Depending on the implementation of the device, this can flood the loop with retries and disallow transmission of any frames from any device. Generally, this deadlock ends in a link reset situation. Further, opens ended by destination situations present challenges. Again, this is generally a strong indicator of credit problems by the destination. This is caused by bad sequencer engines in the destination that are unable to handle full duplex transmission or process frames quickly enough to keep credits available to the source port. Tenancy timers that are too short can also cause this. If the destination is attempting to "time-slice" its usage on the network, it can end tenancies before they complete to attempt to transmit data to another device. Further, long loop round trip times present challenges. Long round-trip times on an arbitrated loop can cause serious performance problems depending on the number of frames per tenancy that are being transmitted on the loop. Thus, smaller SCSI I/O operations (i.e. 2 k reads and smaller) will be highly affected by loop length, whereas larger I/O operations (i.e. 32 k reads and higher) will generally remain unaffected, provided the number of frames per tenancy is reasonable. Each re-timer on an arbitrated loop adds a delay of approximately 100m of length on the cable (around 12-13 words of delay on an multi-mode optical cable). In a loop with 8 drives and an initiator (all re-timers), there would be an approximate expected delay of ~900 m of cable. At 7.7 meters/word (the typical propagation delay of light in glass), that equates to 116 words of round trip time. At 1 Gbaud (37.64 ns/word), that is the equivalent delay of 4.336 us for each round trip. Keep in mind that a 2 k frame at 1 Gbaud takes about 20 us to transmit. A typical loop tenancy requires 3 round trips, just to transmit one frame. If a device is only transmitting one 2 k frame per tenancy on this loop, it would take 20 us to transmit the frame and about 17 us of loop overhead –85% overhead on this simple loop. Fortunately, there are many techniques and devices can be utilized to overcome this overhead. For example, transmitting multiple frames per tenancy, especially for multi-frame sequences (i.e. SCSI data), transmitting data for multiple sequences and/or exchanges per tenancy, full duplex utilization—send single-frame sequences (or, even better, multi-frame) to a device while it is sending frames to a user, which works well for the SCSI single frame sequences. Further, proper alternate credit usage can remove one round trip on every tenancy, and switched loops can overcome this by transmitting data from multiple ports to an FL_Port device in a single tenancy. In a switch environment with only one NL_Port present, the switch can keep the loop open for extremely long bursts (1+seconds) and transmit thousands of frames within a tenancy. As long as the credits remain flowing between the devices, wire speed full-duplex performance can be achieved on a loop in this manner. There are many issues that can arise in these situations with sequencer problems. Some devices have short loop timeout values that get set off after 1-2 seconds, even though frames are flowing normally!!! Thus a user will see an extremely long tenancy with thousands of frames ended by a LIP for no apparent reason. Other NL_Ports will have problems when they open the FL_Port to transmit data; they only allow transmission to one destination port (i.e. following PLDA/FC_AL rules, not FLA). Thus these devices will timeout on LP_TOV after thinking that they are unable to transmit frames to a different destination—even though all of the frames will go through the switch and get sent to the FL_Port. In certain cases, this malformed logic also occurs when the switch opens devices.

Failed opens also present challenges in this situation. Failed opens generally result from one of several situations. Incorrect analyzer placement, for example, occurs when a user is not capturing both sides of a loop conversation—this has nothing to do with performance problems. Poor sequencer implementation by the device that transmits OPN. Normally, the device that opens is transmitting an open to itself. The reason that many devices do this is that they transmitted a frame in a previous loop tenancy via full duplex, but had already armed their loop sequencer and it had started arbitrating for the loop. Once it wins the loop arbitration, it discovers that it doesn't have a frame to transmit, so the device opens itself and closes the loop, thus wasting the entire benefit of doing a full duplex frame transmission in the first place. A device goes to a non-participating state either temporarily or permanently. Sequencers that have a frame to transmit to a loop device will attempt to open the device. The OPN is not consumed by the device, so traverses the entire loop back to the device that issued the OPN (thus showing up on both channels of the analyzer). In most loop sequencers, this is a very difficult situation to handle. Some will enter a lock-step, repeatedly attempting to open the same device until a timeout value (generally LP_TOV) is reached. Other devices will link reset immediately.

Bad transfer mode usage (Arbitration Starvation) may also cause challenges. Many devices in the early stages of their development will utilize transfer mode to attempt to improve loop performance. Unfortunately, it is not uncommon to see devices keeping the loop for 10 ms (or more!) at a time and causing horrible loop congestion problems. Used carefully and sparingly, transfer mode can be very helpful in short bursts. Most implementations end up simply causing congestion and performance problems on the loop.

Failure to utilize available alternate credits can also present challenges. Some storage devices and a few initiators in the industry advertise alternate credit values other than 0 at login. This implies that the source device can transmit a number of frames following an OPN without having to wait an extra loop round trip time (½ round trip for the device to receive the OPN, and ½ round-trip for the corresponding credit to come back). Surprisingly, most initiators (and switches!) do not take advantage of available alternate credits, thus creating a two-fold problem: The wasted extra round-trip and the extra credits advertised are gone forever. If a device advertises the alternate credits, it has to be prepared at any given time to receive that number of credits. Thus if a device has 4 credits (which is common) and reserves two credits as alternate credits, it effectively only has Two credits for operation when other devices don't take advantage of them. This can cause an extra-ordinary amount of out of credit situations and serious loop bottlenecks.

With regard to measuring loop round trip time, assuming the analyzer has the initiators and targets logically grouped per channel by device function (initiator and target), there are two counters a user can use to get an estimate of the round-trip time of the loop. First FC: opens, open to R-RDY Time represents the maximum value for one initiator to one target in the bi-directional mode indicates the amount of time (in microseconds) for one round-trip around the loop. Second, FC: opens, open to First Frame Time represents the maximum value for one target to one initiator in either the left direction or right direction mode indicates the amount of time (in microseconds) for one round-trip around the loop.

With regard to overlapped time handling, with two independent pieces of RAM (one per channel), the analyzer will frequently wrap around during trace capture, with the two channels filling at different rates. When this occurs, the two channels will not contain data that has the same starting time. SANMetrics handles this condition automatically by discarding data up to the point at which it has retrieved data on both channels. When data from multiple analyzers is processed, SANMetrics discards all data up until the point that all opened channels have overlapping timestamps, to allow for direct correlation between the analyzer ports and to maintain statistical consistency. TraceView also contains a feature to eliminate this unusable time through the "Show Overlapping data" button on the toolbar.

TCP, iSCSI, and FCIP Handling

SANMetrics handles the TCP layer as an omniscient TCP Source and Destination Port. Each frame is tracked per Source Port and Destination Port and held in a buffer until the Destination Port acknowledges the frame. Once acknowledged, the frame is sent to the SANMetrics iSCSI engine for processing. This allows for accurate and distinctly separate analysis of the TCP and the protocols that it is carrying. With this approach, SANMetrics is able to correctly rebuild TCP transmission stream data, just as a TCP port would. This approach allows for detailed analysis of the TCP layer, including retransmission timing, improper acknowledgments and missing stream data.

There is a very important implication here. Although the frames may appear visibly in the trace at a certain time, SANMetrics will not process the TCP data segments carried in those frames until they are acknowledged. For instance, lets assume we have a trace with an iSCSI Command at a timestamp of 1 ms. The frame is not acknowledged until 2 ms. The iSCSI processor will receive the frame at 2 ms and begin processing of the frame at this time. Thus graphing iSCSI data displayed (in a time-based format) will show the event as occurring at 2 ms. Correlation between a time-based graph view and the trace can prove to be an interesting challenge in certain situations. In all situations, SANMetrics attempts to describe the situation as accurately as possible, referring to the key timestamps in the trace that allow for analysis of behaviors.

Measuring performance of a TCP port requires several different approaches and techniques. TCP devices tend to be "self-optimizing" in nature, thus behaviors in traces can be somewhat difficult to understand or measure. With that said, there are some key measurements in any TCP system that will help to analyze the performance of the TCP layer.

For all TCP metrics, the starting time at which the value will be plotted is the same as the starting time of the Gigabit Ethernet event as viewed in the Finisar TraceView software. This allows for easier location of events in time and more simple correlation of plotted metrics to the trace. In the interest of statistical accuracy, however, it is important to note that the TCP Segment does NOT actually occur at the same time as the Gigabit Ethernet packet—it follows the Ethernet layer (14 bytes) and the IP header (usually 20 bytes). Each byte in Gigabit Ethernet takes 8 ns to transmit, so the actual time that the TCP header is transmitted on the wire is 34*8 ns (272 ns) later than the start of the Gigabit Ethernet header. Since SANMetrics was designed to allow for correlation to a trace, the starting times of the frames will be equivalent for measurement purposes, but the ending times will differ. The TCP values will appear to end "earlier" than the Gigabit Ethernet values. This distinction is only relevant when zooming deeply into the trace and viewing throughput of individual frames. In any case, the statistics are still statistically accurate.

TCP utilizes flow controls to manage data delivery. Utilizing these flow controls, TCP can force retransmission, reassemble segments of data delivered out of order, and manage the amount of data it will allow at any point in time.

Each TCP header contains three flow control variables: Window Size, Sequence Number and Acknowledgment Number. With these three key variables, TCP manages the data.

The Window Size allows a TCP Port to advertise how many bytes it is capable of receiving from the other Port. When the available buffers on the Port diminish, the Port can reduce its advertised Window Size and reduce the maximum amount of data the other Port can transmit without a refresh in the Window Size. When this occurs, the Window is said to be Closing. When the receiving port frees available buffers, it will again advertise these buffers as available by Opening the Window (increase the Window Size advertisement). When the Window Size is 0, new data cannot be sent (although the port MUST always reserve 1 byte of space for the reception of SYN or FIN) until the Window Size increases. This covers only new data, retransmitted data can be sent regardless of the Window Size as it replaces existing data in the receiving Port's TCP buffers.

The Sequence Number indicates the current offset at which the TCP Source Port is transmitting data. When a connection is formed between a Source Port and a Destination Port, an initial sequence number is established. Every time a frame is transmitted that carries TCP data, the Sequence Number is incremented by the number of data bytes (not including the TCP header) that were transmitted. The receiving port then utilizes the Sequence Number to re-order the data into a local buffer. When the Destination Port processes the data from this buffer, it utilizes its Acknowledgement Number (ACK Number) to positively acknowledge that the data has been processed. The ACK Number sent by the Destination is equal to the HIGHEST received Sequence Number that the Destination Port has processed.

As mentioned earlier, acknowledgements in TCP are utilized to positively acknowledge data. There is no provision in TCP to negatively acknowledge missing or improper data. If data is not received or received improperly (bad checksum, CRC, dropped frames, etc.), then the Destination Port will only acknowledge up to the highest byte it has received properly from the Source Port. The Destination will not change this ACK Number until the Source retransmits the necessary data at the ACK Number value. This places the burden on the Source Port to determine when there is a problem and how much data to retransmit to correct the problem as efficiently as possible—without flooding the wire with retransmitted data.

TCP Ports employ a number of techniques (Slow Start, Fast Retransmit, Fast Start, and Fast Recovery to name a few) to detect when retransmission is necessary and to determine what data to retransmit. The Source Port will set timers on the data and determine from the timing of the incoming acknowledgements whether a retransmission is necessary. Alternately, the destination port can send multiple acknowledgement packets with the same offset to attempt to trigger a Fast Retransmit (retransmission without waiting for a time-out) by the source port. Many TCP Ports utilize one or more of these pacing techniques to detect whether an acknowledgement is due to the Destination Port lagging behind in processing or if it is indeed requesting a retransmission of data.

Once retransmission is deemed necessary, a TCP Port has a number of methods in which it can chose to retransmit data. There are a number of RFC papers that cover a large number of different techniques to facilitate fast recovery when retransmission is necessary. The two basic approaches are a fast method and a slow method. A fast method would be to retransmit the smallest possible amount of data (generally one MTU—or frame size) at the requested ACK Number. This method assumes that only one segment has been corrupted and upon receipt of the retransmission, the Destination Port will be able to acknowledge the remaining unacknowledged data (or at least a port larger than the retransmit size). The slow retransmission method assumes that all data from the received ACK Number to the current transmission Sequence Number is bad and ALL data from the ACK Number offset gets retransmitted, thus possibly retransmitting irrelevant data and adding to network congestion by retransmitting too much data.

Obviously, there is a happy medium somewhere in between the fast method and the slow method. The inherent challenge of the TCP port is adapting the detection of missing data and the retransmission of the data to the behavior of the network. A FTP transfer and a WWW request on TCP have completely different characteristics that should be optimized differently by the TCP Source Port. TCP behaviors can prove to be very challenging debug situations without information or insight into the behaviors of the TCP port.

SANMetrics makes a distinction between two different types of retransmission done by TCP: A Retransmission is considered to be the exact retransmission of a previous data segment—i.e. the retransmission frame replaces one complete frame. A Repacketization is a retransmission in which the single retransmitted frame displaces only a part of a frame or more than one frame. For example, the single retransmitted packet could be two times longer than the original transmission, thus it replaces the original transmission as well as additional bytes in one or more packets past the retransmission.

SANMetrics also distinguishes between "previously unacknowledged" data and "previously missing" data. "Previously unacknowledged" data is data that SANMetrics has previously seen for this Source/Destination and has stored away pending acknowledgement. When a retransmission replaces this frame, it is considered to be a Retransmission of a previously Unacknowledged Data Segment. "Previously missing" data is data that has never been seen by SANMetrics (and therefore likely to have not been seen by the Destination Port) and essentially represents a "gap" in the data that is pending acknowledgement. When the Gap is detected, this is called an Out Of Order segment. When a retransmission fills this gap, it is considered to be a Retransmission of Missing Data Segment.

The SANMetrics iSCSI analysis engine was developed based upon iSCSI Draft version 12 through 20, but it does support earlier drafts through version 6+. The errors, warnings and measurements are slanted more towards post version 12 implementations and use of SANMetrics on Draft 6+ through Draft 11 traces may produce some errors or warnings inconsistent with these specification. In these situations, these errors are easily identified through the help text and can be disabled so that they do not appear in subsequent trace analysis.

The SANMetrics approach to analyzing iSCSI is very much the same approach that an Initiator and Target would take when processing iSCSI data streams. The first step is to identify the locations of the PDU headers within the stream for each port pair. After this is complete, analysis and measurements of iSCSI begins. SANMetrics rebuilds the iSCSI and SCSI layers from the data available within the trace. This is done for every Initiator/Target pair found within the trace. Exchanges (or Tasks) are checked every step of the way and statistics are produced when each exchange completes.

The emphasis of SANMetrics is to facilitate debugging of upper-layer protocol events as well as measurement of every possible detail of the protocol to enable performance tuning and enhancements. There are currently over 400 Gigabit Ethernet, IP, TCP and iSCSI error and warning checks performed on every PDU within the iSCSI stream. Some of these checks are as simple as looking at bits in the BHS for valid usage, others are as complex as analyzing the data burst rates of the iSCSI exchanges and the latency imposed upon iSCSI by the TCP layer.

Most of the emphasis in SANMetrics is placed on error recovery and data integrity. Overall there are some powerful error recovery procedures outlined in the ISCSI Drafts, however, if history holds true, most devices will not take advantage of these features and simply rely on the SCSI to time-out and recover itself. This requires Upper Layer Protocol and operating system time-outs, which range from 45 seconds to minutes. Quite unacceptable from a high performance, high availability standpoint!

SANMetrics measures iSCSI activity in two different ways. All measurements that deal with exchanges and components of the exchanges are placed into the iSCSI LUN protocol. This protocol type uniquely identifies an Initiator/Target/LUN nexus. Each of these measurements is only valid with a designation to a LUN.

The base protocol (iSCSI) has no references to LUNS. The measurements made at this level are only relevant and meaningful for the Initiator and Target. These measurements currently include the Sequence Numbering statistics and PDU counts.

A trace captured of TCP/IP traffic on Gigabit Ethernet is a representation of continuously increasing timestamp values. The capture represents the activity of the wire. However, TCP uses buffering and flow control techniques to insure delivery of stream data to the iSCSI layers below it. Thus iSCSI does not "see" the data until it has been acknowledged by the TCP layer (or at least received completed and accurately with an acknowledgement following shortly thereafter). The SANMetrics iSCSI layer behaves like an omniscient iSCSI port (both Initiator and Target functionality) and does NOT process data from the TCP layer until the receiving TCP port has acknowledged it. This leads to a quantum shift of time when reporting measurements and metrics at the iSCSI layer. This time shift represents the amount of time it takes for TCP to transmit all of the data (including retransmissions if they occur) plus the amount of time for the receiving port to acknowledge the data.

To process ISCSI, SANMetrics requires every byte of the data carried on TCP to be present in the trace. If this data is not present (filtered out), or the TCP ports in the trace are missing data at the TCP level, SANMetrics must reset the iSCSI and TCP layers and begin anew with the streams. An error will be generated in the Error Log when this occurs.

In most cases, this error occurs when traces are captured during periods of heavy TCP retransmission and the data at the start of the trace contains only a retransmission followed by an acknowledgement of more data than the retransmission. In this case this error should be ignored. Unfortunately, it is not always a simple task to identify this scenario. Look for repeating ACK values from the Destination Port (an attempt by the Destination Port to trigger the retransmission) followed by a large increase in the ACK number following the retransmission. When TCP retransmits data, it does not normally retransmit ALL of the unacknowledged data, just a small portion of the data at the unacknowledged offset will be retransmitted (usually one or two frames). In these cases, the error serves as an informational message about the state of SANMetrics being reset.

In any other case, this error indicates that a bad acknowledgement has occurred at the TCP level and the Destination Port is now attempting to process non-existent data! This is a catastrophic error that will only lead to data corruption or lost data.

When SANMetrics detects this situation, it has no recourse other than to discard all pending TCP frames (up to the received ACK number) and reset the iSCSI layer below it (if the TCP port is carrying iSCSI data). The reset of the iSCSI port involves discarding ALL pending exchanges and attempting to locate the next valid iSCSI PDU header in the next acknowledged frame. All statistics at the point of the missing data will be rendered invalid and new statistics collection will begin again.

An iSCSI stream error occurs when, while processing the TCP data stream for this Source and Destination Port, the next BHS header is not located where it must be for the data to be accurate. Once it has found the first valid PDU follows the TCP data stream EXACTLY like the iSCSI Initiator and Target would. Each subsequent PDU header is located at a specific location with the stream. When SANMetrics jumps to the where the next BHS header and examines the data as a BHS, some basic checks are made to ensure that it is a valid BHS. If it is not valid, this error is produced and the SANMetrics iSCSI engine is reset to attempt to find the first PDU again.

In most cases, this error will occur when the very first PDU in the trace was incorrectly detected by SANMetrics. Any random number of bits in a trace can look like a valid PDU, but not actually be a valid PDU. The code in SANMetrics puts forth an extraordinary amount of effort to determine that the BHS is indeed a BHS. There is absolutely no way, however, to make any 100% accurate determination (from a code standpoint) of where the first PDU resides within a trace. Keep in mind, SANMetrics does not always have the benefit of knowing where the stream began (with SYN), thus some "educated" guesses have to be made. It is helpful to examine where SANMetrics found the first PDU (an informational message is provided for each TCP port where the first PDU was located) and see if it is a "real" PDU or a random happening of data that tricked SANMetrics.

Exemplary Errors and Warnings

As briefly discussed above, in addition to being able to track, analyze, and display several metrics related to network performance, the software package of the invention is also configured to analyze the data trace and identify operational errors from the data trace. Further still, the software package of the invention is configured to analyze the data trace and determine when an error is likely, and in response thereto, generate a warning prior to the error actually taking place. Although there are several hundred errors and warnings that the software package of the invention is configured analyze for, a select few will be presented herein. However, it is understood that the invention is capable of analyzing the data trace for several additional errors that are not expressly listed herein.

One common error is a failed open or an open detected while the loop is in an open state. A warning for this error is valid only for arbitrated loop (private and public) topologies. This warning occurs when SANMetrics sees a device open the loop followed by another attempt to open the loop before the first open has ended the loop tenancy by closing the loop. This warning can be caused by a device attempting to OPN another device and the device does not consume the OPN from the loop (i.e. the device is no longer participating on the loop). This warning can also be caused by a device transmitting an OPN, the OPN flowing around the loop, then the device closing the loop. There are several industry standard FC devices that do this periodically for a number of reasons. The first reason that this happens is due to sequencer inefficiencies in the device that sent the open. The source had a frame to transmit, so begun to arbitrate for the loop. While arbitrating, the source gets opened by the destination it has a frame to transmit to and the source transmits the frame via full duplex. The source should now back off its arbitration, but many devices do not have the capability to do this. Instead the source will open itself and then immediately close the loop. Another reason why this happens is due to devices having to transmit frames every one to two seconds to maintain their on-chip cache coherency. When a link is idle, some devices will arbitrate, open and transmit a frame to themselves (usually Link Echo or Link Test) every one to two seconds. Although this allows the source device to maintain integrity or state, this can have an impact on the performance of a loop if it happens frequently. Each time a device opens itself, it wastes a minimum of three round trip times on the loop—this easily outweighs the benefit of the full duplex frame transmission in loops with many devices or long round trip times. This warning can also be caused by an improper GT/GTX Analyzer placement or configuration. The most common problem is in multi-initiator and multi-target loop environments. The analyzer should be placed between the Initiators and Targets. Any frame activity that occurs during a failed OPN or while the loop is seen to be in a closed state (from the Analyzer's viewpoint) is discarded and no Initiator/Target pairs are created for these frames.

Another error or warning is a failed open when multiple devices are attempting to open the loop simultaneously. This warning is generally valid for arbitrated loop (private and public) topologies. This warning happens when one device opens a loop followed by another device attempting to open the loop before the first device has closed the loop. This situation would be caused by a bad sequencer implementation on an L_Port, NL_Port or FL_Port device. The first device that opened the loop has either improperly allowed an Arbitration attempt to pass through it, or the second device has attempted to open even though it hasn't properly arbitrated and won the loop. This situation usually causes a loop Initialization to occur. This warning can also be caused by an improper analyzer placement or configuration. The most common problem is in multi-initiator and multi-target loop environments. The analyzer should be placed between the Initiators and Targets. Any frame activity that occurs during a failed OPN or while the loop is seen to be in a closed state (from the Analyzer's viewpoint) is discarded and no Initiator/Target pairs are created for these frames.

Another error or warning is ARB F0 while loop in closed state. This warning is generally valid for arbitrated loop (private and public) topologies. This warning is the detection of an ARB(F0,F0) primitive while the loop is closed. Typically, the loop owner will reset the current fill word to Idle upon relinquishing the loop. Some devices will not do this properly. In other cases, a device will arbitrate for the loop, win arbitration and set the current fill word from Idle to ARB(F0,F0) BEFORE transmitting the OPN. Per the FC AL standard, the next transition following an ARB WIN is OPN—thus the current fill word should not be reset until the OPN has been transmitted. There are a large number of devices that show this behavior. This warning does not occur during periods of transfer mode usage, where the current fill word is maintained throughout multiple tenancies. In general, this behavior does not have any known negative effects on loop performance or behavior.

Another error or warning is an Illegal ARB value—XX/YY Values Mismatch. This warning is valid only for arbitrated loop (private and public) topologies. This is an arbitration in the form ARB(XX,YY) in which the XX and YY values do not match. This is a protocol error. In most cases, this will cause a disparity error or code violation. ARB values must match to allow for a redundancy check on the received ordered set.

Another error or warning is when the OPN/CLS time on link exceeds a predetermined threshold. This warning is valid only for arbitrated loop (private and public) topologies. This threshold warning indicates that the time on link for the indicated source and destination has exceeded the set value. With the default threshold values, this is used to watch for tenancies that are consuming too much link time between the two devices. The amount of time a pair of devices spends on the link can have a significant overall impact upon the performance of the loop with multiple devices. Typically, devices should relinquish the loop to allow time for other devices to participate and gain control of the loop. In NL_Port/FL_Port environments with only one device on the loop, it is not uncommon to see one to two second tenancies occurring, as no other devices are present to arbitrate for the loop and all frames can be transmitted via half or full duplex if credits are available. Many devices have loop open timers that expire after one to two seconds, regardless of whether or not frames are still flowing. In these situations, these devices can construe the timeout as a link error and terminate the tenancy with a LIP (link reset). In other situations, some devices are not capable of transmitting frames to different destinations within one loop tenancy. The switch can still hold the loop open for one to two seconds and the NL_Port device will LIP due to a sequence timeout or other transmission error. This threshold warning can be utilized to easily identify situations like these, as well as others.

Another error or warning is when both an OPN and a CLS operation occur without frame transmission. This warning is generally valid for arbitrated loop (private and public) topologies. This warning occurs when a device opens another device and the tenancy is terminated (either by the source or destination) without any frame transmission occurring. This generally indicates out of credit situations on the loop. When a device receives the OPN and does not have any free credits, it can either hold the loop open until it has a free credit or it can respond with a CLS and terminate the tenancy. This can lead to many different problems and certainly indicates loop congestion. When receiving a CLS in response to an OPN, some devices will simply retry (forever!) until the destination device finally returns a credit to the source and the frame can be transmitted. When this happens, the loop is usually flooded with OPN and other devices are unable to win arbitration on the loop. This congestion situation can quickly turn into timeouts and link resets occurring. In a busy switched loop environment, the switch may frequently transmit CLS in response to an OPN due to bottlenecks occurring on other switch ports. In these cases, it is useful to investigate data flow on the other switch ports. This situation can also have an enormous impact on the overall performance of the loop depending on the number of devices/re-timers on the loop and the length of the loop. Each OPN/CLS generally wastes three times the average round-trip value, so thousands of these occurring per second can saturate a loop. To gauge the impact of this, multiply the total number of occurrences times the average round-trip time of the loop (see the metrics: FC: opens, open to First Frame Time and FC: opens, open to R-RDY Time)—this will give an approximate amount of total time that was wasted in tenancies without frames. Occurrences of this can also be graphed using the FC: opens, opens Without Frames metric. It is also useful to look at the FC: opens, opens Ended by destination metric in this situation. The number of OPN/CLS without frame transmissions that occur on a link are also counted as a part of the % Abnormal Tenancies threshold. The total count column shows the number times this has occurred throughout the trace.

Another error or warning is a code violation. These are events that generally occur on the local link segment. The Analyzer flags events that SANMetrics receives as code violations. Generally, a code violation is a bit error or disparity error occurring in a primitive sequence or Ordered Set. A Loss of Sync condition is a repetition of 3 or more code violations. Unframed data is an Ordered Set that does not have a proper K28.5 character as the starting delimiter (i.e. another term for a Code Violation). It is important to note that for all of these types of errors, only the occurrences of the events are counted, not the number of actual repeated events. For example, a continuous stream of 2000 words of unframed data is counted as 1 unframed data event. These errors can also be graphed using SANMetrics to correlate the events with other performance and debugging metrics. The errors can be found in the FC: Trace and Error Events counters. It is also important to note that many components can be involved when a CRC error or other bad frame transmission occurs. Generally between two devices connected together in a point-to-point fashion, there are 6 potential points at which errors can occur (10 if a user add an analyzer in-line). These are: first, from the FC ASIC to the SERDES on either device; second, from the SERDES to the physical transmitter (generally a GBIC or fixed media transmitter) on either device; and third, on either transmit wire between the devices. Further, if a user add the analyzer in-line, a user add many more degrees of complexity in debugging these issues. The additional components required to analyze in-line include two GBICS, and one more cable, in which either transmitting wire can fail.

Another error or warning is a loss of synchronization. These are events that generally occur on the local link segment. The Analyzers flag events that SANMetrics receives as loss of sync. Generally, a code violation is a bit error or disparity error occurring in a primitive sequence or Ordered Set. A Loss of Sync condition is a repetition of 3 or more code violations. Unframed data is an Ordered Set that does not have a proper K28.5 character as the starting delimiter (i.e. another term for a Code Violation). It is important to note that for all of these types of errors, only the occurrences of the events are counted, not the number of actual repeated events. For example, a continuous stream of 2000 words of unframed data is counted as 1 unframed data event. These errors can also be graphed using SANMetrics to correlate the events with other performance and debugging metrics. The errors can be found in the FC: Trace and Error Events counters. It is also important to note that many components can be involved when a CRC error or other bad frame transmission occurs. Generally between two devices connected together in a point-to-point fashion, there are 6 potential points at which errors can occur (10 if a user add an analyzer in-line). These are: first, from the FC ASIC to the SERDES on either device, second, from the SERDES to the physical transmitter (generally a GBIC or fixed media transmitter) on either device, and third, on either transmit wire between the devices. If a user add the analyzer in-line, a user add many more degrees of complexity in debugging these issues. The additional components required to analyze in-line include two GBICS, and one more cable, in which either transmitting wire can fail.

Another error or warning is unframed data. These are generally events that occur on the local link segment. The analyzers are configured to flag events that SANMetrics receives as unframed data. Generally, a code violation is a bit error or disparity error occurring in a primitive sequence or ordered set. A loss of sync condition is a repetition of 3 or more code violations. Unframed data is an ordered set that does not have a proper K28.5 character as the starting delimiter (i.e. another term for a code violation). It is important to note that for all of these types of errors, only the occurrences of the events are counted, not the number of actual repeated events. For example, a continuous stream of 2000 words of unframed data is counted as 1 unframed data event. These errors can also be graphed using SANMetrics to correlate the events with other performance and debugging metrics. The errors can be found in the FC: Trace and Error Events counters. It is also important to note that many components can be involved when a CRC error or other bad frame transmission occurs. Generally between two devices connected together in a point-to-point fashion, there are 6 potential points at which errors can occur (10 if a user add an analyzer in-line). These are: 1. From the FC ASIC to the SERDES on either device. 2. From the SERDES to the physical transmitter (generally a GBIC or fixed media transmitter) on either device. 3. On either transmit wire between the devices. If a user add the analyzer in-line, a user add many more degrees of complexity in debugging these issues. The additional components required to analyze in-line are: 1. Two GBICS; and 2) One more cable, in which either transmitting wire can fail.

Another error or warning is or the link reset (NOS). These errors occur when SANMetrics sees a stream of 3 or more continuous NOS or OLS primitives or a stream of 12 or more continuous LIP primitives. There exist a myriad number of reasons why link resets occur and enumerating them is beyond the scope of this document. Generally, link resets occur either due to events immediately preceding the link reset (fairly easy to debug using either Trace View or SANMetrics), or a long time before the link reset occurs (which can be illustrated by the SANMetrics pending exchanges). Between the graph counters, reports and errors in SANMetrics, it is generally possible to debug most of the link reset situations that occur in traces.

Another error or warning is when an open is ended by a destination. This warning is valid only for arbitrated loop (private and public) topologies. This warning occurs when the destination of the tenancy (the device opened by the source on the loop) terminates the tenancy early by transmitting CLS before receiving a CLS from the source of the tenancy. Typically, every tenancy is ended by the source port (the port that transmitted the OPN). When the destination port ends the tenancy first, it is either out of credits or attempting to follow some form of fairness to keep it from being active on the link for extended lengths of time. Most commonly, the destination port will end the tenancy early because it can no longer receive frames due to its own credit and/or processing limitations. When this occurs, loop time is wasted because the source port has to re-arbitrate for the loop and re-open the destination port to continue frame transmission. Device implementations vary in the amount of time that they will allow the link to remain open without credits available. Some devices simply close immediately when out of credits. Other devices will wait for 20-250 us (or longer) in the assumption that within the allotted amount of time, a new credit will be available to transmit to the source port. Open ended by destination can have a severe impact on loop performance if seen in any significant percentage (5% or higher).

Another error or warning is when the time in transfer mode exceeds a predetermined threshold. This warning is valid only for arbitrated loop (private and public) topologies. This warning occurs when any device utilizes transfer mode for a period of time that exceeds the specified threshold value. The time in transfer mode is defined as the time when the device first wins arbitration to the time when the device closes the loop (after any number of transfer mode tenancies) and relinquishes control of the loop for another device to win arbitration. During this time, all other devices are blocked from winning arbitration and access to the loop. Large values of time in transfer mode can indicate potential loop starvation and fairness problems. This threshold is designed to allow for investigation into potential starvation issues on the loop. The threshold value is set in milliseconds. It may be useful to examine the average Time on Link values (in report view or Graph View) to determine approximately how long each tenancy is. Additionally, it can be useful to examine the total amount of time spent in transfer mode in the detailed report and compare it with the total time of the trace. Keep in mind that on a loop with only two devices (especially with switched loops), the amount of time spent in transfer mode is generally irrelevant. In this situation, the two devices can remain open as long as they have credits and there is normally no arbitration contention as either device can utilize full duplex to transmit any frames.

Another error or warning is when a percentage of arbitration losses exceeds a predetermined threshold. This warning is valid only for arbitrated loop (private and public) topologies. This warning occurs when the percentages of Arbitration Losses by ALL devices exceeds the specified threshold. Losses are qualified by identifying the arbitration attempts by a port followed by a different port opening the loop. The port that opens the loop is considered to have won arbitration, any other ports that were arbitrating are considered to have lost arbitration. Arbitration Losses can have a significant impact upon performance of a loop, depending upon the number of devices on the loop and the logical length of the loop. This threshold helps to flag situations that may be excessive or causing performance problems on the loop. When this warning occurs, it is best to examine the Arbitration Counters in graph view and/or report view. Note that there are not any timestamps associated with this warning. Each individual arbitration loss generates a warning of its own, which will point to the specific time stamps at which the event(s) occurred.

Another error or warning is a condition where a frame is seen while a loop is in a closed state. This warning is valid only for arbitrated loop (private and public) topologies. This error occurs when SANMetrics sees a frame transmission occur while the loop is considered to be in a closed state. This error is directly related to the failed open—open detected while loop in open state error. This error is commonly caused by an improper analyzer placement or configuration. Generally, this happens is in multi-initiator and multi-target loop environments. The analyzer should be placed between the Initiators and targets. Another potential cause of this error is a device attempting to transmit a frame after the loop has been closed. This generally happens when the link is "noisy" and devices are detecting code violations or disparity errors. The device may have missed the CLS from the other device and thus considers the loop to still be in an open state (keep in mind that the analyzer is a snap-shot on one single point on the wire, so the code violations or disparity errors may not be seen by the analyzer). Any frame activity that occurs while the loop is seen to be in a closed state (from the analyzer's viewpoint) is discarded and no initiator/target pairs are created for these frames.

Another error or warning is a condition where an illegal ARB value is encountered, i.e., a non-neutral disparity character. Generally, this warning is valid only for arbitrated loop (private and public) topologies. This is an arbitration in the form ARB(XX,YY) in which the XX and YY values match, but are not valid neutral disparity characters (thus making the ordered set end up at incorrect disparity). This is a protocol error that may be detected by the intelligent analysis system of the present invention.

Another error or warning is a condition where the software encounters a link credit reset (LR). These errors occur when SANMetrics sees a stream of 3 or more continuous LR or LRR primitives on the link. The primary function of LR is to reset the outstanding credit balance between two fabric ports. If coupled with NOS or OLS, these are generally part of the link reset process. However, when a LR is utilized without NOS or OLS, this generally indicates an out of credit situation has occurred, followed by an RA_TOV timeout. When an N_Port or F_Port cannot transmit frames due to lack of credits received by the destination port, it can use LR to reset the credit balance. These errors also output the credit offset of the other channel (thus how many frames this channel had transmitted without receiving credits back from the other channel) at the time of the reset in the value field. This can be very useful for debugging out of credit situations. If an LR is received with a credit offset value other than zero on the other channel, the reset is generally due to lost credits or a frame transmission timeout occurring. The intelligent analysis process of the invention is configured to detect and present LR related errors and warnings to the user.

Another error or warning is a condition where a frame to ready time exceeds a predetermined threshold. This warning is generally valid for switched fabric (non-loop) topologies, and generally occurs when the amount of elapsed time, in milliseconds, from the time a frame is transmitted by one device and a credit is received in response exceeds the settable threshold. This value provides a key indication of the frame processing/delivery abilities in the switched fabric environment. Port starvation and out of credit issues can cause large values in this time. When multiple frames are seen back to back without a credit returned, the frame to R_RDY time represents the last frame time before the credit was returned. The amount of time required to return a credit varies from device to device, depending upon the amount of saturation and available credits from the receiving device. In a typical system (without extremely long links between devices), this number will be very low (20 us or less) when traffic flow is not congested and credits are available. In out of credit situations or highly congested traffic flow situations, this number can become extremely large (1 ms or greater), indicating frame delivery problems. In these situations, this warning may provide greater insight to the performance impact. Since there are situations where SANMetrics cannot accurately report the credit offset with N/F_Port devices, this metric can be utilized to determine if credit and frame flow is inefficient.

Another error or warning is a link reset condition (LIP). These errors occur when SANMetrics sees a stream of 12 or more continuous LIP primitives while the loop is in an open state. If there are pending exchanges at the point of the LIP, there is a high likelihood that one of the exchanges could be the cause of the LIP. It is not common, nor practical, behavior to reset a loop via LIP other than when a device is resetting or has been instructed to reset (i.e. Target Reset or LUN Reset). In this situation, the best place to start is in the SANMetrics Pending exchange report and look for exchanges that have open sequences or large elapsed time values. These exchanges should be investigated, watching out for sequence timeout (SEQ_TOV, 1-2 seconds) and upper layer Protocol Timeouts (ULP_TOV, generally 45-120 seconds) values. Generally, link resets occur either due to events immediately preceding the link reset, which may be detected via conventional brute force trace analysis, if a substantial amount of time is available, or a LONG time before the link reset occurs, which is where SANMetrics adds value, as conventional trace analysis techniques are impractical. This task may be accomplished using the software package of the invention, and more particularly, this task may easily be accomplished using the pending exchanges report generated by the software of the invention. Between the graph counters, reports, and errors in SANMetrics, it is generally possible to debug most of the link reset situations that occur in traces.

Another error or warning is a condition where a percentage of abnormal tenancies exceeds a predetermined threshold. This warning is generally valid for arbitrated loop (private and public) topologies. This warning occurs when the percentage of Abnormal Tenancies by all devices exceeds the predefined threshold value. An Abnormal Tenancy is defined as one of three bad tenancies: Failed opens; opens Without Frames; and opens Ended By destination. Any (or all) of these three cases can exist in heavily saturated or out of credit loop environments. Every Abnormal Tenancy wastes at least 3 loop round-trips worth of time. In general, Abnormal Tenancies make up for a large percentage of loop performance problems. It is useful to utilize the Detailed Report to compare the Total number of opens against the total number of Failed opens, opens without Frames, and opens Ended By destination. Note that there are not any timestamps associated with this warning. Each of the three components of the Abnormal Tenancy percentage will generate warnings of their own, which will point to the specific time stamps at which the events occurred.

Another error or warning is a condition where a percentage of our of credit conditions exceeds a predetermined threshold. This warning is generally valid for arbitrated loop (private and public) topologies. This warning occurs when the percentages of out of credit situations by ALL devices exceeds the specified threshold. Out of credit situations occur in arbitrated loop topologies when the credit balance is zero at the end of frame transmission. The accuracy of this counter depends on the location of the analyzer in the loop, particularly with long loop lengths. If the analyzer is placed before a long cable segment, the device at the other end of the segment may be out of credits more often than visible from the viewpoint of the trace, since the credit is seen at the analyzer point much sooner than it is seen at the final destination. Out of credit situation can have a significant impact upon performance of a loop, depending upon the number of devices on the loop and the logical length of the loop. This threshold helps to flag situations that may be excessive or causing performance problems on the loop. When this warning occurs, it is best to examine the out of credits counter in the SANMetrics graph view and/or report view. Note that the percentage value represents both directions of frame transmissions. If one channel (or devices on one channel) has no out of credit situations, this will lower the average. I.e. one channel can be out of credits 100% of the time and the other channel 0% of the time, resulting in a 50% value for the % out of credit threshold. Note that there are not any timestamps associated with this warning. Each individual out of credit will generate a warning of its own, which will point to the specific time stamps at which the event(s) occurred.

Another error or warning is a condition where a credit offset exceeds a predetermined threshold. This warning is generally valid for switched fabric (non-loop) topologies. This warning occurs when the outstanding credit offset exceeds the specified threshold. The credit offset value represents the number of outstanding frames sent by a device without having received corresponding credits (R_RDY) in response to the frames. In a switched fabric environment, it is normally not possible for SANMetrics to actually determine when either of the ports are out of credit. This is due to the base credit model implemented in switched fabrics. Unlike the arbitrated loop's alternate credit model where credits are "pumped up" at the start of each tenancy, the base credit model relies on values set in the FLOGI and corresponding ACC. These values give a fixed number of credits available. Each device utilizes these values to maintain a credit balance. The device starts with a balance equal to the value and decrements the balance when a frame is transmitted and increments the balance when a frame is received. Thus, a trace taken while a system is in operation (frame flow is occurring), it is not possible to determine the credit balance active for the devices. SANMetrics utilizes an alternative method to determine the credit offset (the inverse of the balance), which is accurate in most cases. The credit offset is maintained throughout the trace and updated in a backwards fashion when more credits are received than frames were outstanding. In most cases, this results in a fairly accurate reading of the credit balance. In cases where devices are completely credit bound for the duration of the trace (constantly out of credits), SANMetrics may only show a credit offset of a portion of the actual outstanding frames, as the credit balance never corrects itself (rises above 0). In this situation, the credit offset values will only increase throughout time in the trace. It is useful to cross reference the Offset with the Average and/or maximum frame to R_RDY time values. Larger values indicate higher levels of congestion and a higher potential for this situation to occur. Additionally, words between frames and sequence burst rates are highly affected by out of credit situations in switched fabric topologies and these metrics can prove very useful in identifying out of credit situations. This threshold should be tuned to a specific value for the devices in the trace. For example, if the trace were utilized to analyze the throughput of a device that has 64 credits (determined at the FLOGI and corresponding ACC), a threshold value of 64 would show the number of times the device is out of credits. If the device has only 16 credits, it is recommended to set the threshold value to 16. The credit offset value is also available in graph view and report view of the software package of the invention for further analysis of congestion and performance problems.

Another error or warning that the software package of the invention is configured to detect and report to the user is an out of credits during tenancy condition. This warning is generally valid for arbitrated loop (private and public) topologies. Out of credit situations occur in arbitrated loop topologies when the credit balance is zero at the end of frame transmission. The accuracy of this counter depends on the location of the analyzer in the loop, particularly with long loop lengths. If the analyzer is placed before a long cable segment, the device at the other end of the segment may be out of credits more often than visible from the viewpoint of the trace, since the credit is seen at the analyzer point much sooner than it is seen at the final destination. Out of credit situations can have a significant impact upon performance of a loop, depending upon the number of devices on the loop and the logical length of the loop. This threshold helps to flag situations that may be excessive or causing performance problems on the loop. When this warning occurs, it is best to examine the out of credits counter in graph view and/or report view.

Another error or warning that the software package of the invention is configured to detect and report to the user is an out of full duplex credits during tenancy. This warning is valid only for arbitrated loop (private and public) topologies. The full duplex out of credit count represents the number of times a destination port has been out of credit (credit balance was zero at the end of frame transmission) when transferring full duplex frames to the source port. The accuracy of this counter depends on the location of the analyzer in the loop, particularly with long loop lengths. If the analyzer is placed before a long cable segment, the device at the other end of the segment may be out of credits more often than visible from the viewpoint of the trace, since the credit is seen at the analyzer point much sooner than it is seen at the final destination. Full duplex out of credit counts are more meaningful in situations where significant amounts of full duplex activity is taking place. Switched loop and FL_Port environments generally have intermediate buffering that enables high utilization of full duplex transfers. In standard (non-switched) arbitrated loop environments, there will generally be very little full duplex activity, thus making the full duplex credit counters less meaningful. Full duplex out of credit situations can have a significant impact upon performance of a loop, depending upon the number of devices on the loop and the logical length of the loop. This threshold helps to flag situations that may be excessive or causing performance problems on the loop. When this warning occurs, it is best to examine the full duplex credits—out of credits counter in graph view and/or report view.

Another error or warning that the software package of the invention is configured to detect and report to the user is a link reset response (LRR) condition. These errors generally occur when SANMetrics sees a stream of 3 or more continuous LR or LRR primitives on the link. The primary function of Link credit Reset is to reset the outstanding credit balance between two Fabric ports. If coupled with NOS or OLS, these are generally part of the link reset process. However, when a LR is utilized without NOS or OLS, this generally indicates an out of credit situation has occurred, followed by an RA_TOV timeout. When an N_Port or F_Port cannot transmit frames due to lack of credits received by the destination port, it can use LR to reset the credit balance. These errors also output the credit offset of the other channel (thus how many frames this channel had transmitted without receiving credits back from the other channel) at the time of the reset in the value field. This can be very useful for debugging out of credit situations. If an LRR is received with a credit offset value other than zero on the other channel, the reset is generally due to lost credits or a frame transmission timeout occurring.

Another error or warning that the software package of the invention is configured to detect and report to the user is a non-handled loop primitive. These warnings generally occur when MRK, DHD, LPE, or LPB ordered sets are seen. When this condition is encountered, an informational warning is generated, as most devices in the industry do not support or utilize these ordered sets. However, when these ordered sets do occur, in most cases it is due to an error in the loop or erroneous behaviors of devices in the loop, and as such, the software package of the invention is configured to detect the condition and report it to the user.

Another error or warning that the software package of the invention is configured to detect and report to the user is when an inappropriate ordered set is encountered for the detected topology. This warning generally occurs when a switched fabric (non-loop) topology has been detected by SANMetrics and either CLS, OPN, or ARB primitives are seen on the link. In very rare cases, SANMetrics may incorrectly detect the topology in the trace data. When a trace is opened for the first time, SANMetrics will pre-process up to the first 2.5 seconds of trace data to determine the topology. If the topology is not fully determined at the end of the 2.5 seconds, SANMetrics is forced to utilize its "best guess". When the "best guess" does not reflect the true topology, the user can correct this in two ways. First, manually set the configuration of the trace via the edit/change trace configuration dialog. Caution is advised in utilizing this dialog as improper values set in a trace can cause the trace to become un-usable by SANMetrics. After setting the proper values in this dialog, close and re-open the trace. Second, set the user preferences to allow for full pre-processing of the trace. This value is set through the edit/preferences user dialog. After the value is set, clear the detected trace configuration (edit/clear trace configuration) and then re-open the trace.

Another error or warning that the software package of the invention is configured to detect and report to the user is when an arbitration loss is encountered by a device. This warning occurs when a device loses Arbitration to another device. Arbitration losses are common in arbitrated loop environments with more than a couple of devices. However, high amounts of losses can indicate congestion or fairness problems on the link, and as such, the software of the invention is configured to automatically inform the user of this condition.

FC Metrics

As noted above, the software package of the invention is configured to monitor, measure, and intelligently analyze many network metrics. For example, with regard to FC, metrics for all topologies include MB/sec, frames/sec, frame size, exchanges, sequences, words between frames, trace and error events, and management frame counts, for example. Specific metrics supported for arbitrated loop configurations include bus utilization, tenancies, normalized tenancies, credits on the loop, full duplex credits, opens, closes, and arbitration parameters, for example. Exemplary support switch fabric metrics include bus utilization and credits.

The MB/sec metrics consist of a group of metrics describes the rate at which a component is capable of transmitting data for various frame types. The rates of metrics are generally expressed in terms of megabytes per second. The user can select the frame type to be included in this metrics, which acts as a filter, allowing different types of data flow to be individually charted. MB/Sec values are calculated using the entire frame, from SOF to EOF. The frame types are defined by the contents of the R_CTL field in the frame header based upon the division presented in the FC-PH standards. Exemplary frame types that are tracked include (values in Hexadecimal notation) All Frames:R_CTL=Any, link control: R_CTL=Cx, link data: R_CTL=2x, 3x, and 8x, FC-4 Device data: R_CTL=0x and 4x, and Protocol data: R_CTL=01 and 04.

Metrics related to the MB/sec metric include a MB/sec-all frames metric, which is generally a calculation of the transfer rate in MB/Sec for any frame type transmitted in the selected transfer direction. The calculation is based on the number of bytes transmitted in all frames divided by the sample time. Another related metric includes MB/Sec—FC-4 Device data Counter, which is essentially a calculation of the transfer rate in MB/sec for FC-4 device data frames transmitted in the selected transfer direction. The calculation is based on the total number of bytes transmitted in FC-4 device data frames divided by the sample time. FC-4 device data frames are used to transport FC-4 protocol information. This frame type includes both FC-4 device data frames and FC-4 video frames. This counter consists of all frames that relate to an upper level protocol (command, data, Status, Request, and Reply frames). Examples of FC-4 device data frames are SCSI frames, VI frames, IP frames, and a special class of frames for video data. Another related metric is the protocol data metric, which is a calculation of the transfer rate in MB/Sec for protocol data frames transmitted in the selected transfer direction. The calculation is based on the total number of bytes transmitted in protocol data frames divided by the sample time. Protocol data frames are a special subset of FC-4 device data frames. Protocol data frames consist of solicited and unsolicited data frames. SCSI uses solicited data frames for both read and write data, while IP uses only unsolicited data frames.

Additional related metrics include link control metrics, which is a calculation of the transfer rate in MB/Sec for link control frames transmitted in the selected transfer direction. The calculation is based on the total number of bytes transmitted in link control frames divided by the sample time. Link control frames are used primarily as FC-4 data frame control mechanisms. Link control frames consist primarily of ACK, BSY, and RJT frames. Link data metrics represent a calculation of the transfer rate in MB/Sec for link data frames transmitted in the selected transfer direction. The calculation is based on the total number of bytes transmitted in link data frames divided by the sample time. Link data frames are used primarily for port (component) level Link Services. Link data frames consist of basic link services frames, extended link services, and FC-4 link services. Examples of this type of frames are PLOGI, ACC, ABTS, PRLI, PRLO, etc.

Another metric the software package of the invention is configured to monitor, measure, and intelligently analyze includes frames per second. This group of metrics describes the rate at which a component is capable of transmitting frames for various frame types. The rates described by this group of metrics are expressed in terms of frames per second. The user can select the frame type to be included in this metrics, which acts as a filter, allowing different types of data flow to be individually charted. Frame/sec values are calculated based upon the number of frames that are transmitted within a sample. The frame types are defined by the contents of the R_CTL field in the frame header based upon the division presented in the FC-PH standards. Additionally, a frames per second for all frames metric is supported by the software package of the invention. This counter is a calculation of the transfer rate in frames/sec for any frame type transmitted in the selected transfer direction. The calculation is based on the number of frames transmitted of any type divided by the sample time.

Another metric the software package of the invention is configured to monitor, measure, and intelligently analyze includes a frames per second FC-4 Device data metric. This counter is a calculation of the transfer rate in frames/sec for FC-4 Device data frames transmitted in the selected transfer direction. The calculation is based on the total number of FC-4 Device data frames transmitted divided by the sample time. FC-4 Device data frames are used to transport FC-4 protocol information. This frame type includes both FC-4 Device data frames and FC-4 Video data frames. This counter consists of all frames that relate to an Upper Level Protocol (command, data, Status, Request, and Reply frames). Examples of FC-4 Device data frames are SCSI frames, VI frames, IP frames, and a special class of frames for video data.

Another frames/sec counter is the protocol data Counter, which is a calculation of the transfer rate in MB/Sec for protocol data frames transmitted in the selected transfer direction. The calculation is based on the total number of protocol data frames transmitted divided by the sample time. Protocol data frames are a special subset of FC-4 Device data frames, and consist of solicited and unsolicited data frames. SCSI uses solicited data frames for both read and write data, while IP uses only unsolicited data frames. There is also a frames/second link control counter that represents a calculation of the transfer rate in frames/sec for link control frames transmitted in the selected transfer direction. The calculation is based on the total number of link control frames transmitted divided by the sample time. Link control frames are used primarily as FC-4 data frame control mechanisms, and consist primarily of ACK, BSY, and RJT frames. A link data counter represents a calculation ion of the transfer rate in frames/sec for link data frames transmitted in the selected transfer direction. The calculation is based on the total number of link data frames transmitted divided by the sample time. Link data frames are used primarily for port (component) level link services. Link data frames consist of basic link services frames, extended link services, and FC-4 link services. Examples of this type of frames are PLOGI, ACC, ABTS, PRLI, PRLO, etc.

Another metric the software package of the invention is configured to monitor, measure, and intelligently analyze includes a frame size metric. These counters give the average frame size transferred between two devices. The calculation for the frame size generally includes the six words of the FC header and the start of frame and end of frame delimiters. Thus a frame with a 2048 byte payload will have an average frame size of 2084 bytes. Further, a bytes/frame metric, which gives the average size for any frame type is also included. The counter can be useful when zooming down to the tenancy level, as it can be utilized to map the frame flow by size and allow for easy identification of the different frame sizes and types.

Another metric the software package of the invention is configured to monitor, measure, and intelligently analyze includes a bytes/frame—protocol data frames metric. This counter gives the average frame size transferred between two devices. The calculation for the frame size includes the six words of the FC header and the start of frame and end of frame delimiters. Thus a frame with a 2048 byte payload will have an average frame size of 2084 bytes. The protocol data frames metric gives the average size for only protocol data frames, which are frames with an R_CTL value of either 0x 01 or 0x04. This definition covers IP, SCSI, Video and FICON data frames. The counter can be useful when zooming down to the tenancy level. It can be utilized to map the frame flow by size and allow for easy identification of the different frame sizes and types.

Another metric the software package of the invention is configured to monitor, measure, and intelligently analyze includes bus utilization in an arbitrated loop configuration. Generally, these metrics apply only to arbitrated loop topologies, and this group of metrics describes the percentage of bus utilization consumed by the selected device or devices. For these metrics, bus utilization is defined as a function of time utilized in link activity on the FC loop. These metrics are the most direct method of analyzing bus utilization in an arbitrated loop environment, but there are additional factors that can still contribute to bus utilization, such as hidden arbitration and arbitration contention between devices. Since these factors are not quantifiable from a single analyzer's point of view on a loop, they are not included in the calculations.

Further, the software package of the invention is configured to monitor, measure, and intelligently analyze a percentage of bus utilization metric, which represents the percentage of total time utilized by a source/destination pair for tenancies. This includes the time from when the source of the tenancy issued an OPN and subsequently issued a CLS on the loop. This time does not include any arbitration time or any additional time the destination may have held the loop open past the source's CLS. This metric is calculated by taking the Total Time on the Link for all Tenancies within the sample divided by the sample time. Additional metrics related to the bus utilization metrics include FC tenancies and time on link metrics, which are generally expressed in terms of a percentage. This metric represents the percentage of total time utilized by a source/destination pair for link accesses (defined by OPN/CLS). This includes the time from when the source of the tenancy issued an OPN to the time the CLS was received on both channels. This differs from the percent tenancy time metric by including any additional time the destination may have held the loop open before issuing CLS. This time does not include any arbitration time. This metric is generally calculated by taking the total time on the link for all open to close periods within the sample divided by the sample time. Another related metric is the FC open to close time, which generally represents the percentage of total time utilized by a source/destination pair for link accesses (defined by OPN/CLS). This includes the time from when the source of the Tenancy issued an OPN to the time the CLS was received on BOTH channels. This differs from the % Link Time metric by including any additional time utilized by ARB (non FO) values that occurred after the previous loop Tenancy had ended (both source and destination have issued CLS). This metric is calculated by taking the ARB to close time for all tenancies within the sample divided by the sample time. Another related metric is the FC opens arbitration to close time, which generally describes the percentage of bus utilization consumed by the selected device or devices in a switched fabric (non-loop) environment. For these metrics, bus utilization is defined as a function of fill words between frames in the FC fabric. Since each frame transmission requires a minimum of 6 fill words between frames, a fabric link is defined as being 100% utilized when the link is filled with frames with only 6 fill words in between them. Note that a port/channel in FC can be consumed by small frames (thus throughput will remain low), but still maintain 100% bus utilization due to the fact that there are only 6 fill words between frames. It is not possible to transmit any more frames. This is an important distinction between utilization and capacity. Capacity implies the throughput capacity of the wire—assuming maximum frame sizes are used. Thus a 1 Gbaud link has a 100% Capacity used at 100 MB/Sec. However, the same link could be 100% utilized running only at 40 MB/Sec when smaller than 2 k data frames are utilized. Link capacity is measured through statistics like MB/sec and sequence burst rate, which are discussed herein.

Several additional metrics that the software package of the invention is configured to monitor, measure, and intelligently analyze include a switch fabric bus utilization metric, which represents the total percentage of bus utilization consumed by the selected device during the sample period, regardless of frame type. This metric can be utilized to find periods of saturation or peak consumption on the selected transmit segment on the link. Looking at the bus utilization in both directions can easily show values in excess of 100%. Each transmit wire, as measured by this metric, is capable of 100% bus utilization, thus during periods of simultaneous frame flow, the utilization can exceed 100%, with values up to 200%. As Switched Fabric environments inherently behave in this manner, this is fairly normal for the measurements while the bus is under load. Another metric includes the switch fabric percentage protocol data counter level, which represents the total percentage of bus utilization consumed by the selected device during the sample period for only protocol data frames. This metric can be utilized to find periods of saturation or peak consumption on the selected transmit segment on the link. Examining the bus utilization in both directions can easily show values in excess of 100%. Each transmit wire, as measured by this metric, is capable of 100% bus utilization, thus during periods of simultaneous frame flow, the utilization can exceed 100%, with values up to 200%. As Switched Fabric environments inherently behave in this manner, this is fairly normal for the measurements while the bus is under load. Generally, protocol data frames are defined as frames with an R_CTL value of either 0x01 or 0x04. This definition covers IP, SCSI, Video and FICON data frames.

Another metric the software package of the invention is configured to monitor, measure, and intelligently analyze includes an exchange metric. In order to allow for mapping of upper layer protocols such as SCSI onto FC, the concepts of exchanges and sequences were created. A traditional SCSI read operation consists of the command, data and Status phases. Each phase is mapped to a FC sequence and the entire read command is mapped to a FC exchange. For SCSI, an exchange equates exactly to the SCSI term "I/O". Other protocols, such as IP, VI, or FICON, may use the sequences and exchanges differently. Generally, for all exchange related metrics, the start of the exchange must have been seen for the exchange to be included in the statistics, and any incomplete exchanges (orphan exchanges) will not be used in statistical calculations.

With regard to SCSI related metrics, these metrics are generally derived from "filtered" exchanges and the information contained within them. For example, SCSI exchanges metrics (read, write, and other) to first data represents the total number of incomplete exchanges that are outstanding for the selected initiator/target pair for the sample. For SCSI Operations, the transmission of a SCSI command frame increments the number of pending exchanges. Conversely, the transmission of a SCSI Status frame decrements the pending exchanges. The number of pending exchanges are carried over when zooming, making it possible to zoom deep into the trace and still have the proper number of pending exchanges reflected. Pending exchange values reflect the amount of outstanding work to complete between the selected initiator/target pairs and are qualified for each initiator/target pair by the unique OXID/RXID (Originator and Responder ID) values. Related metrics include issued I/Os, completed I/Os, Pending I/Os, exchanges issued, exchanges completed, and pending exchanges. Additionally, an issued exchanges metric represents the total number of new exchanges initiated by the selected initiator to the selected target for the sample. For SCSI Operations, the transmission of the SCSI command frame increments the number of Issued exchanges. Related metrics include issued, completed, and pending I/Os.

Another metric includes the exchange completion time, which represents the completion time, in milliseconds, of all exchanges that completed for the selected initiator/target pair for the current sample. The completion time for an exchange is measured from the starting time of the first frame in the exchange to the ending time of the last frame in the exchange. The exchange Completion Time includes component latencies, Fabric (Switch or loop) latencies, transmission latencies, and Fabric congestion latencies. This value is a reflection of both the capability of the selected initiator/target pair and the complexity of the operations themselves. Exchanges that terminate abnormally or in error (i.e. ABTS) are considered by SANMetrics to have completed and will be counted statistically for all exchange metrics.

Another helpful metric includes the sequence burst length, which represents a measure of the ability of a port to start and complete sequences with ONE destination port rather than send partial sequences to multiple ports. The sequence Burst Length value is a count of the number of protocol data bytes transferred by the port before switching to a new sequence ID, for a different exchange or destination. The metric represents the average sequence Burst Length for the sample. The sequence burst rate metric illustrates the rate at which the selected devices burst data when transmitting multi-frame sequences. Most devices are capable of bursting data in multi-frame sequences at or near theoretical wire speed (100 MB/Sec @1 Gbaud or 200 MB/Sec @2 Gbaud). This speed is achieved by transmitting multi-frame sequences with 6 idle fill words between each frame. Since most multi-frame sequences involve protocol data (i.e. SCSI read or write data), the frames are generally between 512 bytes and 2 k in length. Low sequence burst rate values normally indicate out of credit situations or bottlenecks with the sequence initiator (for example: PCI Bus/SBUS starvation). On a loop, devices can break sequences across two or more tenancies, thus causing lower burst rate values. The sequence burst rate is calculated with the same basic algorithm as the sequence Burst Length metric. A sequence Burst ends and a new sequence Burst started when there is: any change in source/destination, any new sequence ID, any new sequence (SOFi frame), or any end of a sequence (EOFt frame). Sequence burst rates are only calculated for multi-frame sequences that utilize protocol data frames, thus are not affected by smaller control frames such as SCSI command, Status, and Transfer ready. However, generally the sequence counters are detected upon a change in a sequence, and as such, they get plotted when the change of the sequence occurs, not at the last frame of the sequence before the change occurs. This is important when correlating specific singular values by zooming in to the trace. The value at the plotted timestamp reflects the value of the previous sequence.

Another metric the software package of the invention is configured to monitor, measure, and intelligently analyze is a sequence—percent interleaving counter level, which represents the percentage of sequences from the selected source to destination that get "interleaved" or interrupted for a number of reasons. Interleaving is defined as an interruption of an open sequence by a frame with another SOFi, S_ID, or sequence ID. Values for % Interleaving are obtained from multi-frame sequences consisting of protocol data frames. Thus, a system running 2 k read exchanges (made up of 3 single frame sequences) will have 0% interleaving—there are no multi-frame data sequences. Sequence Interleaving can have enormous impact on the performance of devices. In general, switches tend to view high percentages of sequence Interleaving to be good behavior (i.e. the switch is doing its job of buffering frames from multiple source ports). Many end point devices, however, tend to favor low (or zero) percentages of interleaving. Sequence Interleaving by a switch can have a devastating impact on the performance of many different "industry standard" devices. The receiving ASIC may require 40 us (or more!) of context switch time to process a frame that has switched sequences from the previous frame. Switching sequences involves one of the following conditions: 1. Natural termination of the sequence by the sequence initiator (EOFt). 2. Multi-port buffering by a switch and the switch interleaving frames within a sequence to the sequence recipient. I.e. Four ports (ports 1-4) each send a complete 32-frame sequence into the switch for delivery to the same destination port. If the switch is not interleaving frames, the 32 frame sequences will come out whole and unbroken (as transmitted). However, this can have heavy performance impact on the switch, so the switch could decide to interleave to try to alleviate congestion. In a 25% interleaving scenario, the switch would send 8 frames from port 1, followed by 8 frames from port 2, then 8 from port 3, and 8 from port 4. In this manner, it would "round-robin" the sequences. Some switches will interleave 100% (or close to it) when in a many to one scenario. In these cases, if it takes the recipient 40 us (approx. twice the length of a 2 k frame @1 Gbaud) to switch context upon interleaving sequences, the maximum sustained burst rate for the port will be 50 MB/Sec @1 GBaud. Developers can engineer their FC ASICS out of this problem by planning for 4 (or more) open sequences at a time, using SRAM for context memory, or implementing a score-boarding scheme. 3. A sequence broken by the transmission of another frame from a different device. This can happen with or without a switch involved. In a simple loop environment, a device could decide to implement a "fairness" algorithm that only let it transmit a maximum of 8 frames at a time in one loop tenancy. This gives the opportunity between tenancies for any other device to gain control of the loop and transmit frames, thus causing sequence interleaving. Note that sequence Interleaving relates closely to sequence Burst Length with a subtle, but important difference. Sequence Burst Length is measured for changes in DST_ID, OXID, SEQ ID or a new sequence (SOFi). Sequence Interleaving is measured for new sequences (SOFi) or for change from last S_ID or D_ID. The functional difference between the two is that Interleaving catches changes in S_ID or D_ID, where Burst Length looks for changes in only DST_ID. This means that Burst Length is measuring behavior of the SRC_ID and Interleaving is measuring behavior of the fabric.

Another useful metric is the sequence—number of SOF(1) frames. Generally, each frame indicates the class of service operating via use of the Start-of-Frame Delimiter (SOF). A SOF(1) is used for Class 1 service. Class 1 service is a dedicated, acknowledged, connection-oriented service between two ports. This counter indicates the number of Class_1 frames transmitted from the source port to the destination port in this sample. Further, a sequence—number of SOF(2) frames metric may also be included. Each frame indicates the Class of Service operating via use of the Start-of-Frame Delimiter (SOF). A SOF(2) is used for Class 2 service. Class 2 service is an acknowledged, connectionless service between two ports. This counter indicates the number of Class_2 frames transmitted from the source port to the destination port in this sample. Further still, a sequence—number of SOF(3) frames may be included. Each frame indicates the Class of Service operating via use of the Start-of-Frame Delimiter (SOF). A SOF(3) is used for Class 3 service. Class 3 service is an unacknowledged, connectionless service between two ports. This counter indicates the number of Class_3 frames transmitted from the source port to the destination port in this sample. A sequence—number of SOF(f) frames may be included. Each frame indicates the class of service operating via use of the Start-of-Frame Delimiter (SOF). A SOF(f) is used for fabric (inter-switch) communications. Class F service and behavior is determined by the FC-SW-2 standard from the T11 committee. This counter indicates the number of SOF(f) frames transmitted from the source port to the destination port in this sample. Note: SOF (f) frames are generally not processed or handled by SANMetrics for a variety of reasons, the main one being a lack of formal standardization and implementation by switches. For the most part, SANMetrics simply counts the SOF(f) frame and discards it. There are many older industry devices that do not recognize the SOF(f) as a valid Start Of Frame delimiter. This tends to cause these devices to view the frame as a running disparity error or loss of sync. It is not uncommon to see these devices perform a Link Reset following the reception of a SOF(f) frame. This can be very troublesome and consume large amounts of time with the device attempting to recover link connectivity. In general, SOF(f) frames are utilized for discovery of E_Port connections and information that is transmitted between E_Ports. Other related metrics that are supported by the software package of the invention include, but are not limited to, SOF(I) frames and SOF(N) frames, for example.

The software package of the invention is also configured to monitor, measure, and analyze tenancy metrics. A tenancy is generally defined as a loop access and is made up of the elapsed time between open and close for an initiator/target pair. The source port initiates a new tenancy by arbitrating for the loop and then opening the destination port. The tenancy is terminated when either the source or destination port relinquishes control of the loop by closing it. The Tenancy counters are closely related to the open metrics. All Tenancy statistics include overhead imposed by the loop length for round-trip times. Related metrics include FC Normalized Tenancies, and FC opens. A particular metric is the tenancies—time on link metric, which represents the average time, in microseconds, spent on the link in tenancies for the selected initiator/target pair. The Time on Link values include transmission of the open to the transmission of the close from the source port. This counter differs from the opens, open to close time values in that the open to close time values are based on the transmission of close by both the source and destination ports. The time on link values are derived from only the tenancies that have completed (closed) within the sample. Another tenancy related metric is an ordered set/tenancy counter, which represents the average number of ordered sets transmitted by the source port per tenancy for the selected initiator/target pair. The ordered sets/Tenancy values include all ordered sets transmitted between (and including) the open and close. The ordered sets/tenancy values are derived from only the tenancies that have completed (closed) within the sample.

Another useful metric is the tenancies inter-frame gap metric, which represents the average number of fill words per Inter-frame gaps (frames+1) transmitted by the source port in tenancies for the selected initiator/target pair. The inter-frame gap values include all ordered sets transmitted between frames during the tenancy. The inter-frame gap values are derived from only the tenancies that have completed (closed) within the sample. Related metrics include FC: Tenancies, % Efficiency, FC: Normalized Tenancies, % Efficiency, FC: Normalized Tenancies, Inter-frame Gap, and FC: Words Between Frames, During open.

With regard to arbitrated loop configurations, a loop credits metric may be implemented. Credits are the flow control mechanism used in FC to assure that a destination port has buffer space for one or more frames. A FC destination port exerts flow control by granting credits to a source port. Each credit (R_RDY) allows the source port to transmit one frame, up to the maximum size specified in the port or Fabric Login. A source port maintains a credit count (or balance), adding credit when an R_RDY is received, subtracting credit when a frame is transmitted, and stopping frame transmission when the credit count is zero. The credit balance is the number of credits available at the source port.

Another useful metric of the credits consumed—Alternate (Avg.), which represents the average number of alternate credits consumed by the source port via frame transmission in a tenancy. Traditionally, loop ports utilize the Alternate Credit Model with a buffer-to-buffer value of zero credits available at the OPN. This value is regulated by the Login performed by the source/destination pair. This method requires the source port to delay frame transmission after the OPN until it has received a credit (R_RDY) from the destination port. If the source port has received a buffer-to-buffer credit value of other than zero in the Login (or Accept) frame, it has the option to utilize these "Alternate" credits. When transmitting OPN, it does not have to delay frame transmission. Instead it can transmit as many frames as it was given in the Login as buffer-to-buffer credits. SANMetrics counts these credits as "Alternate Credits". This counter will be non-zero ONLY if the selected source/destination ports take advantage of the available credits at the OPN. For devices that utilize these additional credits, the average value can represent up to the amount of buffer-to-buffer credits available at the OPN. For full duplex, the Credits Consumed—Alternate (Avg.) metric represents the average number of "Alternate" credits consumed by the destination port via full duplex Frame transmission per tenancy. With regard to arbitrated loop topologies, credits are the flow control mechanism used in FC to assure that a port has buffer space for one or more frames. A FC port exerts flow control by granting credits to another port. Each credit (R_RDY) allows the port to transmit one frame, up to the maximum size specified in the port or Fabric Login. A port maintains a credit count (or balance), adding credit when an R_RDY is received, subtracting credit when a frame is transmitted, and stopping frame transmission when the credit count is zero. The credit balance is the number of credits available at the port. Full duplex credit counters describe the interaction between the destination port of the open (or destination) and the source port that transmitted the open. Unlike the Credit Counters, the full duplex Credit Counters describe the credit activity from the destination port to the source port. The full duplex counters represent the credits from the destination port to the source port. Full duplex Credits are ONLY calculated for Tenancies in which full duplex activity has occurred. Full duplex Credit statistics are more meaningful in situations where significant amounts of full duplex activity is taking place. Switched loop and FL_Port environments generally have intermediate buffering that enables high utilization of full duplex transfers. In standard (non-switched) arbitrated loop environments, there will generally be very little full duplex activity, thus making the full duplex credit counters less meaningful.

Another useful metric built into the software package of the invention is a Full duplex credits—FD consumed—Alternate (Total) metric, which represents the total number of "Alternate" full duplex credits consumed by the destination port via frame transmission over all tenancies for the sample. Traditionally, loop ports utilize the Alternate Credit Model with a buffer-to-buffer value of zero credits available at the OPN. This value is regulated by the Login performed by the source/destination pair. This method requires the source port to delay frame transmission after the OPN until it has received a credit (R_RDY) from the destination port. If the source port has received a buffer-to-buffer credit value of other than zero in the Login (or Accept) frame, it has the option to utilize these "Alternate" credits. When transmitting OPN, it does not have to delay frame transmission. Instead it can transmit as many frames as it was given in the Login as buffer-to-buffer credits. GTX-SANMetrics counts these credits as "Alternate Credits". This counter will generally be non-zero if the selected source/destination ports take advantage of the available credits at the OPN. For devices that utilize these additional credits, the total value represents the total number of "Alternate" credits utilized for that sample. A related metric is the full duplex Credits—FD consumed—Alternate (Avg.) metric, which represents the average number of "Alternate" full duplex credits consumed by the destination port via frame transmission in a tenancy. Traditionally, loop ports utilize the Alternate Credit Model with a buffer-to-buffer value of zero credits available at the OPN. This value is regulated by the Login performed by the source/destination pair. This method requires the source port to delay frame transmission after the OPN until it has received a credit (R_RDY) from the destination port. If the source port has received a buffer-to-buffer credit value of other than zero in the Login (or Accept) frame, it has the option to utilize these "Alternate" credits. When transmitting OPN, it does not have to delay frame transmission. Instead it can transmit as many frames as it was given in the Login as buffer-to-buffer credits. GTX-SANMetrics counts these credits as "Alternate Credits". This counter will generally be non-zero if the selected source/destination ports take advantage of the available credits at the OPN. For devices that utilize these additional credits, the average value can represent up to the amount of buffer-to-buffer credits available at the OPN.

With regard to credits and switched fabric topologies, credits are the flow control mechanism used in FC to assure that a destination port has buffer space for one or more frames. A FC destination port exerts flow control by granting credits to the other port. Each credit (R_RDY) received allows the source port to transmit one frame, up to the maximum size specified in the port or Fabric Login. A source port maintains a credit count (or balance), adding credit when an R_RDY is received, subtracting credit when a frame is transmitted, and stopping frame transmission when the credit count is zero. The resulting credit balance is the number of credits available at the source port. For Switched Fabric topologies, the Credit metrics apply to the buffer-to-buffer devices. If the trace is captured between an N_Port and an F_Port, the credits describe the N_Port and F_Port, not the end-point or destination addresses of the frames. SANMetrics automatically manages this by only allowing selections of the buffer-to-buffer devices when adding credit metrics and other metrics that only apply to the buffer-to-buffer devices. With all of the Switched Fabric Credit counters, the selection of the directional arrows when adding the metric indicates the direction of the frame flow. A credits received metric represents the total number of credits received by the source port for the sample. This value is directly related to the total number of credits consumed (i.e. frames transmitted) during the sample and is a measure of the ability of the destination port to process frames and provide credits. A credits consumed (Total) metric represents the total number of credits consumed by the source port with frame transmission for the sample. This value is directly related to the total number of credits received during the sample and is a measure of the ability of the source port to transmit frames when credits are available. A credits offset and max offset metric represents the number of outstanding frames sent by a device without having received corresponding credits (R_RDY) in response to the frames. In a Switched Fabric environment, it is normally not possible for SANMetrics to actually determine when either of the ports are out of credit. This is due to the Base Credit Model implemented in Switched Fabrics. Unlike the arbitrated loop's Alternate Credit Model where credits are "pumped up" at the start of each tenancy, the Base Credit Model relies on values set in the FLOGI and corresponding ACC. These values give a fixed number of credits available. Each device utilizes these values to maintain a credit balance. The device starts with a balance equal to the value and decrements the balance when a frame is transmitted and increments the balance when a frame is received. Thus, a trace taken while a system is in operation (frame flow is occurring), it is not possible to determine the credit balance active for the devices.

SANMetrics utilizes an alternative method to determine the Credit Offset (the inverse of the balance) which is accurate in most cases. The Credit Offset is maintained throughout the trace and updated in a backwards fashion when more credits are received than frames were outstanding. In most cases, this results in a fairly accurate reading of the credit balance. In cases where devices are completely credit bound for the duration of the trace (constantly out of credits), SANMetrics may only show a Credit Offset of a portion of the actual outstanding frames, as the credit balance never corrects itself (rises above 0). In this situation, the Credit Offset values will only increase throughout time in the trace. It is useful to cross reference the Offset with the Average and/or Maximum Frame to R_RDY time values. Larger values indicate higher levels of congestion and a higher potential for this situation to occur. Additionally, Words Between Frames and sequence burst rates are highly affected by out of credit situations in Switched Fabric topologies and these metrics can prove very useful in identifying out of credit situations. This metric is available as a running count or a Maximum value. The Maximum represents the Maximum Credit Offset seen within one sample. The running count represents the ending offset at the end of each sample and behaves like the Pending exchanges counter in that it is carried forward each sample and thus each subsequent sample is based upon information from the preceding sample.

Another metric is the credits frame to R_RDY time metric, which represents the amount of elapsed time, in microseconds, from the time a frame is transmitted by one device and a credit is received in response. When multiple frames are seen back to back without a credit returned, the Frame to R_RDY time represents the last frame time before the credit was returned. The values seen with this metric vary from device to device, depending upon the amount of saturation and available credits from the receiving device. In a typical system (without extremely long links between devices), this number will be very low (20 us or less) when traffic flow is not congested and credits are available. In out of credit situations or highly congested traffic flow situations, this number can become extremely large (1 ms or greater), indicating frame delivery problems. In these situations, this metric may provide greater insight to the performance impact. Since there are situations where SANMetrics cannot accurately report the Credit Offset with N/F_Port devices, this metric can be utilized to determine if credit and frame flow is inefficient. This metric is available in the software package of the invention as an average or a maximum value. The maximum represents the maximum singular frame to R_RDY time elapsed within one sample, and the average represents the average of all frame to R_RDY times within one sample.

Another useful metric provided by the software of the invention is the credits—R_RDY to Frame Time metric. This metric represents the amount of elapsed time, in microseconds, from the time a credit is transmitted by one device and a subsequent frame is transmitted consuming the credit. When multiple credits are seen back to back without a frame transmitted, the R_RDY to frame time represents the last credit time before the frame was transmitted. Like the frame to R_RDY time metric, this metric is a very good measure of saturation in a Switched Fabric environment. Devices that have are unable to transmit a frame due to an out of credit situation will rapidly transmit the next frame once a credit is received. Thus, smaller values for R_RDY to frame time reflect higher levels of device congestion when the frame to R_RDY time is high. For example, in a 100 MB/sec sustained 1 Gbaud half-duplex transmit situation, the Frame to R_RDY time will be nearly instantaneous (dependent upon round-trip cable delay time) and the R_RDY to frame time will be at or near 225 ns (equivalent to 6 fill words between frames at 1 Gbaud) plus the round-trip cable delay. In normal traffic flow situations where device and protocol latencies are involved, the frame to R_RDY time will still be low, but the R_RDY to frame time will reflect the device and protocol latencies and the values will be much higher on average. Generally, it is useful to determine these values during a sequence burst from a device. Most devices, when transmitting a multi-frame sequence, will burst at 100 MB/Sec (at 1 Gbaud). During these bursts, the R_RDY to Frame time will be small. This metric is generally available as an average or a maximum value. The maximum represents the maximum single R_RDY to frame time elapsed within one sample. The average represents the average of all R_RDY to frame times within one sample.

Another useful metric provided by the software of the invention is the opens—ARB to close time metric. This metric represents the average elapsed time, in microseconds, from the time that any port transmits ARB (non FO) when the loop is in a closed state to the time that both ports (source and destination) transmit close to end the tenancy. The value of this metric (for uni-directional data flow) represents the average duration of a loop tenancy with Arbitration overhead. This counter is useful in gauging the overhead of the loop in Arbitration time. On average, the difference between the ARB to close time and the open to close time metrics represents an approximately one round-trip delay on the loop. However, with multiple devices arbitrating, it can take multiple loop round-trips to select the ARB winner, thus adding significant overhead to the loop utilization time. This counter differs from the Tenancies, Time on Link values in that the Time on Link values are based upon the source port transmitting the close, regardless of whether or not the destination port transmitted close. The ARB to close Time value is derived from only the tenancies that have completed (closed) within the sample.

Another metric is the opens ended by destination, which is a count of the number of times the destination of the tenancy (the device opened by the source on the loop) terminated the tenancy early by transmitting CLS before receiving a CLS from the source of the tenancy. Typically, every tenancy is ended by the source port (the port that transmitted the OPN). When the destination port ends the tenancy first, it is either out of credits or attempting to follow some form of fairness to keep it from being active on the link for extended lengths of time. Most commonly, the destination port will end the tenancy early because it can no longer receive frames due to its own credit and/or processing limitations. When this occurs, loop time is wasted because the source port has to re-arbitrate for the loop and re-open the destination port to continue frame transmission. Device implementations vary in the amount of time that they will allow the link to remain open without credits available. Some devices simply close immediately when out of credits. Other devices will wait for 20-250 us (or longer) in the assumption that within the allotted amount of time, a new credit will be available to transmit to the source port. Opens ended by destination can have a severe impact on loop performance if seen in any significant percentage (5% or higher), and therefore, it is important to be able to identify and analyze these conditions with the software of the invention.

The software package of the invention also contains several metrics related to arbitration. These counters generally only apply to loop topologies. Ports on a FC loop arbitrate for ownership of the loop. When a port wins ownership of the loop it opens another port and initiates the transport of information. After the transport is complete, the owner closes the port and relinquishes ownership of the loop so that other ports may gain access to the loop. Further, The Arbitration Wins metric is a count of the number of times a port wins arbitration attempts for the sample. Wins are qualified by the number of times the port opens the loop after arbitrating. The Arbitration Losses metric is a count of the number of times a port fails (or loses) arbitration attempts for the sample. Losses are qualified by identifying the arbitration attempts by a port followed by a different port opening the loop. The port that opens the loop is considered to have won arbitration, any other ports that were arbitrating are considered to have lost arbitration. The Arbitration Attempts metrics is a count of the number of times a port arbitrates for the loop in a sample. Attempts are counted when a new ARB (PORT) value is identified either while the link is open or closed. Once any port wins arbitration and opens the loop, the arbitration attempts counter is reset. The Arbitration Transfer Mode Uses metric represents the number of times the selected port utilized Transfer Mode during activity. The value is a count of the number of times the selected port closed and subsequently re-opened the loop without arbitrating for the loop. These values are NOT reflected in the counts of Arbitration Wins. Large values of Transfer Mode Uses or long periods of Transfer Mode Uses can indicate potential loop starvation and fairness problems.

It is normally helpful to examine this metric in combination with the Arbitration Losses for other ports. The relationship between the two metrics will show whether or not the use of Transfer Mode is causing other ports to fail in Arbitrating for the loop. It may also be useful to correlate the number of Transfer Mode Uses with the number of Arbitration Wins for a specific port. The relationship between these two counters shows the ratio of Transfer Mode Uses versus the Arbitration Wins. Some devices utilize Transfer Mode for a large portion of their bus accesses. When the loop has relatively few ports on it, usage of Transfer Mode can actually help increase performance on long loops as it eliminates the Arbitration loop round trip time. As the number of ports on the loop increases, however, this can significantly degrade the performance of the fabric.

The Arbitration Transfer Mode Time metrics represent the amount of time the selected port spent in Transfer Mode. The value is the sum of the time the selected port closed and subsequently re-opened the loop without arbitrating for the loop. Large values of Transfer Mode Time or long periods of Transfer Mode Uses can indicate potential loop starvation and fairness problems. FC frame transmission requires a minimum of six fill words to be transmitted between frames. The fill words are considered to be the Inter-frame Gap and consist of Idles, R_RDY, and ARB ordered sets. The fill words are sometimes used to convey primitive bits of information like Credits and Arbitrations. The Words Between Frames values are averages of the number of fill words between frames either during open (consecutive frame transmissions within a tenancy) or overall.

The software package of the invention also provides a metric for words between frames during opens, which generally applies mostly to loop topologies. This counter describes the average number of fill words occurring between consecutive frame transmissions within a tenancy. This counter applies only to the Inter-frame Gap while the loop is open between the pair of ports. This counter is an average and is expressed in number of words. A related metric if the words between frames overall metric, which describes the number of words being transmitted between frames in the sample. This counter applies to all inter-frame times between the selected pair of devices. In arbitrated loop environments, these values may include large inter-frame times that occur while the loop is closed between the two selected ports. In Switched Fabric environments, these values represent latency for a device (or a physical port/channel). As increasing numbers of frames are transmitted (thus bus utilization increases), the number of Words Between Frames will drop. To achieve full wire speed performance, devices must be capable of transmitting multi-frame sequences with only 6 fill words between frames. The values are expressed in number of words. These values are expressed in number of words values because it is simpler to correlate than actual word transmission time, which varies with the speed of the fabric. The time each word takes to transmit depends upon the signaling rate of the FC fabric. At 1 Gbaud, a word takes approximately 37.64 ns to transmit. At 2 Gbaud, each word takes approximately 18.82 ns to transmit. Generally, this counter is available as an Average, Maximum, and Minimum value.

Another metric of the software package shows the count of any registered state change notification (RSCN) frames that have occurred in the trace. In FC, RSCN frames are utilized by a switch or switched fabric to inform devices of changes in state that have occurred on other ports or domains of the switch. The RSCN notifies a port that a given port, domain or zone has changed state. Typically, a switch will generate an RSCN when a port has a Link Reset or Loss of Sync condition. Additionally, the switch will generate an RSCN when devices on a port perform FLOGI or register with the Directory Server. This serves as notification to the device that receives the RSCN that the communication with an end-point may have been reset or lost. Devices must register with the switch to receive RSCN notifications via a State Change Registration (SCR). Typically, this is performed by SCSI initiators and not by SCSI targets. The logic behind this is that an initiator can control and recover the state of exchanges and pending operations thus leaving the target to have it's exchanges "managed" by the initiator. Poor handling of RSCN frames can cause large amounts of disruption in switched fabric environments. When a device receives an RSCN frame, it typically goes into a recovery/rediscovery mode to determine if communication has been lost or has encountered an error. This recovery can take seconds (or worse, MINUTES) with some devices, thus causing other problems on the link like exchange and sequence timeouts and dropped frames. There are generally two ways that devices respond to an RSCN frame: 1. Many devices simply reset their interface via a "Start Of Day" routine, forcing them to blindly perform logins an re-initialization with ALL connected devices. This can cause long periods of inactivity and recovery. Depending on the number of RSCN frames generated by a switch, this can stop the device from functioning completely (i.e. RSCN storms—similar to Multi-Cast storms in Ethernet). 2. Devices with sophisticated recovery techniques will examine the RSCN and determine which port or ports have been affected, then will verify communication with the specific port (or ports). In this situation, the recovery can be smooth and seamless with no or little apparent disruption of normal fabric activity. It is generally very important to closely monitor the behavior and handling of RSCN frames in a switched fabric to ensure timely and accurate handling.

Another metric, logout frames, shows the count of any logout frames (LOGO, TPRLO, and PRLO) that have occurred in the trace. Logout frames can occur from either the initiator or target. Logout Frames can also be in response to an exchange or can be an initiation of a new exchange by either the initiator or target. In typical SCSI operating environments, logout frames between end-points are strong indicators of operational or protocol issues between the initiator and target. Typically, a logout indicates a communication failure between the two end-points. A Logout response from a target indicates that it cannot support the requested action from the initiator and has terminated its previous login. There are many reasons why this can occur, the most common reason being that a target goes through a Link Reset and has not reestablished communication with the initiator. This generally involves a switched fabric configuration in which the initiator has not handled an RSCN condition properly. Some initiators will translate a Bus Reset message from the host operating system into a Third Party Process Logout (TPRLO) to each target or to a single target. This tends to eliminate the need for a Bus Reset but is a very dangerous activity (if not catastrophic) in multi-initiator environments. A TPRLO forces the target and all associated Logical Units (LUNS) within the target to terminate its logins with every initiator it has a valid login state with. In clustered operating environments, this is the only valid solution to a SCSI Reservation dead-lock, but in non-clustered environments, this can cause I/O loss and data corruption issues.

In some switched fabric environments, the switch will generate harmless PRLO frames on ports following a Link Reset. This happens when a device do not register with the Directory Server following a Fabric Login (FLOGI). The Directory Server attempts to discover the type and state of the device so that it can be added to the directory. The Directory Server does this by performing PLOGI and PRLI to the device. If the device responds to both with an accept (ACC), the Directory Server assumes that the device is a target (supports SCSI Process Login) and then adds the device to the Directory Server database. Following the PRLI, the switch will perform PRLO and LOGO with the device to clean up any connection information.

Another useful metric is the login frames metric, which shows the count of any Login Frames (PLOGI, FLOGI, PRLI, PDISC, FDISC, and ADISC) that have occurred in the trace. Login Frames are utilized to form or verify a communication link between two devices. Typically, Login Frames follow Link Reset situations to re-establish previous communications between devices. PLOGI, FLOGI and PRLI are "destructive" logins. These Login Frames terminate any open exchanges between the two devices. When a login of this nature occurs, SANMetrics can be very helpful in determining the open exchanges that existed prior to the login. See the section on the Pending exchange Report for further information on how this is accomplished. Zooming to the time just prior to the login and use the Pending exchanges report in SANMetrics to get a list of the pending exchanges. It is then useful to ensure that any pending exchanges in the list get retried/retransmitted following the login. Unfortunately, the exchange ID (OX_ID) values for the retry will generally NOT have the same values as the previously pending exchanges. It is normally necessary to correlate the exchanges using protocol specific information such as SCSI Op Code, Logical Block Address (LBA), and LUN to verify the retry occurred properly.

Another important metric is the FAN frames metric, which shows the count of any Fabric Address Notification (FAN) Frames that have occurred in the trace. FAN Frames are utilized by an FL_Port to give a fully qualified domain identifier to a device following a loop Initialization. If the loop Initialization occurred due to reasons within the FL_Ports control (i.e. the FL_Port initiated the LIP and no Loss of Sync occurred), most FL_Ports will utilize FAN to assign the previous address to the connected NL_Ports. FAN Frames are commonly utilized erroneously by FL_Ports. If the loop has been in a Loss of Sync situation prior to (or during) the Link Reset, FAN should not be utilized by the FL_Port. The Loss of Sync could have indicated that a device has been removed or added to the loop, thus causing the potential of AL_PA re-addressing on the loop. There are also many situations in which the NL_Ports will initiate a loop initialization due to error situations occurring on the loop. In these cases, it may not be safe to assume that the previous AL_PA and Fabric Address assignments will be consistent following the loop initialization.

Another valuable metric provided by the software of the invention is the SCSI exchanges[read] and Tenancies/read metric, which represents the average number of tenancies (loop accesses) required to complete a SCSI read for the selected initiator/target/LUN. When a tenancy contains frames for multiple exchanges, only the first exchange identified in the tenancy is credited. (For further information, see the User Manual entry on Tenancies/exchange. Full duplex frame transmissions do not create a new tenancy and are therefore not credited with the tenancy. Nominal SCSI read operations require two or three tenancies to complete, depending upon how the target delivers the Status frame. Typically, when the Status frame is transmitted in the same tenancy as the data frames, the exchange will only take two tenancies to complete, thus making the exchange more efficient. Additional tenancies may be required due to loop out of credit situations or other device behaviors.

Another metric is the SCSI Abnormal Frame Counts or Check Condition Status metric, which is a count of the number of times the selected target/LUN has returned a SCSI Status indicating a Check Condition (0x02) to the initiator. Check Conditions are used for a variety of purposes in SCSI, some responses of Check Condition are expected in response to certain exchanges (i.e. on the first command following a Bus Reset/PLOGI from a device). Other Check Condition Status frames are used to indicate problems in framing, signaling or ULP errors. In FC, devices will add the SCSI Sense data with the Check Condition status. The Sense data gives useful information about why the Check Condition occurred. Keep in mind that at least 64 bytes of payload data per frame must be captured to see the SCSI Sense data within a frame. Some common problematic reasons Check Conditions occur in FC are due to Parity Errors or data Phase Errors. According to PLDA rules, FC AL targets are not allowed to transmit P_RJT frames in response to bad data from an initiator. In these cases, the target will usually wait for it's next turn to send data and respond with a Check Condition with the Sense Key set to 0x0 B (Aborted command) and the Additional Sense Code and Qualifier set to 0x4700 (Parity Error).

The SCSI Abnormal Frame Counts—Queue Full Status is a metric that counts the number of times the selected target/LUN has returned a SCSI Status indicating Queue Full (0x28) condition to the initiator. A Queue Full indicates that the requests being made by the initiator have over-run the capabilities of the target. With some operating systems/device drivers, Queue Full conditions can have extreme effects on performance, as the operating system will tend to "throttle" outstanding I/Os to a device following a Queue Full condition. When "throttled", the operating system will no longer allow for more than one outstanding queue on the target at any given time, leaving long gaps between the time one command completes and the next command is issued. This "throttle" condition disallows the target to do any sort of optimizations (i.e. read-Ahead caching) to increase performance. This also disallows the operating system/device drivers to perform efficiently. Typically, throughput will run at 25% (or less) of normal speed when throttled.

Although the above noted recitation of metrics provided by the software package of the invention is extensive, this recitation is in no way intended to be exhaustive, as the software package of the invention provides a multitude of metrics (and errors and warnings) that are not expressly listed herein. For a more complete list of both errors and warnings and metrics provided by the software package of the invention, reference should be made to Applicants provisional application appendices, as well as the SANMetrics software system help file provided with the software package.

User Interface

Figure 7:
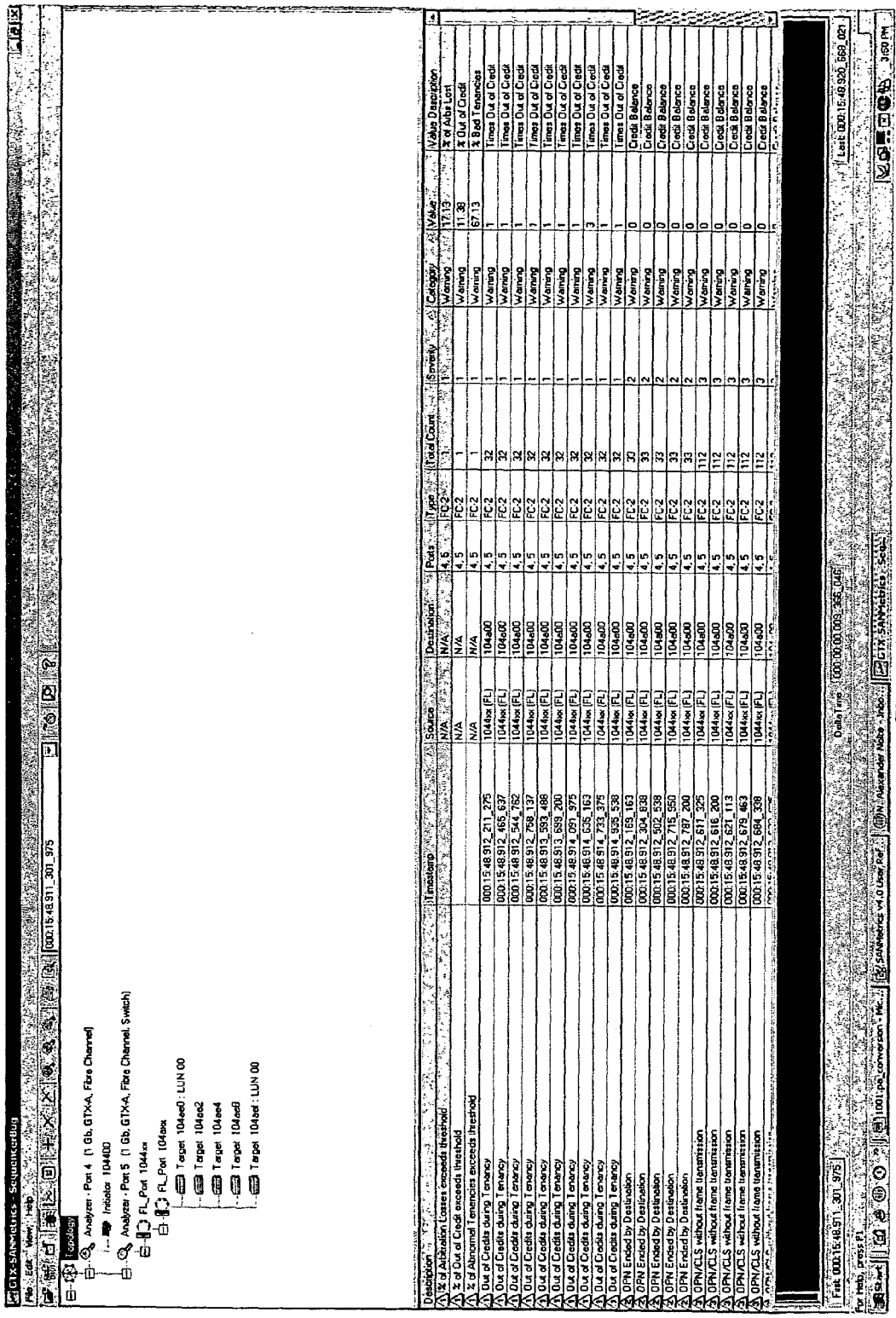
FIG. 7 illustrates an exemplary debug view of the GUI of the invention.
Figure 8:
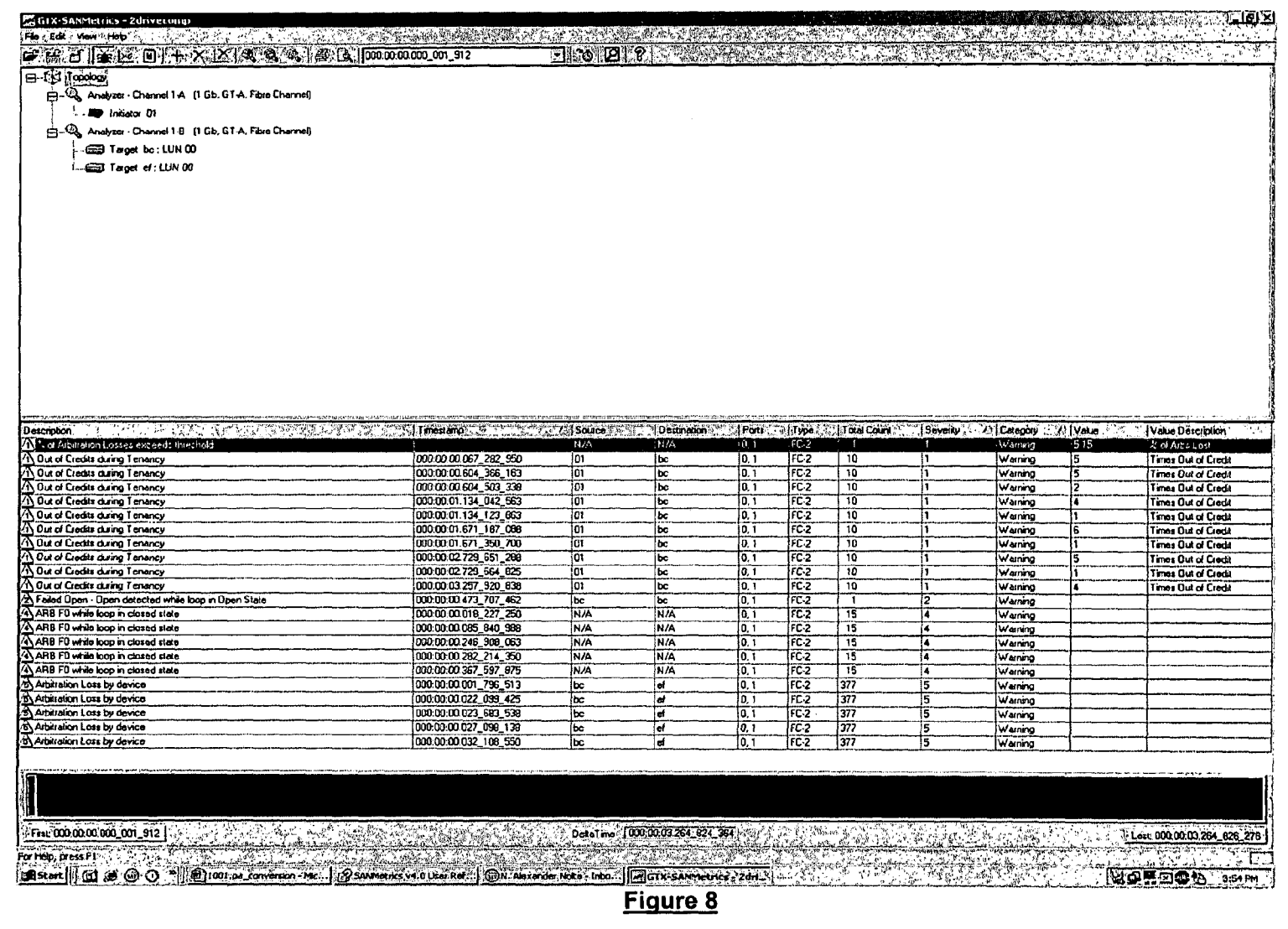

In addition to the software package of the invention providing a powerful analysis tool, it also provides an equally powerful display setup that allows users to easily and efficiently glean information from the software package relative to the analyzed network. More particularly, the GUI of the software package of the invention generally includes a debug view, a graph view, and a report view, all of which will be further discussed herein. FIG. 7 illustrates a first exemplary debug view of the software package of the invention. FIG. 8 illustrates another exemplary debug view of a trace generated by the software package of the invention.

The debug view includes a topology display. The Topology/Debug View vastly expands the debugging capabilities of the Finisar GTX Analyzer. The view is split into two sections: Topology and Error Log. The Topology View gives a visual representation of the devices found while processing the trace. The devices are represented as Initiators when they behave as exchange originators or SCSI initiators. Devices represented as Targets are the recipients of exchanges from the initiators. Devices can have dual functionality in that they can behave as both Initiators and Targets. An example of this is when a Link Reset occurs on a switched loop with only SCSI Targets (drives) present. After the Link Reset, the drives will initiate exchanges with the FL_Port on the switch to establish login and to register with the directory server. In this case, the drives will appear as both an Initiator and Target. The Topology View can be collapsed or expanded as necessary. When a specific error is selected in Debug View, the nodes associated with the error are highlighted in either Red (indicating an error) or Yellow (indicating a warning). The layout of the Topology View is based upon the logical positioning of the analyzer within the SAN. Each port of the analyzer is represented with devices that are transmitting on that port shown as a node to the port. In a simple FC Arbitrated Loop environment, FC devices will show as attached directly to the port. This is because it is impossible from an analyzer's viewpoint to determine the locations of hubs and other retiming devices. This model still helps to group the devices into the two halves of the loop for easier visualization of the layout. Devices in this environment are shown as L_Ports. Additional port types are F_Ports, N_Ports, FL_Ports and NL_Ports. These devices occur when in a switched fabric environment. Interconnecting ports (F_Ports and FL_Ports) are named in a domain address format: 0x AABBCC, where M generally equates to the logical zone, BB equates to the port number within the zone and CC is set to 'XX' to represent the lack of a port address. Take an example of an NL_Port connected to an analyzer (Port 0), which in turn is connected to an FL_Port (Port 1). The NL_Port will be represented under Port 0 with its fully qualified domain address (i.e. 1045ef) and the FL_Port will be represented under Port 1 with the zone and port number (1045xx).

The Error Log view is a customizable spreadsheet view of error and warning events that SANMetrics has found in the trace. This view can help to easily pinpoint errors in the SAN and undesirable behaviors in the connected devices. The events are broken down into two categories: Errors and Warnings. Warning Events are used to flag inappropriate or inefficient behavior to the user. Some Warning Events indicate violations in the FC protocol, but the violation itself is not known to have bad side effects (such as data loss or corruption). Error Events indicate serious errors in framing, signaling or protocol behavior. Most error events lead to undesirable activity within the fabric. Each Error Log event gives a relative severity level of the error. Severity Level 1 indicates most critical and Severity Level 5 is the least critical. These levels are set based upon many years of FC and SCSI debugging experience. Each configuration can have different levels of tolerance and or perceptions of severity, thus the severity levels are intended only as a basic gauge. Events are also categorized into FC-2, FC-4 and SCSI types. Each event displays relevant information in the Source and Destination columns of the spreadsheet. FC-2 Events are centered on link transmission issues, such as CRC Errors and bad Arbitration values. FC-2 Events are represented by the nearest buffers or devices. Where appropriate and relevant, these events will have specific Source/Destination identifiers to assist in identification. There are many events that will not have relevant Source/Destination identifiers and in these cases, these fields will be set to "N/A". Events of this type generally indicate errors occurring between two buffers (such as an NL_Port and the FL_Port) and rarely indicate errors occurring between the endpoints. FC-4 Events indicate errors in framing or FC protocol, such as ABTS exchanges and Out of Order Sequence delivery. FC-4 Events are represented by the Source and Destination identifiers found in the FC frame header. Events of this type generally indicate errors occurring between two end-points. SCSI Events indicate upper layer protocol errors in SCSI delivery, framing and handling. Each SCSI Event uniquely identifies a single SCSI Initiator/Target/LUN nexus. The format used to represent the Target/LUN is "TARGET_ID; LUN_ID". The "Value" and "Value Description" Columns are utilized by SANMetrics to give additional information about the specific event. Each Event type may have additional information necessary or useful while hunting down the events in Trace View. These values can be anything relevant to the specific error, from the OXID of the exchange to a percentage value indicating the percentage of time that this happened. The "Value Description" Column should clarify the information presented in the "Value" Column. For example, for the "Frame D_ID and Open Destination Mismatch" Error Event, the Destination column contains the Destination ID of the frame that was in error. The "Value" column for this error gives the Destination ID of the OPN that was in error. The "Value Description" column tells us that this is the OPN Destination. The "Total Count" Column indicates the total number of these types of Events that have occurred within the entire trace, which is extremely useful for analysis. In many traces, there can be thousands of events that would cause an Error or Warning Event to be displayed. The Debug View allows the user to configure the total number of Events to be displayed for each Event type. Typically, the number is set fairly low (5 or 10) so that the Event list does not grow too large and cumbersome. This is where the "Total Count" column is useful. Take the example of an Out of Credit situation.

By default, SANMetrics will show the first 10 Out of Credit situations for any devices on the link. The "Total Column" on these events will indicate the total number of times any (or all) devices were out of credit in the trace. The "Timestamp" Column indicates the timestamp at which the event occurred within the trace. The value of the timestamp varies dependent upon the Event type it represents. For an exchange completion time event, this value will represent the time at which the exchange completed. For an ABTS frame, it will represent the starting time of the ABTS frame. When an Event is highlighted, the timestamp is placed in the "Go To Timestamp" box on the toolbar. This can be used to copy timestamps for pasting into Trace View to quickly jump to the exact event time. As an aside, it should be noted that SANMetrics was designed to capture and analyze most of the common error situations that occur in today's FC SAN configurations. SANMetrics does not attempt to check every rule (or "shall") specified in the FC standards documents. There are situations in which a device may blatantly violate the standards documents, yet function error-free in the SAN. These are not the common cases that SANMetrics checks for. Instead, checks are performed on a variety of error situations that indicate trouble within the SAN and problems that are known to cause performance and functionality problems within the SAN. Many of the errors indicate Upper Layer Protocol (ULP) problems, such as time-outs, out of order sequences, failed I/O operations. Other errors occur in the framing and signaling areas. In all cases, the Error Log is designed to identify the bulk of the trouble spots or behaviors and thus eliminate the need for spending hours hunting for events within traces.

Figure 9:
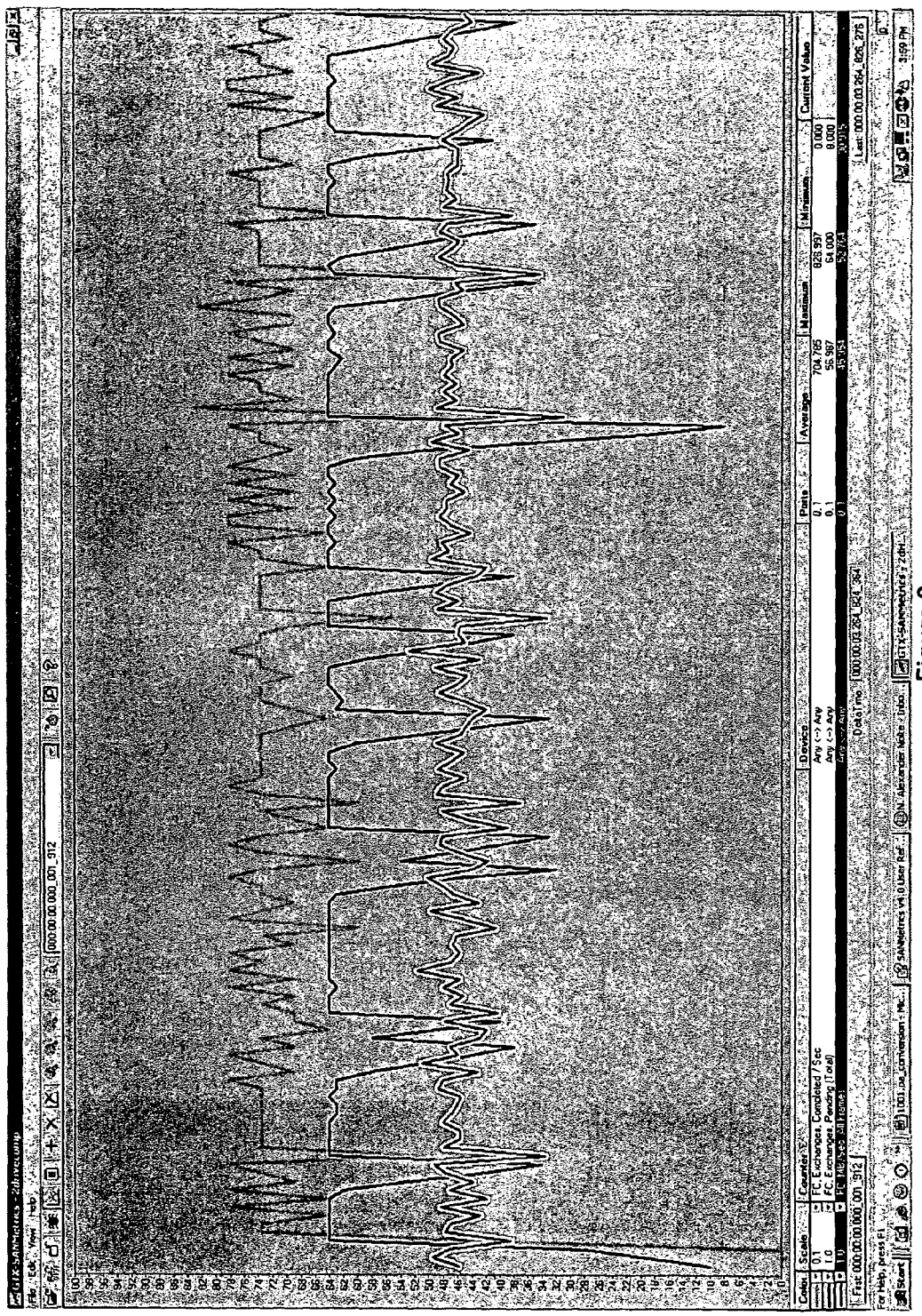
FIG. 9 illustrates an exemplary graph view of the GUI of the invention.
Figure 10:
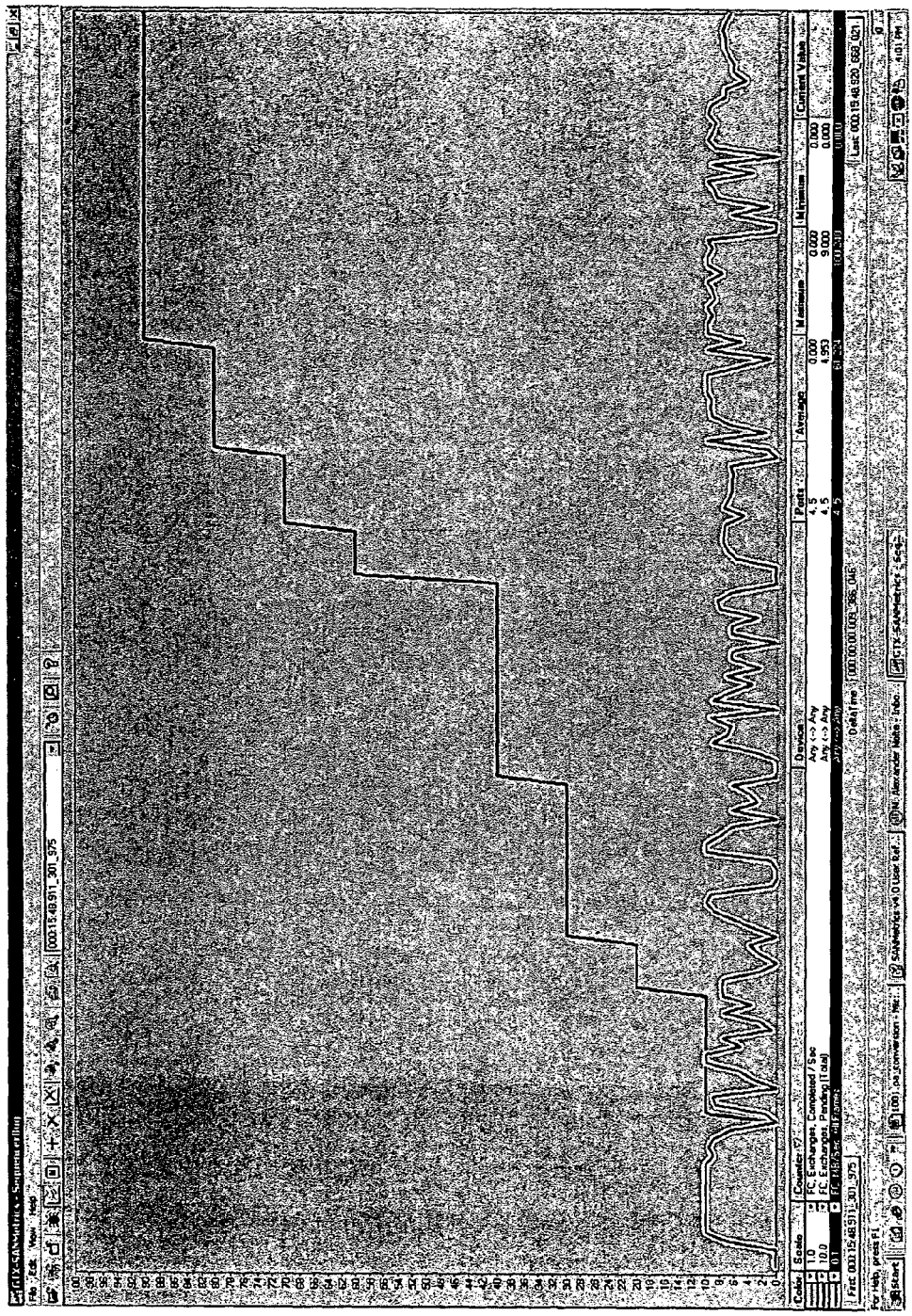
FIG. 10 illustrates another exemplary graph view of the GUI of the invention.

Another main view option for the software package of the invention is the graph view. When the application is started, the application window appears. This is the main window for user interaction with the application. The main window consists of several parts: Toolbar, Display window, and areas below the Display window for other information, as illustrated in FIGS. 9 and 10. The graph view allows a user to select various metrics in the display panel in the lower portion of the GUI. The selected metrics are then plotted in the upper portion of the screen. This view is extremely valuable in troubleshooting and analyzing networks, as the graphical view presents an easily readable representation of the trends of the system. For example, the graphical view would easily illustrate a steadily increasing pending exchanges parameter, which would otherwise be difficult to detect.

Figure 11:
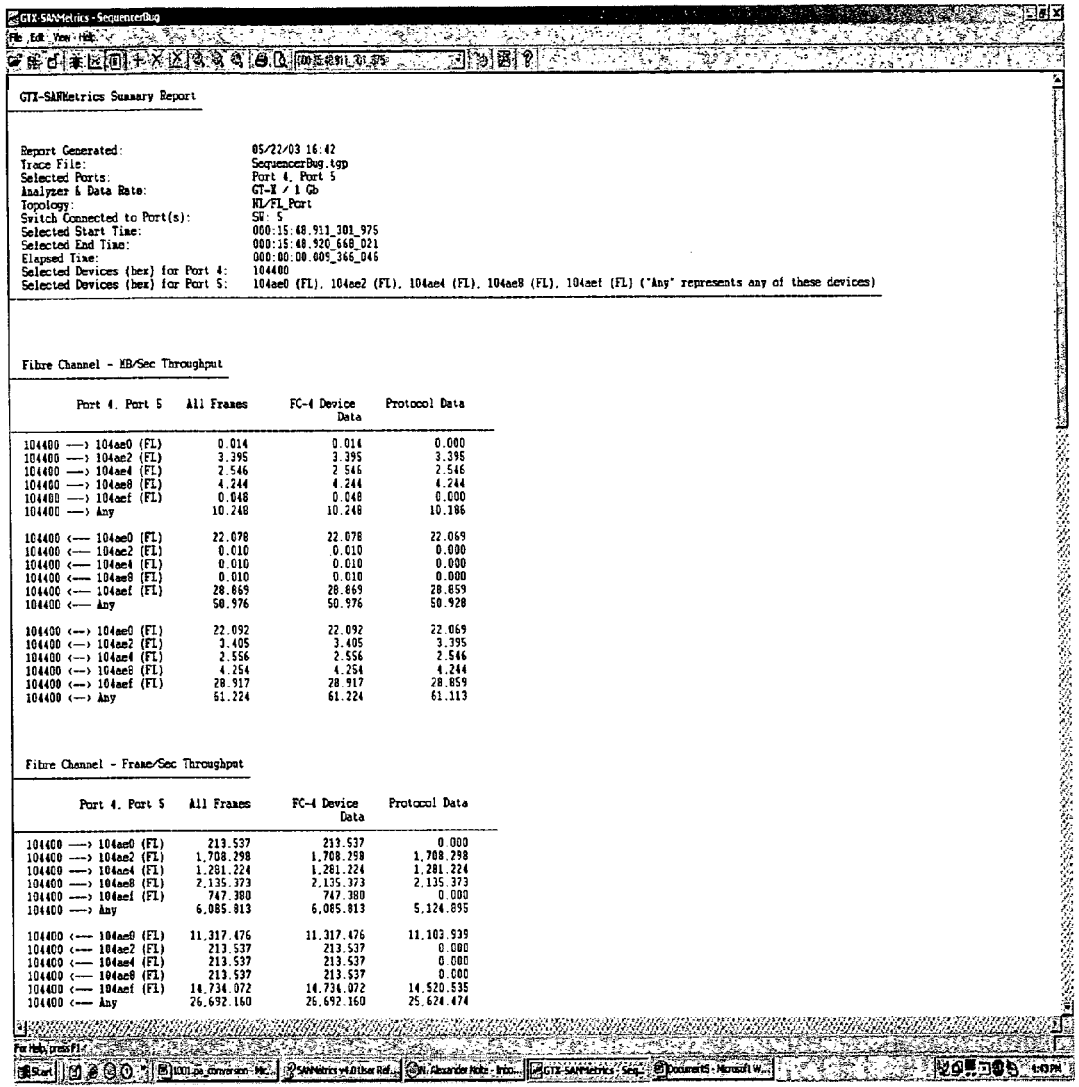
FIG. 11 illustrates an exemplary report view of the GUI of the invention.
Figure 12:
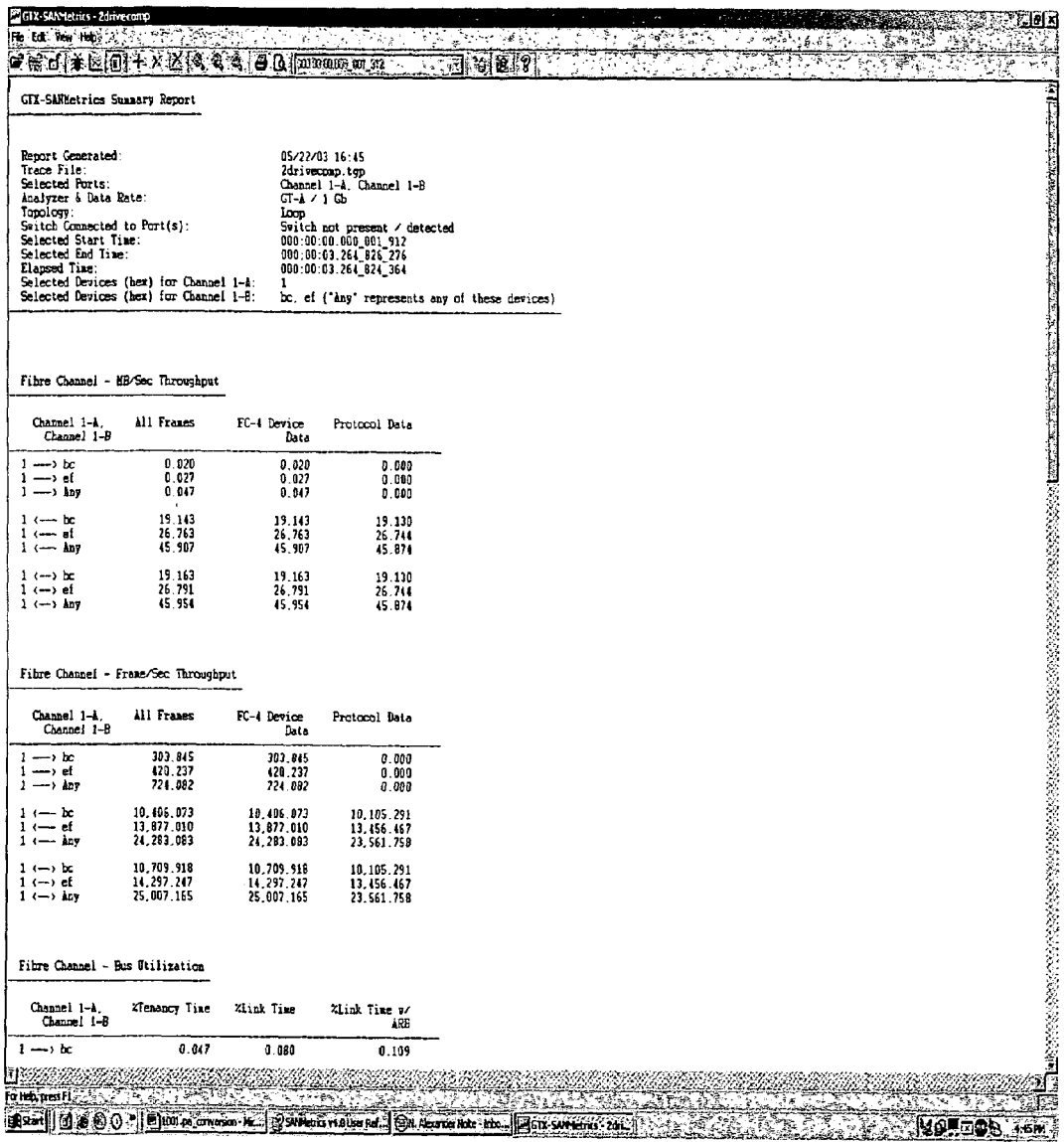
FIG. 12 illustrates another exemplary report view of the GUI of the invention.

Yet another view option available from the software package of the invention is the report view. Exemplary report views are illustrated in FIGS. 11 and 12. More particularly, SANMetrics can also display a text-based report detailing performance metrics or pending exchanges in the trace. The report is based upon information for the current zoom. In Graph View, information is broken down into samples across time to allow for graphing of metrics. In Report View, the information is collected as an entire analysis of the whole trace without the sample breakdown. Therefore, values reported in Report View better represent the entire trace (or current zoom) as a whole. An example of how this applies is as follows: Looking at the Average Exchange Completion Time (ECT) metric in the Graph View shows the values over time across 150 plot points and gives an average value for the overall 150 samples. This average can be skewed by periods of inactivity throughout time (when the device did not complete any exchanges, thus resulting in 0.00 values for the Average ECT). Each individual plot point in the graph represents the Average ECT value for that time slice (or sample). In Report View, the Average ECT value does not include the periods of inactivity, as the value is calculated only for the exchanges that have completed throughout the entire trace (or current zoom). Therefore, the Average ECT value shown in Report View will be more statistically accurate.

Generally, the report view values and counters may be used to obtain a quick overview of the entire system and the current level of performance and health, compare performance among Initiators or Targets to find poorly performing components, and to obtain lists of pending exchanges for trace and debugging purposes, for example. The reports can be exported to text files for import into a user application. Selected sections of reports can also be copied and pasted into applications. Additionally, there are four types of reports that can be generated: 1) Pending Exchanges for this Zoom—Generates a list of all incomplete (pending) exchanges at the end time of the current zoom window. 2) Pending Exchanges at Cursor—Generates a list of all incomplete (pending) exchanges for the current selected time (at the current Cursor position in Graph View, or at the sample closest to the current Error/Warning Time in Debug View) 3) Summary Report—Generates a report containing a set of basic statistics for characterization of I/O activity in the trace. 4) Detailed Report—Generates a report containing an extremely detailed set of statistics covering every aspect of FC and SCSI performance and behavior.

The Report Type is changed via the Report Setup Dialog function. Once a report is generated, it will stay until the Zoom Window is changed or a new type of Report is requested via the Report Setup Dialog.

Pending exchange reports list exchanges that have been issued, but not yet completed, at the end time of the currently selected zoom window (or time at cursor). The total pending exchanges for each pair are listed, followed by a one-line per exchange entry showing the details of each pending exchange. The lists are broken apart into SCSI Pending Exchanges and Non-SCSI Pending Exchanges (for FICON, Extended Link Service Requests, etc.). For SCSI Pending Exchanges, the following values are listed per pending exchange: 1) Initiator/Target;LUN—The Initiator/Target/LUN (I/T/L) nexus specified in the exchange. 2) Start Time—The time at which the exchange (SCSI Command) was issued. 3) OXID—The Exchange Identifier that, when combined with the I/T/L, uniquely identifies the exchange. In SCSI, this value essentially represents the Queue Tag value. 4) Elapsed Time (ms.)—This value is the time that has elapsed (in milliseconds) since the exchange was originally issued. 5) #Frames Received for Exchange—This is the total number of frames seen for this OXID so far in the current zoom. This can be VERY helpful in quickly isolating the trouble exchanges within this list as it allows a user to deduce what "phase" the exchange has halted in. This count includes all frames for the exchange, including the Command, Transfer Ready, Data frames, etc. When an exchange appears on the list that has been pending for several seconds with only one frame transferred (the Command frame), then the exchange is waiting for a response from the Target (either Transfer Ready or Data). On the other hand, if multiple frames have been transferred, there is a likelihood of an open sequence existing within the exchange—which may cause a timeout or other condition. 6) Expected Exchange Length (bytes)—This is the amount of protocol data bytes (user payload) requested in the exchange. 7) I/O Type—This indicates the SCSI I/O Type: Read, Write, or Other. Reads are defined as Read(6), Read (10), and Read(12) SCSI Op Codes. Writes are defined as Write(6), Write(10) and Write(12) Op Codes. Other includes all other commands not counted as Reads or Writes. 8) Logical Block Address—The requested LBA value from the SCSI CDB. This is the relative address (in sectors) offset from the start of the SCSI Target/LUN.

For FC (non-SCSI) Pending Exchanges, the following values are listed per pending exchange: 1) Initiator/Target—The Initiator/Target specified in the exchange. 2) Start Time—The time at which the exchange was issued. A new exchange entry is created when the F_CTL indicates that it is a Start of Exchange and Exchange Initiator. 3) OXID—The Exchange Identifier that, when combined with the I/T, uniquely identifies the exchange. 4) Elapsed Time (ms.)—This value is the time that has elapsed (in milliseconds) since the exchange was originally issued. 5) #Frames Received for Exchange—This is the total number of frames seen for this OXID so far in the current zoom. This can be very helpful in quickly isolating the trouble exchanges within this list as it allows a user to deduce what "phase" the exchange has halted in. This count includes all frames for the exchange. When an exchange appears on the list that has been pending for several seconds with only one frame transferred (the frame that originated the exchange), then the exchange is waiting for a response from the Target. On the other hand, if multiple frames have been transferred, there is a likelihood of an open sequence existing within the exchange—which may cause a timeout or other condition. This report is particularly useful when the analysis window is "zoomed" to end immediately before a significant trace event (e.g. LIP).

Detailed and summary reports give text-based views of pre-selected statistics for the current zoom window. There are some metrics that will be displayed in these reports that are not available in Graph View. These metrics have useful (or understandable) context and values when being calculated for the entire trace. These reports can be generated with only the total/averages (Any) values or with counters detailing each individual selected device. Showing individual device statistics can create lengthy reports, but makes for easier comparison of device behaviors (i.e. comparing a list of exchange completion times for a group of SCSI Targets). Without the individual device statistics, the reports will be shorter and contain only overall information, which can be very useful for evaluating overall behaviors in the SAN (i.e. looking at the total number of Out of Credit situations occurring). The Any values shown are overall averages or totals for the devices selected in the Report Setup dialog. When a metric displayed in a column is an Average, the Any value will represent the Average of the values in the column. Additionally, the number of counters that are displayed in the Summary and Detailed Report is controlled by the User Preferences option for Counter Levels.

The invention claimed is:

1. A method for determining errors and metrics in a computer network, comprising:
    positioning an analyzer in communication with the network;
    capturing a data trace of the network with the analyzer;
    determining a network device topology from a first processing of the data trace;
    building user layer protocols using a second processing of the data trace and the determined device topology;
    determining errors in the network device topology using protocol experts applied to the user layer protocols in conjunction with the determined device topology; and
    displaying at least one of the device topology and the determined errors to a user,
    wherein determining errors further comprises filtering the data trace to eliminate data that is not accurately represented as a result of analyzer position.

2. The method of claim 1, wherein capturing the trace data comprises capturing and storing trace data for a first channel and a second channel of the analyzer, the data for the first and second channels being stored independently.

3. The method of claim 1, wherein building the user layer protocols comprises:
    a) stripping a specific protocol layer from a data sample;
    b) sending the specific protocol layer from the data sample to a software expert configured to analyze the specific protocol layer; and
    c) repeating steps (a) and (b) until each protocol layer of the data sample has been processed by a designated software expert.

4. The method of claim 1, wherein determining the network device topology comprises analyzing channelized captured trace data to extrapolate information indicative of loops, switches, and switched loops.

5. The method of claim 1, wherein determining errors further comprises determining warnings.

6. The method of claim 1, wherein determining errors further comprises determining at least one performance metric related to the determined topology and the specific user layer protocol.

7. The method of claim 1, wherein displaying at least one of the device topology and the determined errors to a user comprises displaying a graphical user interface (GUI) to the user, wherein the GUI is configured to receive input from the user to adjust a processing window in the data trace.

8. The method of claim 7, further comprising graphically displaying one or more locations in the determined network device topology associated with the determined errors.

9. The method of claim 7, further comprising displaying at least one of an error log, a metrics graph view, and a report view.

10. A method for determining errors, metrics, and warnings for a data network, comprising:
    collecting a plurality of data traces from the data network with a plurality of network analyzers;
    determining a topology of the data network via analysis of a combination of the plurality of data traces;
    processing the combination of the plurality of data traces in conjunction with the determined topology to rebuild user layer protocols;
    processing individual protocols to determine errors, warnings, and metrics for the particular protocol; and
    displaying the errors, warnings, and metrics to the user via a graphical interface,
    wherein processing protocols further comprises filtering the data traces to eliminate data that cannot accurately be analyzed given the utilized analyzer placement.

11. The method of claim 10, wherein collecting data traces further comprises selectively positioning the plurality of analyzers to capture data traveling between targets and initiators.

12. The method of claim 10, wherein determining topology comprises stepping through channelized data stored from the plurality of data traces to extrapolate information therefrom that indicates the presence of specific network devices.

13. The method of claim 10, wherein processing to rebuild user layer protocols comprises stripping each protocol layer from a data sample, analyzing the stripped protocol layer with an expert configured to analyze the stripped protocol layer, and sending the remaining portions of the data sample to additional protocol experts for analysis and forwarding of the data sample until each layer of the data sample has been analyzed by an appropriate protocol layer expert.

14. The method of claim 13, wherein processing individual protocols to determine errors for the particular protocol further comprises comparing protocol specific commands to protocol standards to determine if an error has occurred.

15. The method of claim 10, wherein displaying comprises displaying at least one of a graphical metric view, a topology view, and an error log view to a user.

16. A method for analyzing a network for errors, comprising:
   capturing at least one bidirectional data trace from the network;
   analyzing the bidirectional data trace to extrapolate information indicative of network topology;
   analyzing individual data samples from the data trace using the network topology to rebuild user layer protocols for the individual data sample; and
   determining errors in the network using the network topology, the user layer protocols, and standards for the particular user layer protocols,
   wherein determining errors further comprises filtering the data trace to eliminate data that is not accurately represented as a result of analyzer position.

17. The method of claim 16, wherein rebuilding the user layer protocols comprises:
   stripping a specific protocol layer from a data sample;
   sending the specific protocol layer from the data sample to a software expert configured to analyze the specific protocol layer; and
   repeating the stripping and sending until each protocol layer of the data sample has been processed by a designated software expert.

18. The method of claim 16, wherein determining errors comprises:
   processing the data trace with protocol experts that compare the progression of the data trace to an expected progression result based upon protocol standards; and
   determining an error when the progression of the data trace varies from the expected progression.

19. The method of claim 16, further comprising displaying the determined errors to the user in via a graphical user interface.

20. The method of claim 19, further comprising calculating and displaying network performance metrics to the user.

21. The method of claim 16, wherein capturing the at least one bidirectional data trace further comprises selectively positioning an analyzer to capture data traveling between targets and initiators.

22. The method of claim 16, further comprising determining whether the analyzer position is incorrect and generating an error if the analyzer position is incorrect.

* * * * *